US007316271B2

(12) United States Patent
Moyes

(10) Patent No.: US 7,316,271 B2
(45) Date of Patent: Jan. 8, 2008

(54) DEFORMABLE MEMBER

(75) Inventor: Peter Barnes Moyes, Aberdeenshire (GB)

(73) Assignee: Zeroth Technology Limited (GB)

( * ) Notice: Subject to any disclaimer, the term of this patent is extended or adjusted under 35 U.S.C. 154(b) by 0 days.

(21) Appl. No.: 11/544,259

(22) Filed: Oct. 6, 2006

(65) Prior Publication Data
US 2007/0029080 A1 Feb. 8, 2007

Related U.S. Application Data

(60) Continuation of application No. 11/114,488, filed on Apr. 26, 2005, now Pat. No. 7,134,506, which is a division of application No. 10/336,848, filed on Jan. 6, 2003, now Pat. No. 6,896,049, which is a continuation of application No. PCT/GB01/03072, filed on Jul. 9, 2001.

(30) Foreign Application Priority Data
Jul. 7, 2000 (GB) ................... 0016595.1

(51) Int. Cl.
*E21B 33/12* (2006.01)
(52) U.S. Cl. ............... 166/179; 166/82.1; 166/118
(58) Field of Classification Search ........... 166/82.1, 166/118, 387, 191, 197, 195, 217; 277/322, 277/327, 342, 343, 627
See application file for complete search history.

(56) References Cited
U.S. PATENT DOCUMENTS 2,683,928 A  7/1954  Carson ............... 29/523
4,482,086 A  11/1984 Wagner et al. ............. 277/12
5,211,226 A  5/1993  Hendrickson et al. ........ 166/82
5,988,276 A  11/1999 Oneal .................... 166/118
6,032,958 A  3/2000  Fowler .................... 277/377
6,425,444 B1  7/2002  Metcalfe et al.
6,431,282 B1  8/2002  Bosma et al.
6,530,574 B1  3/2003  Bailey et al.

FOREIGN PATENT DOCUMENTS

DE          87026      1/1895
EP       0 029 380    11/1980
EP       0 029 380 A1  5/1981

OTHER PUBLICATIONS

European Search Report. Reference No. P11626EP (Div)/R. Application No. 05024196.7-1266.

*Primary Examiner*—Frank Tsay
(74) *Attorney, Agent, or Firm*—Cantor Colburn LLP

(57) ABSTRACT

A deformable member can be used in a well tool for use in downhole oil/gas wells. In one embodiment, a deformable member is described which is deformable between undeformed and deformed positions, and comprises a generally hollow cylindrical body defining a wall. The wall includes three circumferential lines of weakness in the form of grooves, with two grooves provided in an outer surface of the member wall and the other groove provided in an inner surface. The member is deformed outwardly by folding about the lines of weakness and is used in particular to obtain sealing contact with a tube in which the member is located.

34 Claims, 43 Drawing Sheets

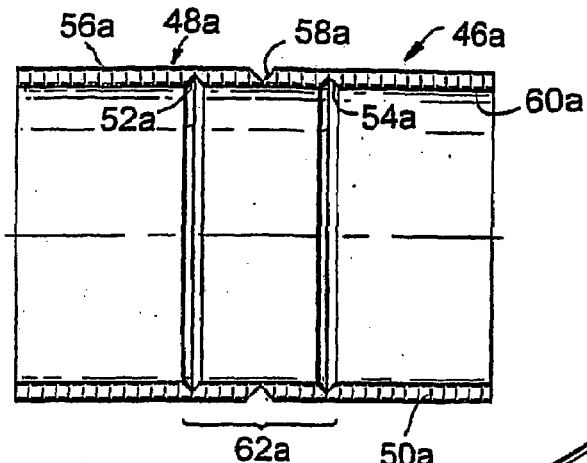
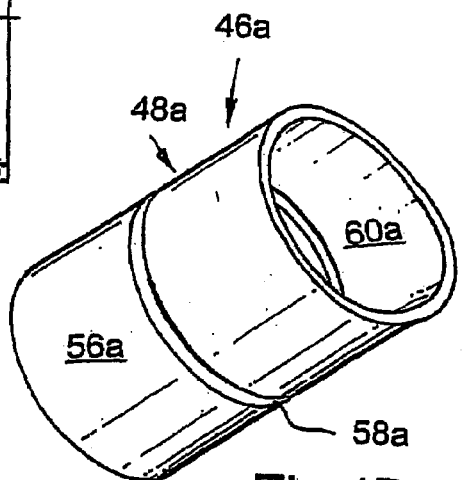
Fig.4A
Fig.4B
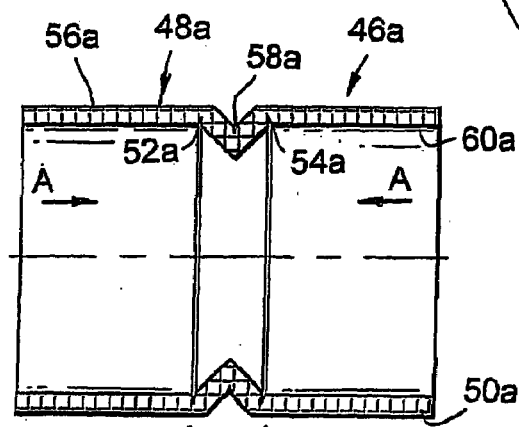
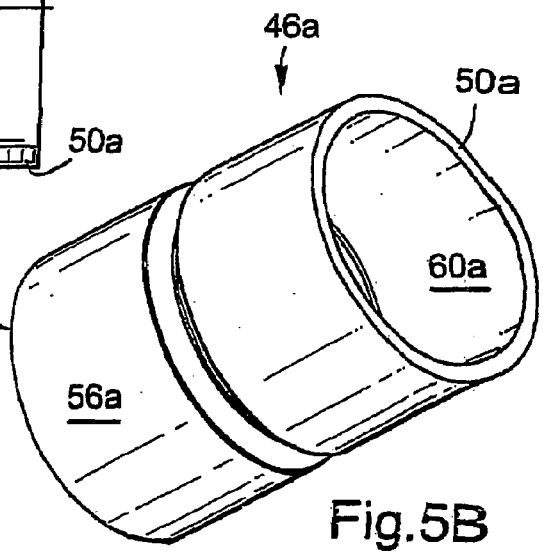
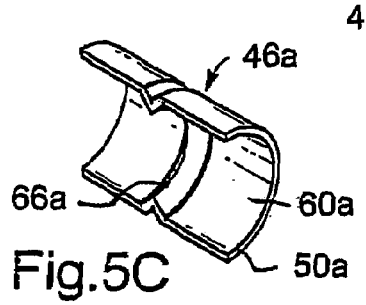
Fig.5A
Fig.5C
Fig.5B

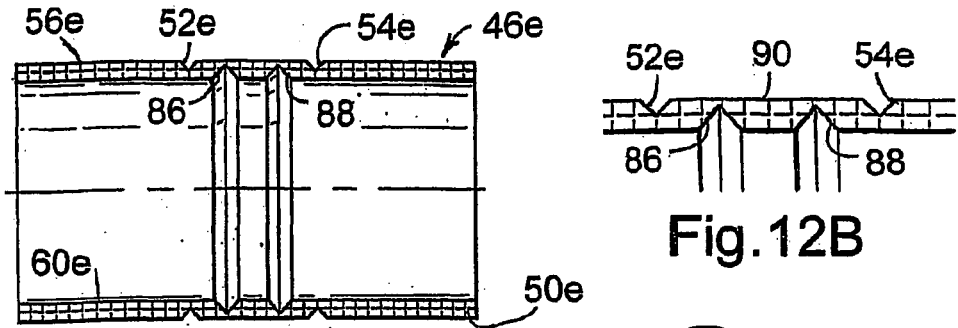
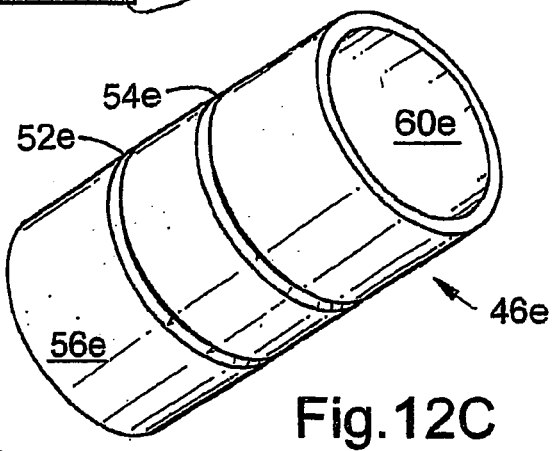
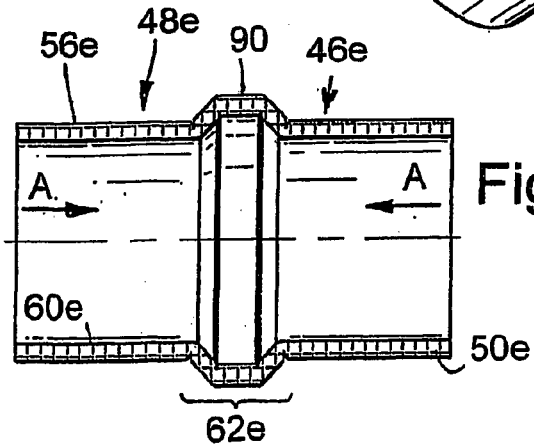
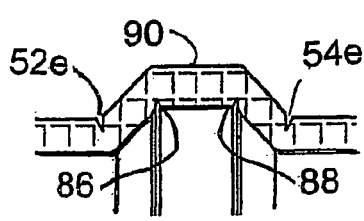
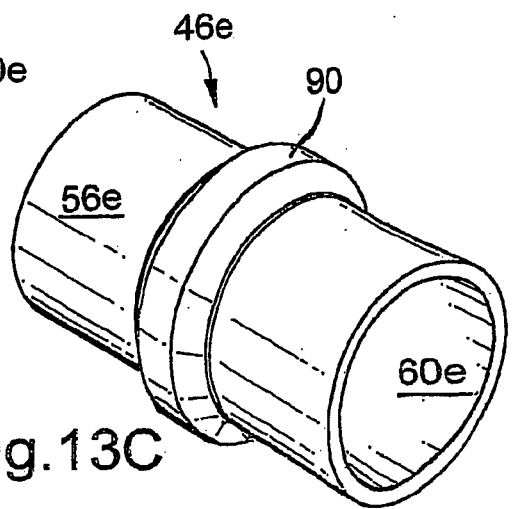

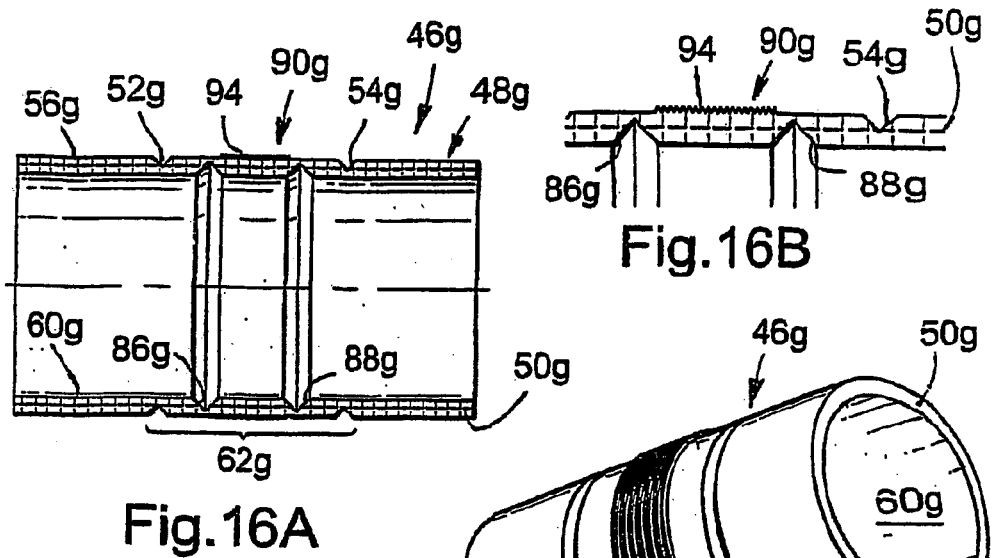
Fig.16A
Fig.16B
Fig.16C
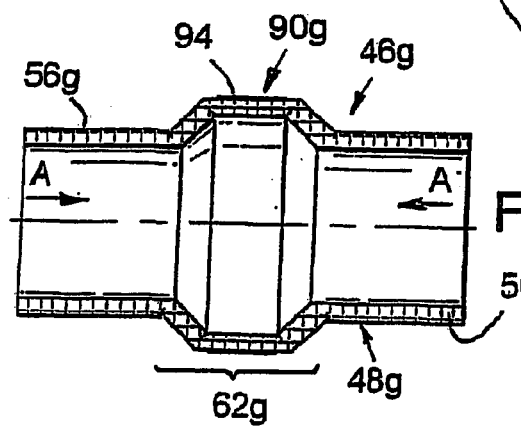
Fig.17A
Fig.17B
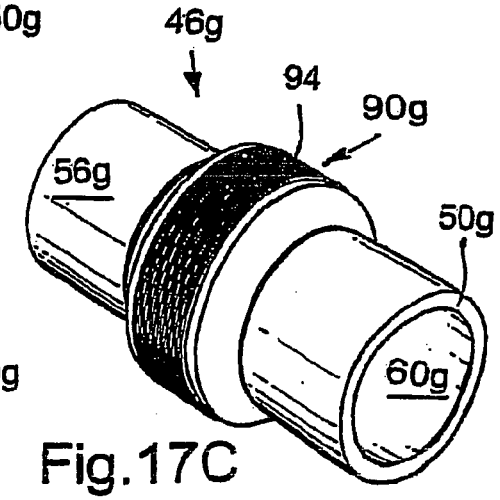
Fig.17C

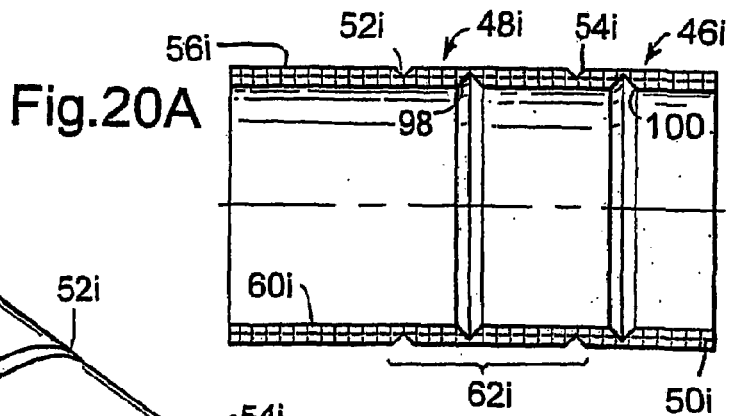
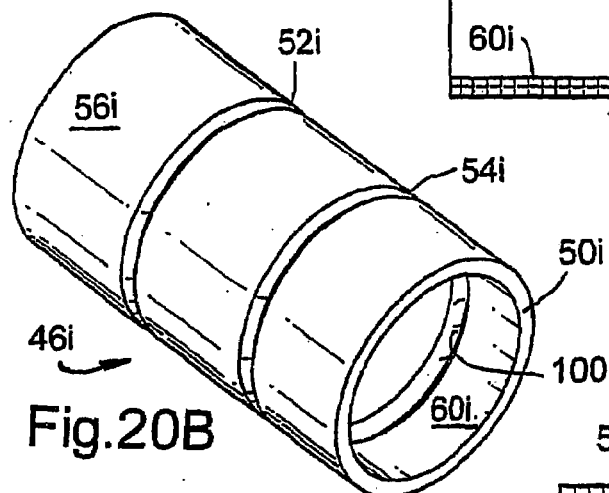
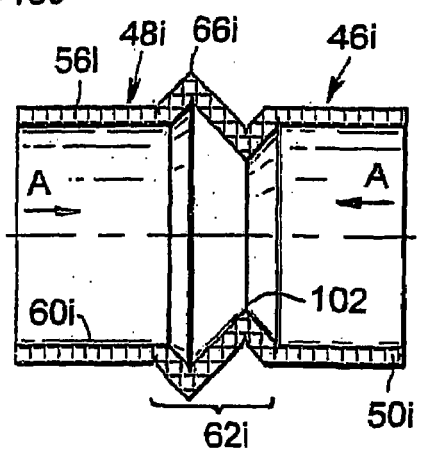
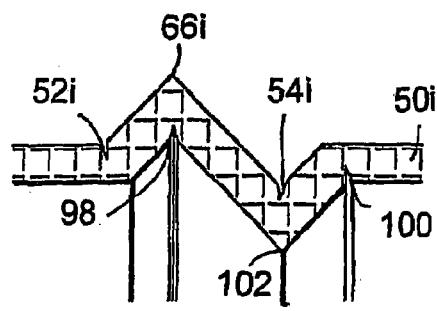
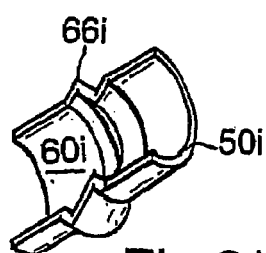
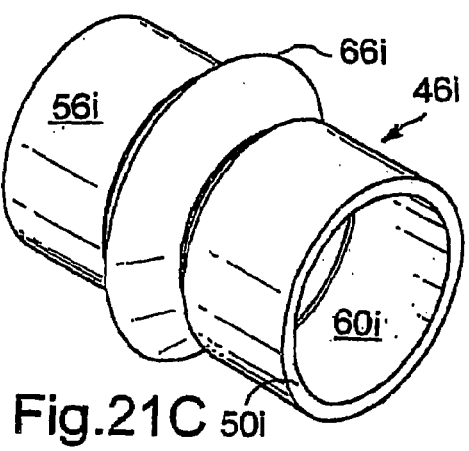

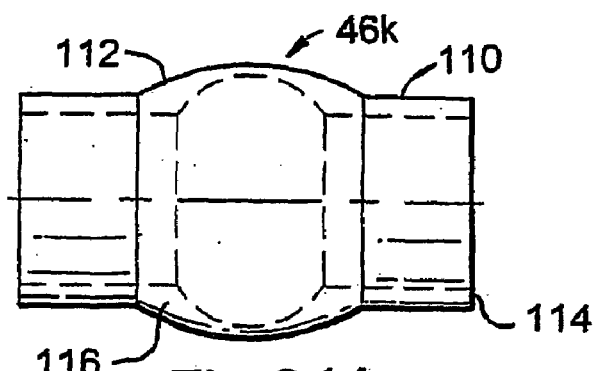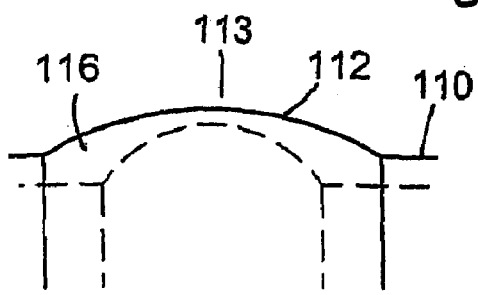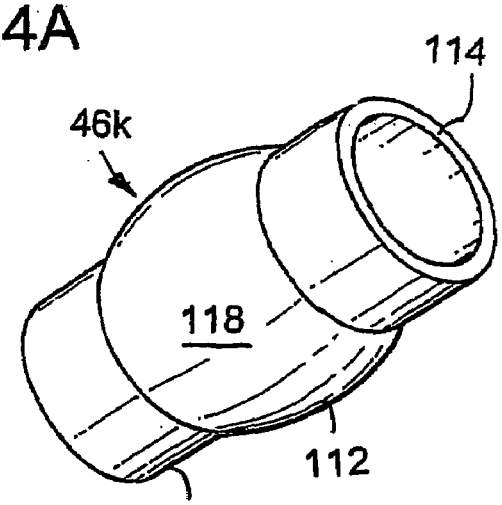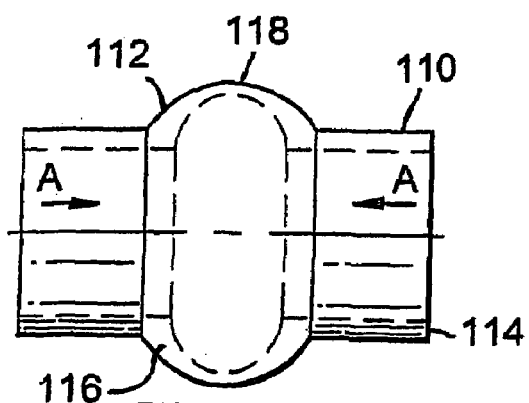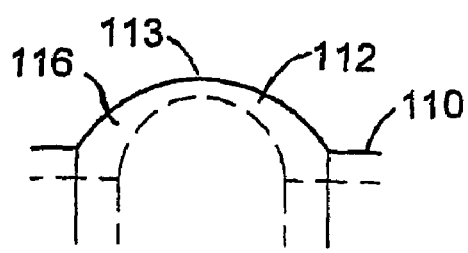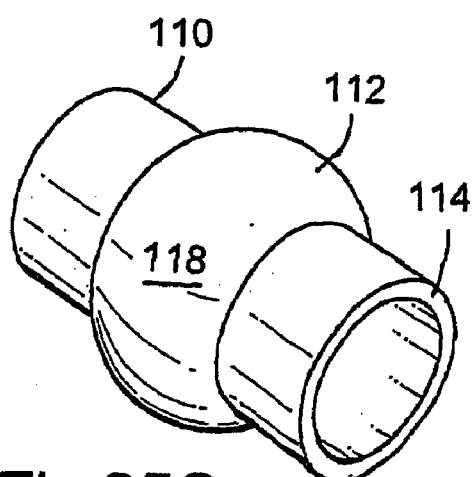

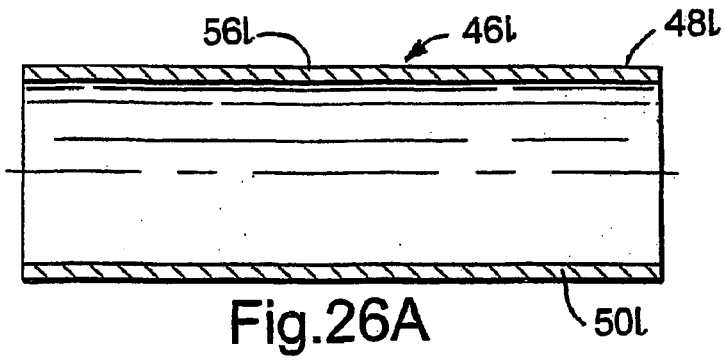
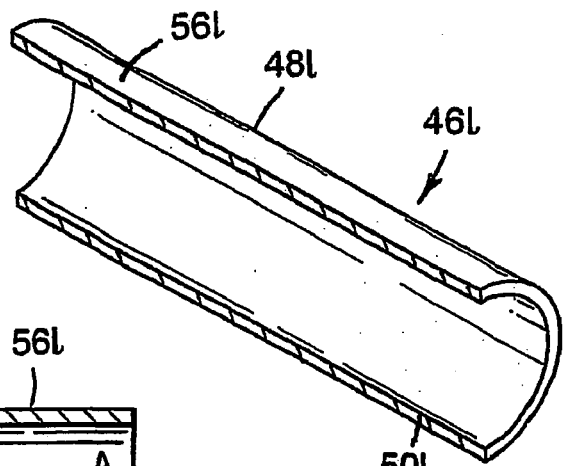
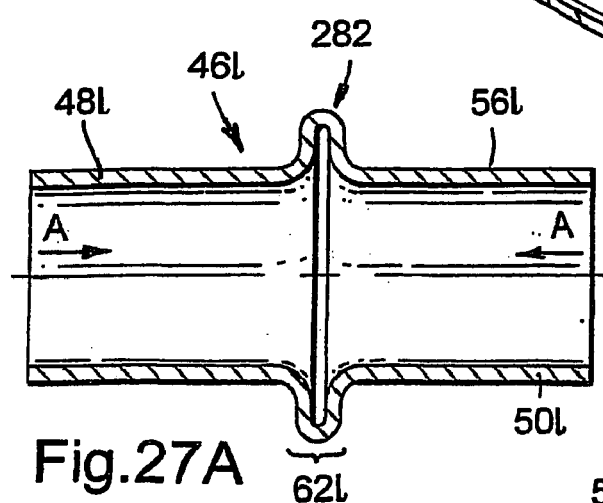
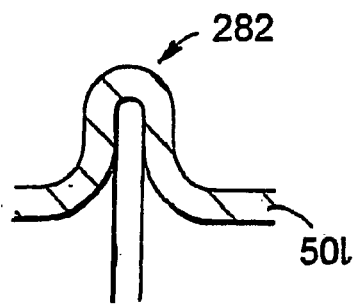
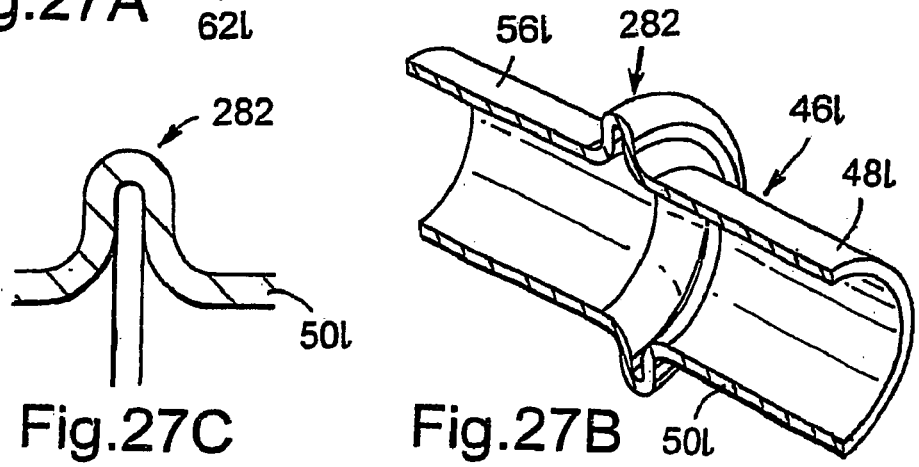

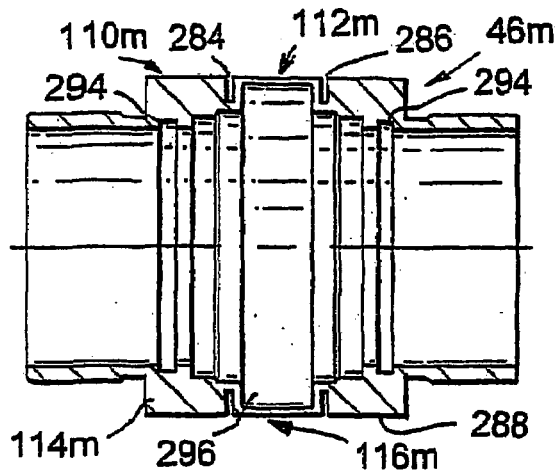
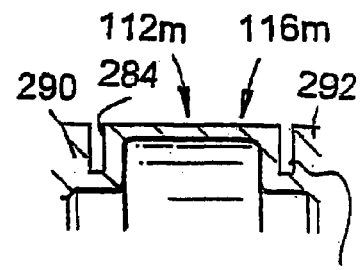
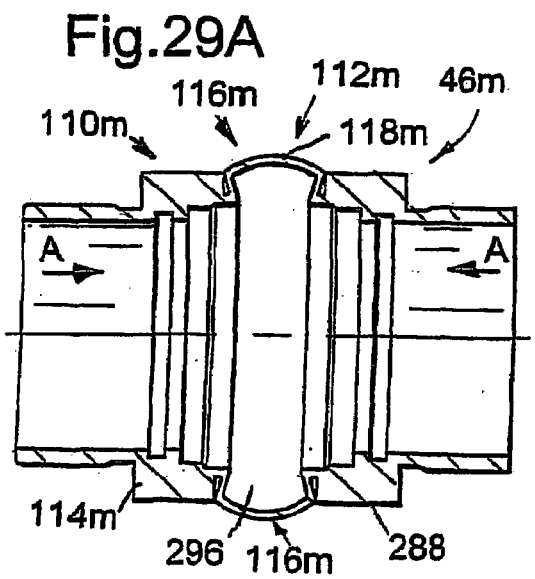
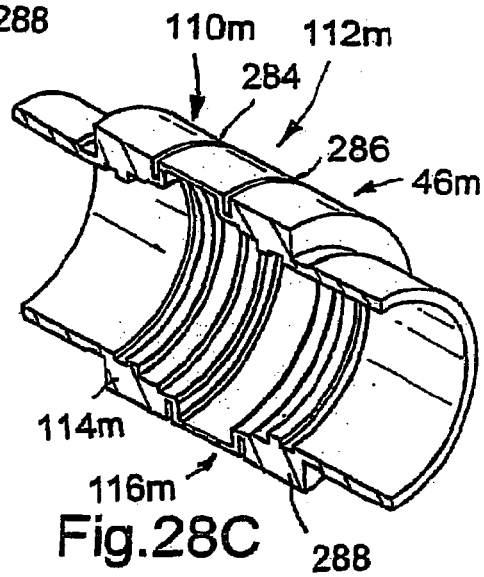
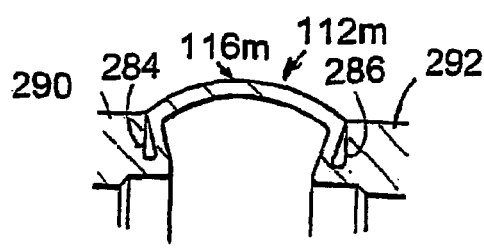
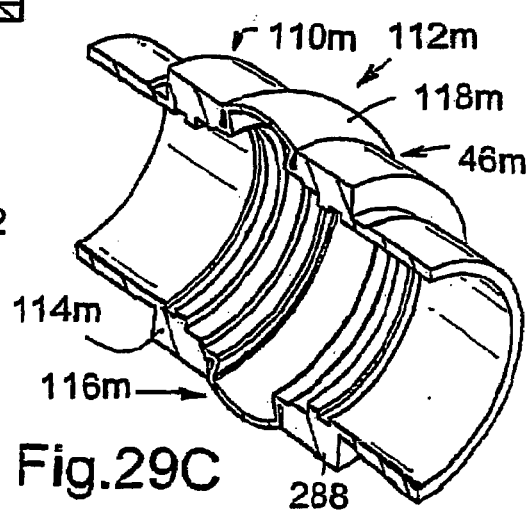

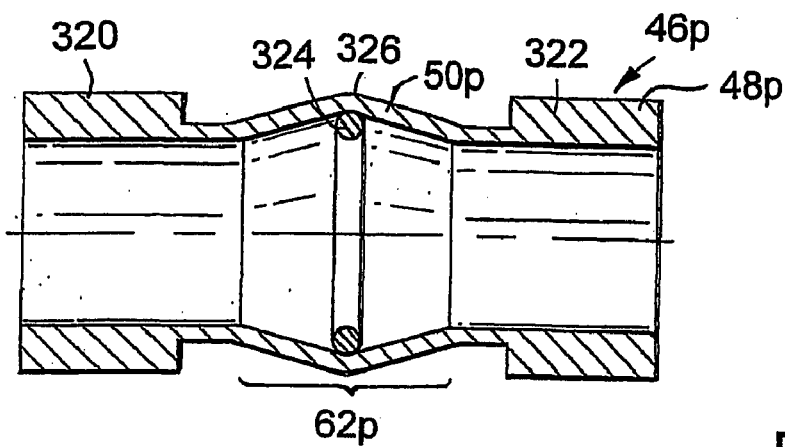
Fig.33A
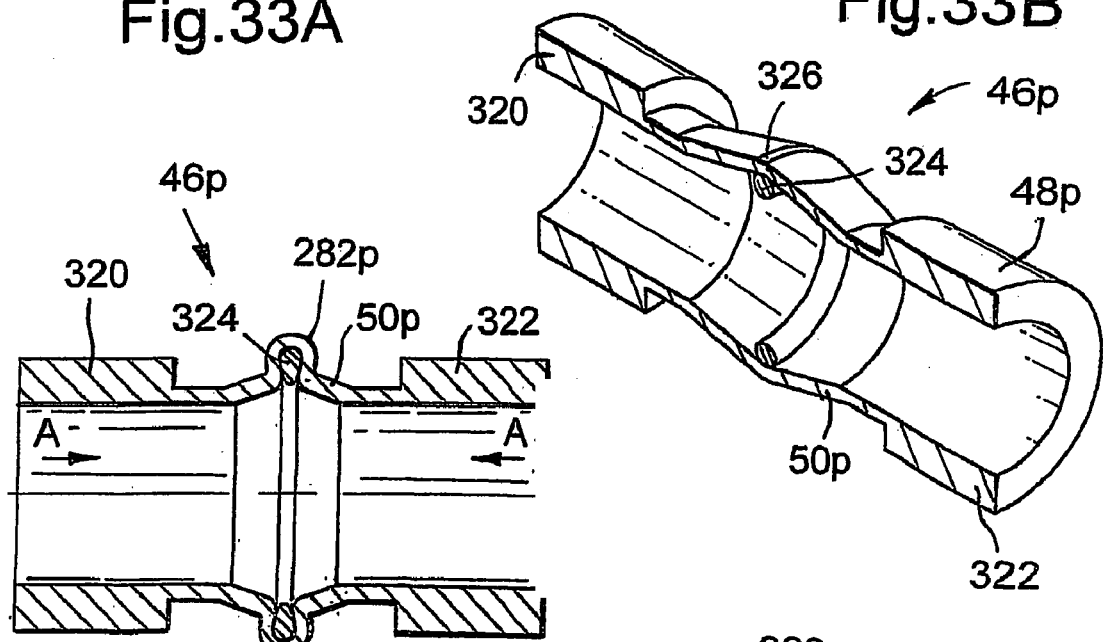
Fig.33B
Fig.34A
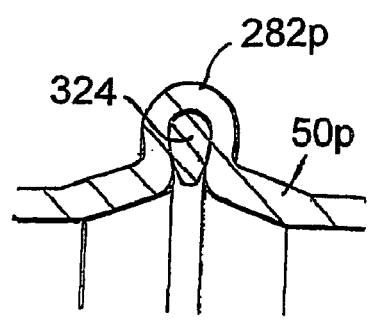
Fig.34C
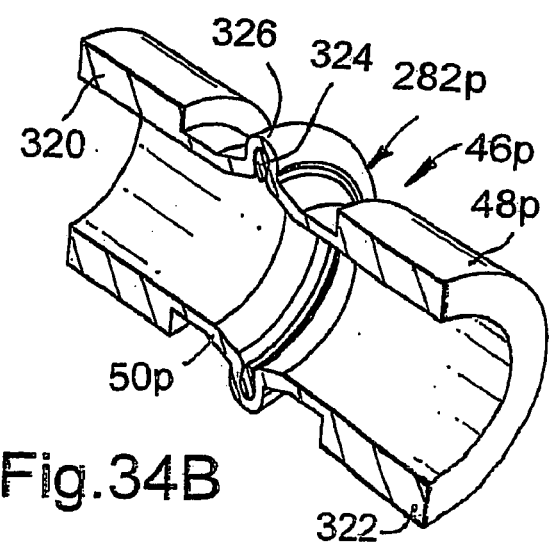
Fig.34B

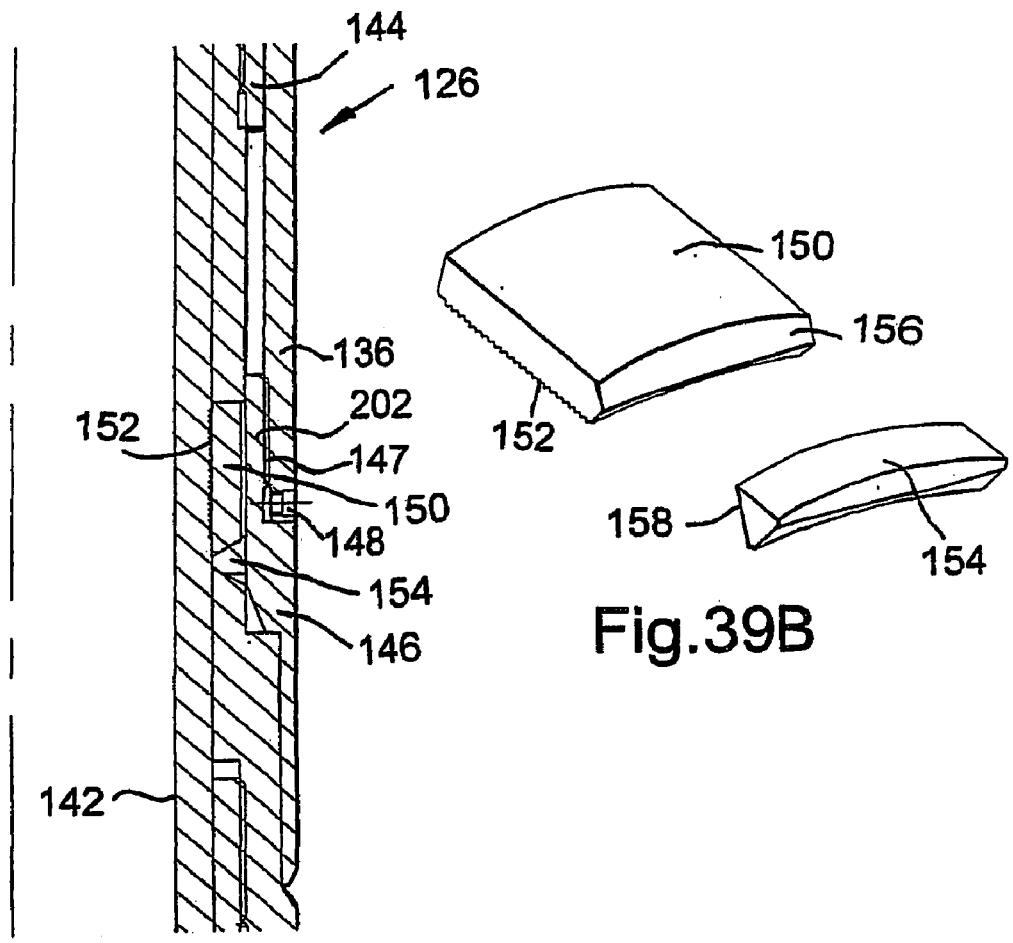
Fig.39A
Fig.39B
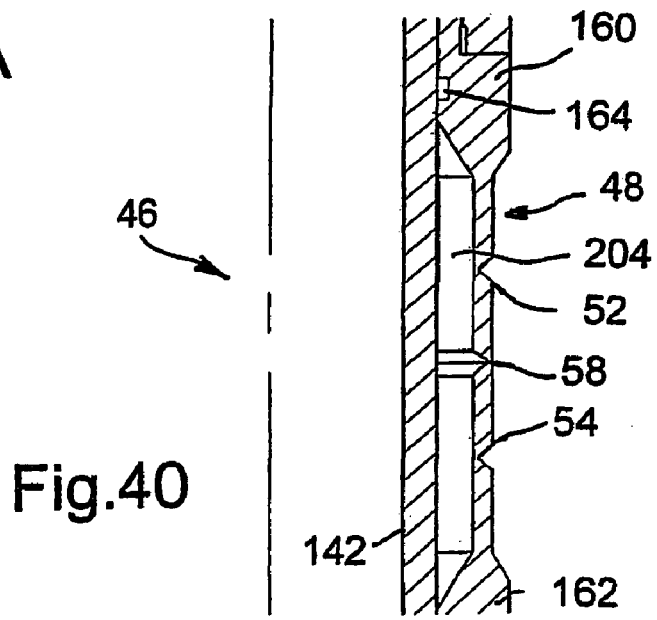
Fig.40

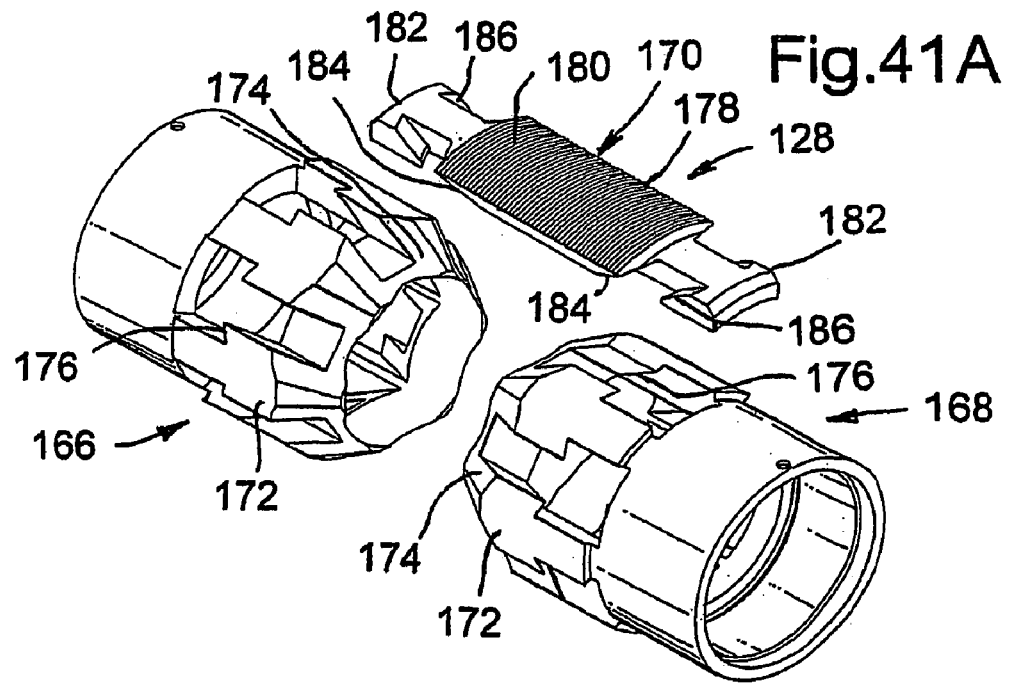
Fig.41A
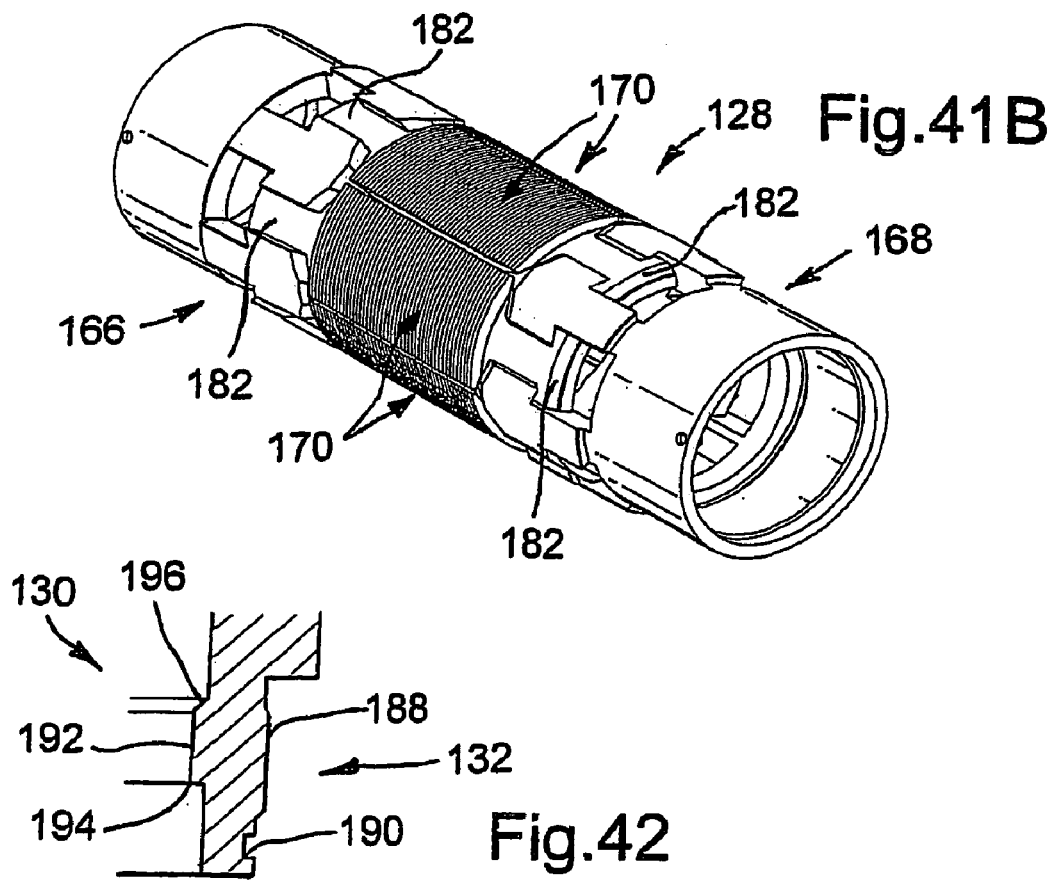
Fig.41B
Fig.42

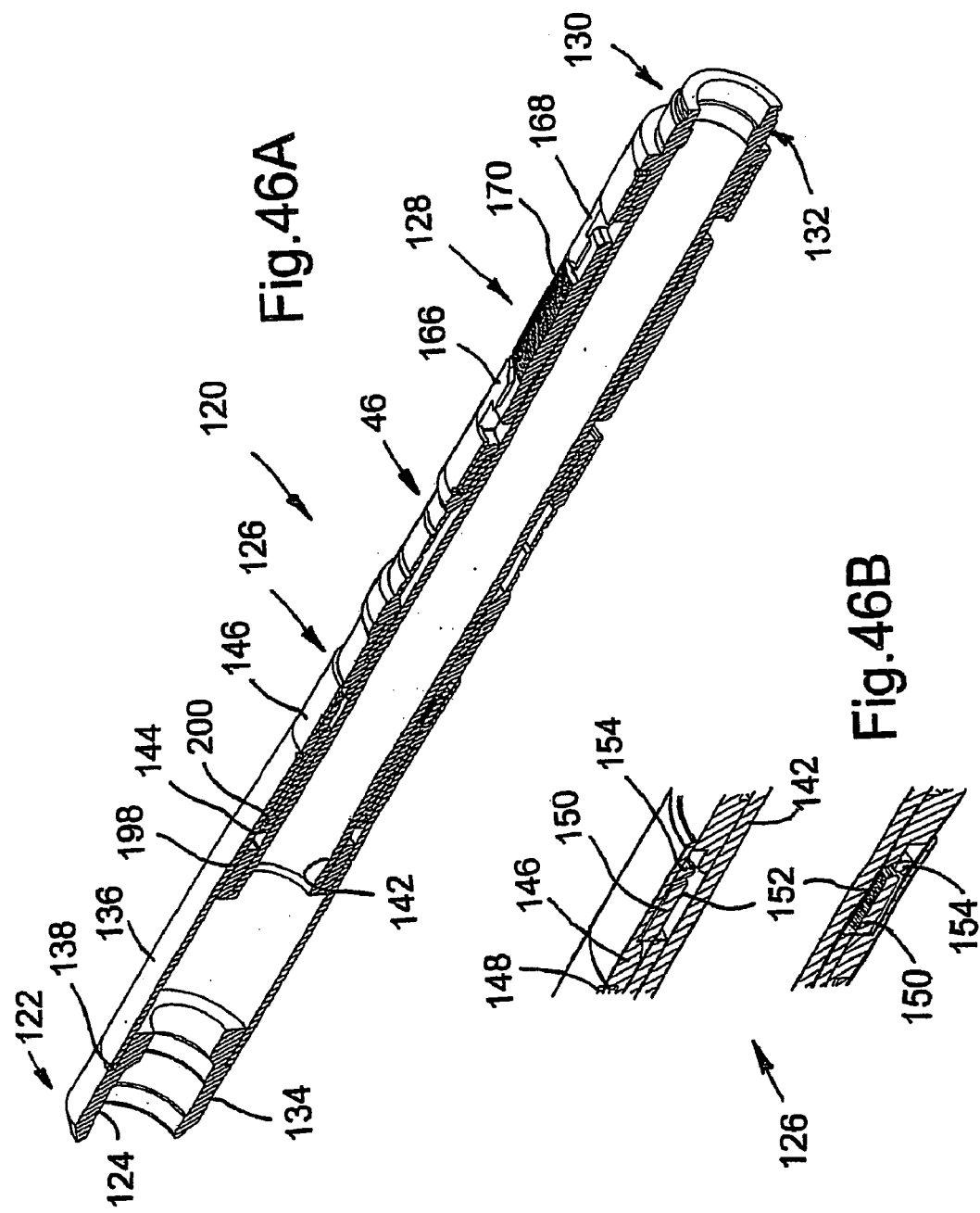

DEFORMABLE MEMBER

CROSS REFERENCE TO RELATED APPLICATIONS

This is a continuation patent application of U.S. patent application Ser. No. 11/114,488, filed Apr. 26, 2005 now U.S. Pat. No. 7,134,506, which is a divisional patent application of U.S. patent Ser. No. 10/336,848, filed Jan. 6, 2003, now U.S. Pat. No. 6,896,049, which is a continuation under 35 USC §120 of PCT/GB01/03072, filed Jul. 9, 2001, which published in English as WO 02/04783 and corresponds to British Patent Application GB 0016595.1, filed Jul. 7, 2000, the entire content of each of which is incorporated herein by reference.

FIELD OF THE INVENTION

The present invention relates to a deformable member. Particularly, but not exclusively, the present invention relates to a deformable member for use in a well tool, especially for providing a metal to metal seal, and to a well tool with a deformable member.

BACKGROUND OF THE INVENTION

It is known to provide metal to metal seals to carry out a wide variety of sealing operations within tubing such as surface fluid pipe lines and well tubing of an oil or gas well. Such metal to metal seals are complex, expensive to manufacture, must be preformed and often result in permanent deformation so that the seals cannot be reused. Also, it is known to provide resilient seals which do not provide metal to metal sealing in such tubing, are cheap and which are reusable, however, such resilient seals have disadvantages that they do not have the strength of metal to metal seals and cannot be used in aggressive environments which degrade the seal.

Furthermore, it is known to provide a wide variety of tools for carrying out well operations within tubing of a well, such as an oil or gas well, the tools requiring a seal to enable specific well operations to be carried out. Examples of such tools include tubing hangers, packers, bridge plugs, straddles, gravel-pack packers and the like. Each of such tools are often complex, including many interrelated parts, and require complex running, support, activating/deactivating and retrieving tools to achieve sealing and allow the well operation to be carried out using the tool. Furthermore, complex operations are often required to be performed in order to locate, activate/deactivate and/or retrieve the tools.

Similar problems are encountered with tools provided in tubing such as gas or oil pipelines located above ground.

Disadvantages associated with such tools are therefore the relative complexity of the tools, the complexity of the operations which are required to be carried out in order to locate, activate/deactivate and/or retrieve the tools, and the abovementioned disadvantages of presently known seals.

An annular seal is disclosed in U.S. Pat. No. 6,182,755 (Mansure) which includes a collapsible bellows. The bellows is expanded for insertion downhole to reduce its outer diameter and is set by compaction to provide a seal or anchor. However, the seal of U.S. Pat. No. 6,182,755 is not initially rigid, which will create problems during running in and tripping out of a borehole, when the seal is in the expanded position. Also, the bellows itself requires support through support shoulders to provide an effective seal/anchor; whilst embodiments are disclosed without such support shoulders, such would be unlikely to provide an effective seal/anchor in harsh downhole environments.

SUMMARY OF THE INVENTION

It is amongst the objects of the present invention to obviate or mitigate at least one of the foregoing disadvantages. Embodiments of the invention may provide an improved seal with the integrity of a metal to metal seal, but which may advantageously be applied to a wide variety of applications.

According to a first aspect of the present invention, there is provided a deformable member for use as a seal or anchor, said deformable member having a generally hollow cylindrical body defining a cylinder wall having a wall thickness which permits the cylinder wall to deform in response to an applied force, to form a ring of material around the circumference of the cylindrical body, the ring being generally upstanding from the surface of the cylinder wall.

The ring may be formed on the outer surface of the cylinder wall or the inner surface of the cylinder wall.

Conveniently the applied force is an axial force applied at an end of the cylinder. Alternatively the applied force is a radial force.

According to a second aspect of the present invention, there is provided a deformable member having a generally hollow cylindrical body defining a member wall, the wall having at least three circumferential lines of weakness therein, said lines of weakness being spaced along a main axis of the body, two of said lines of weakness being provided in one of an inner and outer surface of the wall and the other one of said lines of weakness being provided in the other one of said inner and outer surfaces of the wall, the axially outermost lines of weakness defining a zone of deformation of the body, wherein the member is deformable in the deformation zone in response to an applied force, in a direction transverse to said body main axis, said direction determined by the location of the other one of said lines of weakness in the wall.

Preferably, the applied force is an axial force. Alternatively, the applied force is a radial force. Preferably also the direction of deformation is determined by the location of the other one of said lines of weakness.

In this fashion, a deformable member may be provided, which member is deformable on application of an axial force thereon. The deformation occurs in the deformation zone of the member. This provides a wide number of uses for the deformable member, for example, as a metal to metal seal, and results in the member having a larger, or a smaller diameter in the zone of deformation. Sealing is achieved by deformation of the member in the deformation zone, to bring the member into contact with a secondary body with which it is desired to achieve sealing contact.

Preferably, the deformable member is used in well tools. In this fashion, the deformable member may form part of a well tool, wherein the member is deformable to carry out a sealing operation. The deformable member may be carried on a support member of the well tool.

According to a third aspect of the present invention, there is provided the deformable member of the second aspect of the invention for use in a well tool.

The deformable member may be movable between a substantially undeformed position and a deformed position. This allows the deformable member to be run into, for example, well tubing, in a first undeformed position before being forced into a second deformed position to carry out a desired well operation, by application of an axial force.

Alternatively, the deformable member may be initially partially deformed or otherwise preformed into a desired shape, and may be moveable between the partially deformed or preformed position and a further deformed position. This may assist in allowing controlling of a desired well operation, and/or may allow the deformable member to carry out a desired operation in both the partially deformed or preformed position and in the further deformed position.

The deformable member maybe carried on a support member of the well tool, and may form part of the well tool itself.

Preferably, the deformable member is locatable in a tube for providing sealing contact with an inner surface of the tube, by outward deformation of the deformable member into contact with the tube. Additionally or alternatively, a tube may be located within the deformable member for sealing contact therewith, by inward deformation of the deformable member into contact with an outer surface of inner tube.

Conveniently, the deformable member is of a deformable metal material, for providing metal to metal sealing with the tube, which is also of a metal material. The deformable member may be a carbon steel, stainless steel or other suitable non-ferrous alloy. Alternatively, the deformable member may be a plastics or composite material.

Conveniently, the deformable member is compressible axially to deform. The deformable member may be compressed by a secondary tool coupled to the deformable member or coupled to a well tool of which the deformable member may form part. Alternatively, the member may be deformed by an axial pressure force generated by fluid pressure in a tube in which the deformable member is located.

The deformable member may be elastically deformable, and may require a retaining force to be exerted thereon, to retain the elastically deformed member in a deformed position. After removal of the retaining force, the member returns to its original shape. Alternatively, the elastically deformable member may be of a pre-formed size which is larger than, and thus interferes with, a mating bore of a secondary body, such as a tube. Pressing of the seal into the bore may cause an elastic contraction of an outside diameter of the member, resulting in an energizing force, thus removing the need for axial compression to energize the seal. After removing the member from the bore, the member returns to its original size and shape. Preferably though, the deformable member is plastically deformable, requiring application of a force both to move the deformable member between undeformed and deformed positions. Preferably, the deformable member deforms by folding about the lines of weakness. The deformable member may be moved between a deformed and undeformed position through a number of deformation cycles, allowing multiple uses and reuses of the deformable member. Alternatively, the deformable member may be only once deformable. This may allow the deformable member to be used in a "one-shot" operation, for example, for a one-off, permanent or semi-permanent operation.

The lines of weakness may comprise open grooves or channels which close to allow the member to deform. Each groove or channel may be substantially V-shaped in cross section, or may be of any alternative cross-section which allows the grooves or channels to easily close. Preferably, the other one of said lines of weakness extends partially into the wall. This advantageously allows the deformable member to be deformed in the direction transverse to the body main axis in the desired direction, this direction being determined by the location of the axially inner one of said lines of weakness in the inner or outer wall surface, and by this line of weakness extending into the wall, this line of weakness creating "over-center" stress concentrations in response to an axial force. The other one of said lines of weakness maybe disposed in a position between the two axially outer lines of weakness, with respect to the main axis of the body. Conveniently, the lines of weakness are equidistantly spaced along the wall of the member.

According to a fourth aspect of the present invention, there is provided a deformable metal member for metal to metal sealing with a metal tube, the deformable member comprising a generally hollow cylindrical body defining a member wall, the wall having at least three circumferential lines of weakness therein, said lines of weakness being spaced along a main axis of the body, two of said lines of weakness being provided in one of an inner and outer surface of the wall and the other one of said lines of weakness being provided in the other one of said inner and outer surfaces of the wall, the axially outermost lines of weakness defining a zone of deformation of the body, wherein the member is deformable in the deformation zone in response to an applied force, in a direction transverse to said body main axis, to bring the member into metal to metal contact with the metal tube and to seal the member to the metal tube, said direction of deformation being determined by the location of the other one of said lines of weakness in the wall.

This advantageously allows a deformable metal member to be provided, which member is deformable on application of an applied force into sealing contact with a metal tube. It will be understood that references to a "seal" and to "sealing contact" are to contact between the deformable metal member and the tube which may provide an anchoring of the member and/or fluid-tight sealing of the member (liquid-tight or gas-tight sealing) with respect to the tube.

Preferably the applied force is an axial force. The two of said lines of weakness may be provided in the outer surface of the wall to form outer lines and the other one of said lines of weakness may be provided in the inner surface of the wall to form an inner line between the outer lines, such that the deformable member deforms in a direction substantially radially outwardly on application of the applied force. This may advantageously provide a single circumferential line of contact with a tube in which the deformable member is located. Further advantageously, this may present a sharp edge, or slightly radiused circumferential line of contact with the tube, with a high point-contact load, providing a relatively high, fully circumferential, radially directed force on the tube.

In one embodiment, two of said lines of weakness may be provided in the inner surface of the wall to form inner lines, whilst the other one of said lines of weakness may be provided in the outer surface of the wall to form an outer line of weakness. This advantageously allows the deformable member to be deformed inwardly for contacting a tube located within the deformable member.

In further embodiments of the invention, the other one of said lines of weakness provided in the wall is profiled so that it defines a channel having a substantially flat base and inclined side walls, the base having a further circumferential groove or channel therein extending into the wall. Where the other one of said lines of weakness is an inner line provided in the inner wall surface, this may advantageously result in the formation of a lip when the deformable member is deformed, the lip being of an outer diameter greater than the major expansion of the deformable member. It will be understood that references herein to the major expansion of the deformable member are to the greatest outer diameter of a main part of the deformable member in the region of the deformation zone, when the deformable member is deformed. The lip may advantageously be easily deformable to deform into an ovalised or damaged tube or other bore, and may further advantageously provide a low actuating energy seal for use in low pressure environments, and/or to provide a gas-tight seal with a tube or bore.

In an alternative embodiment, the substantially flat base of the other one of said lines of weakness in the wall includes two substantially V-shaped channels or grooves connected by a portion of the wall which is curved in cross-section, to provide a rounded lip when the deformable member is deformed.

In a still further alternative embodiment, the deformable member may further comprise a circumferential, substantially upstanding rib on a surface of the wall, the rib being disposed on the opposite side of the member and wall from the inner line of weakness, which rib engages into a wall of a tube on deformation of the deformable member. Preferably, there are two ribs provided on the outer surface of the wall, the ribs tapering outwardly from the surface and being adapted to engage into a tube in which the deformable member is located. Conveniently, each rib is substantially V-shaped in cross-section, and the ribs are axially spaced along the wall on either side of the part of the wall in which the other one of said lines of weakness is located, and inclined toward one another. Advantageously, this may cause the ribs to engage in the wall of the tube when the deformable member is deformed such that application of further axial force on the deformable member causes the ribs to further engage into the tube wall, further improving engagement.

In a yet further alternative embodiment, the other one of said lines of weakness may be located in the member wall axially closer to one of the two of said lines of weakness, such that the deformable member deforms non-symmetrically about the other one of said lines of weakness. Thus, advantageously, when the deformable member is in a deformed position, application of, for example, fluid pressure loading on the deformable member may exert a biased energizing load upon the deformable member.

In a still further alternative embodiment, there are four lines of weakness, two of said lines of weakness being provided in one of the inner and outer surfaces of the wall forming axially outer lines of weakness, and the other two of said lines of weakness provided in the other one of the inner and outer surfaces of the wall forming axially inner lines of weakness, to create a flat portion between the axially inner lines of weakness in one of the inner and outer wall surfaces. The axially inner lines of weakness determine the direction of deformation of the deformable member and may be provided in the inner surface of the wall. The flat portion defined between the two axially inner lines of weakness may carry ridges for engaging a tube in which the deformable member is located, when the member is deformed. The ridges may be circumferentially extending ridges, screw threads or the like. This may advantageously allow the deformable member to act as both an anchor within a tube and/or as a seal.

In further alternative embodiments, the outer surface of the flat portion defined between the two inner lines of weakness may be laminated with a sealing material which provides sealing with a tube in which the deformable member is located. The sealing material may be a plastics or elastomeric material such as Nitrile, Viton, Teflon (Trade Marks) or a relatively soft metal material. This may advantageously provide a seal under a low applied force, to allow gas-tight sealing to be achieved relatively easily.

In a yet further alternative embodiment, the outer surface of the flat portion defined between the two axially inner lines of weakness may include a circumferential groove in which a seal may be located. The seal may be of a plastics or elastomeric material.

In a still further alternative embodiment, there maybe four lines of weakness, provided alternately along the body in the outer and inner surfaces of the wall. This allows the deformable member to be simultaneously deformed outwardly and inwardly. The deformable member may therefore be deformed into engagement with both a tube in which the deformable member is located, and an inner tube located within the deformable member.

In yet further alternative embodiments, there may be at least five lines of weakness, three of said lines of weakness provided in one of the inner and outer surfaces of the wall, and the other two of said lines of weakness provided in the other one of the inner and outer surfaces of the wall. This creates a deformation zone between the axially outermost lines of weakness with folding deformation occurring between the outermost lines to create multiple circumferential lines of contact with one of a tube in which the deformable member is located and a tube located in the deformable member, whilst providing single circumferential line contact with the other one of the external and internal tubes. In a preferred such embodiment, the three ones of said lines of weakness are provided in the outer surface of the wall and form outer lines, whilst the other two ones of said lines of weakness are provided in the inner surface of the wall and form inner lines. This may provide double circumferential lines of contact with a tube in which the deformable member is located, and a single circumferential line of contact with a tube located in the deformable member. In further alternatives, there may be a plurality of lines of weakness.

The deformable member may further comprise a deformation aid to aid deformation of the member in response to the applied force. The deformation aid may comprise an elastomeric element such as an O-ring or preformed plastics or rubber insert. In one embodiment, the deformation aid may be provided in the generally hollow cylindrical body. This is particularly advantageous in that during deformation of the member, the aid may simply fill a void around which deformation of the member may take place. Alternatively, the deformation aid may comprise a garter spring.

In a still further alternative embodiment, the deformable member may serve as an anti-extrusion seal, to prevent extrusion of a secondary expandable seal. Such expandable seals may comprise expandable rubber or plastics based elements. Conventionally, such seals are carried by a carrier mandrel or the like. High differential pressures across the seal through an annulus defined between the mandrel and the bore of a tube in which it is located can cause seal extrusion, due to the low strength of the seal element material. Conventional anti-extrusion rings are provided in an attempt to prevent this, however, these do not expand to meet the seal bore, leaving a significant annular gap. The deformable member may be deformable into contact with the bore to close the annular gap and prevent extrusion of the seal. There may be provided two deformable members for surrounding the seal, to close the annular gap and seal the seal to the bore.

In an again further alternative embodiment, a collapse aid may be provided, serving to assist in moving the deformable member from a deformed position to an undeformed position. The collapse aid may be a sleeve adapted to be located around the deformable member and to abut the deformable member in the deformation zone, when the member is in a deformed position. This may advantageously allow a force to be exerted on the member to assist in moving it to an undeformed position. Thus, a direct and controlled recovery of the deformable member to an undeformed position may be possible without requiring application of a relatively high tensile loading upon the member. Recovery may be achieved by a combination of application of an axial tensile load and a force exerted by the collapse aid. This may be particularly of use in situations where, for example, high stresses involved in deforming the member cause permanent damage, making it difficult to retract the member with a purely axial tensile load thereon.

According to a fifth aspect of the present invention, there is provided a deformable member, the member comprising a body having a first, generally hollow cylindrical body portion of a first general wall thickness, and a second, hollow bulbous deformable body portion, at least part of the second, deformable body portion being of a wall thickness less than said first wall thickness of the first body portion, the second, deformable body portion being deformable in response to an applied force, in a direction transverse to a main axis of the body, to allow the member to deform.

According to a sixth aspect of the present invention, there is provided the deformable member of the fifth aspect for use in a well tool.

Preferably, the second, hollow bulbous deformable body portion has a maximum outside diameter greater than that of the first, generally hollow cylindrical body portion. This allows the deformable member to be deformed outwardly into contact with a tube in which the deformable member is located, to provide a soft, rounded contact with the tube wall.

Advantageously, this provides a progressive, distributed load over a relatively large surface contact area with the tube wall, avoiding high stress concentration nodes. This may be particularly suited to cyclic multiple deformation applications. Alternatively, the second, hollow bulbous deformable body portion may extend inwardly to engage a tubing located within the deformable member.

According to a seventh aspect of the present invention, there is provided a deformable member, the member comprising a body having a first, generally hollow cylindrical body portion of a first general wall thickness, and a second, hollow deformable body portion, at least part of the second, deformable body portion being of a wall thickness less than said first wall thickness of the first body portion, the second, deformable body portion being deformable in response to an applied force, in a direction transverse to a main axis of the body, to allow the member to deform.

According to an eighth aspect of the present invention, there is provided the deformable member of the seventh aspect for use in a well tool.

The first, generally hollow body portion may include a first part of the wall of the member body, and may define circumferentially extending shoulders for supporting and transferring force to the second, hollow deformable body portion.

The second hollow deformable body portion may include a second part of the wall of the member body. The second part of the wall may be defined between two circumferentially extending lines of weakness formed in one of an inner and outer surface of the member wall.

According to a ninth aspect of the present invention, there is provided a bridge plug for location in well tubing of a well borehole, for selectively sealing an annulus defined between the well tubing and the bridge plug from an internal bore of the bridge plug following setting of the bridge plug in the well tubing, the bridge plug including a deformable seal having a generally hollow cylindrical body defining a seal wall, the wall having at least three circumferential lines of weakness therein, said lines of weakness being spaced along a main axis of the body, two of said lines of weakness being provided in one of an inner and outer surface of the wall and the other one of said lines of weakness being provided in the other one of said inner and outer surfaces of the wall, the axially outermost lines of weakness defining a zone of deformation of the body, wherein the seal is deformable in the deformation zone in response to an applied force applied following setting of the bridge plug, in a direction transverse to said body main axis, said direction determined by the location of the other one of said lines of weakness in the wall.

This advantageously provides a bridge plug which can be run-in to well tubing in a running position, with a deformable seal of the bridge plug in an undeformed position. The bridge plug may then be set at a desired location within the well tubing and the seal deformed into engagement with the well tubing by applying a compressive load thereon.

Also advantageously, the bridge plug is actuateable to an unset position by applying an axial tensile load to the seal member so that the deformable seal is moved to the undeformed position and the bridge plug subsequently removed from the well.

Additional and/or alternative features of the deformable seal are defined above with reference to the deformable member of the first to third aspects of the present invention.

According to a tenth aspect of the present invention, there is provided a bridge plug for location in well tubing of a well borehole, for selectively sealing an annulus defined between the well tubing and the bridge plug from an internal bore of the bridge plug following setting of the bridge plug in the well tubing, the bridge plug including a deformable seal in the form of a deformable member as defined in any one of the first to sixth aspects of the present invention.

BRIEF DESCRIPTION OF THE DRAWINGS

Embodiments of the present invention will now be described, by way of example only, with reference to the accompanying drawings, in which:

FIGS. 4A and 4B are longitudinal sectional and perspective views, respectively, of a deformable member in accordance with a second embodiment of the present invention, shown in an undeformed position;

FIGS. 5A and 5B are longitudinal sectional views of the deformable member of FIGS. 4A and 4B, shown in a deformed position;

FIG. 5C is a longitudinally sectioned perspective view of the deformable member shown in FIG. 5B;

FIGS. 12A and 12C are longitudinal sectional and perspective views, respectively, of a deformable member in accordance with a sixth embodiment of the present invention, shown in an undeformed position;

FIG. 12B is an enlarged view of part of the deformable member shown in FIG. 12A;

FIGS. 13A and 13C are longitudinal sectional and perspective views, respectively, of the deformable member shown in FIGS. 12A to 12C, shown in a deformed position;

FIG. 13B is an enlarged view of part of the deformable member shown in FIG. 13A;

FIGS. 16A and 16C are longitudinal sectional and perspective views, respectively, of a deformable member in accordance with an eight embodiment of the present invention, shown in an undeformed position;

FIG. 16B is an enlarged view of part of the deformable member shown in FIG. 16A;

FIGS. 17A and 17C are longitudinal sectional and perspective views, respectively, of the deformable member of FIGS. 16A to 16C, shown in a deformed position;

FIG. 17B is an enlarged view of part of the deformable member shown in FIG. 17A;

FIGS. 20A and 20B are longitudinal sectional and perspective views, respectively, of a deformable member in accordance with a tenth embodiment of the present invention, shown in an undeformed position;

FIGS. 21A and 21C are longitudinal sectional and perspective views, respectively, of the deformable member of FIGS. 20A and 20B, shown in a deformed position;

FIG. 21B is an enlarged view of part of the deformable member shown in FIG. 21A;

FIG. 21D is a longitudinally sectioned perspective view of the deformable member shown in FIG. 21C;

FIGS. 24A and 24C are front and perspective views, respectively, of a deformable member in accordance with a twelfth embodiment of the present invention, shown in an undeformed position;

FIG. 24B is an enlarged view of part of the deformable member shown in FIG. 24A;

FIGS. 25A and 25C are front and perspective views, respectively, of the deformable member shown in FIGS. 24A to 24C, shown in a deformed position;

FIG. 25B is an enlarged view of part of the deformable member shown in FIG. 25A;

FIGS. 26A and 26B are longitudinal sectional and longitudinally sectioned perspective views, respectively, of a deformable member in accordance with a thirteenth embodiment of the present invention, shown in an undeformed position;

FIGS. 27A and 27B are longitudinal sectional and longitudinally sectioned perspective views, respectively, of the deformable member shown in FIGS. 26A and 26B, shown in a deformed position;

FIG. 27C is an enlarged view of part of the deformable member shown in FIG. 27A;

FIGS. 28A and 28C are longitudinal sectional and longitudinally sectioned perspective views, respectively, of a deformable member in accordance with a fourteenth embodiment of the present invention, shown in an undeformed position;

FIG. 28B is an enlarged view of part of the deformable member shown in FIG. 28A;

FIGS. 29A and 29C are longitudinal sectional and longitudinally sectioned perspective views, respectively, of the deformable member shown in FIGS. 28A and 28B, shown in a deformed position;

FIG. 29B is an enlarged view of part of the deformable member shown in FIG. 29A;

FIGS. 33A and 33B are longitudinal sectional and longitudinally sectioned perspective views, respectively, of a deformable member in accordance with a fifteenth embodiment of the present invention, shown in an undeformed position, and including a deformation aid;

FIGS. 34A and 34B are longitudinal sectional and longitudinally sectioned perspective views, respectively, of the deformable member shown in FIGS. 33A and 33B, shown in a deformed position;

FIG. 34C is an enlarged view of part of the deformable member shown in FIG. 34A;

FIGS. 39A and 39B are enlarged views of a ratchet mechanism of the bridge plug shown in FIG. 37B, and a perspective view of segments of the ratchet mechanism, respectively;

FIG. 40 is an enlarged view of the deformable member of the bridge plug shown in FIG. 37B;

FIGS. 41A and 41B are exploded perspective and perspective views, respectively, of a slip mechanism forming part of the bridge plug shown in FIG. 37A;

FIG. 42 is an enlarged view of a connecting lower end of the bridge plug shown in FIG. 37B;

FIGS. 46A and 47A are views, similar to the views of FIGS. 37A and 37B, of the bridge plug when it has been returned to an unset position, with the deformable member in the undeformed position, after having been set as shown in FIGS. 43A and 43B;

FIGS. 46B and 47B are enlarged views of the ratchet mechanism of the bridge plug in the unset position of FIGS. 46A and 47A, respectively;

DETAILED DESCRIPTION OF THE PREFERRED EMBODIMENT

Figure 1:
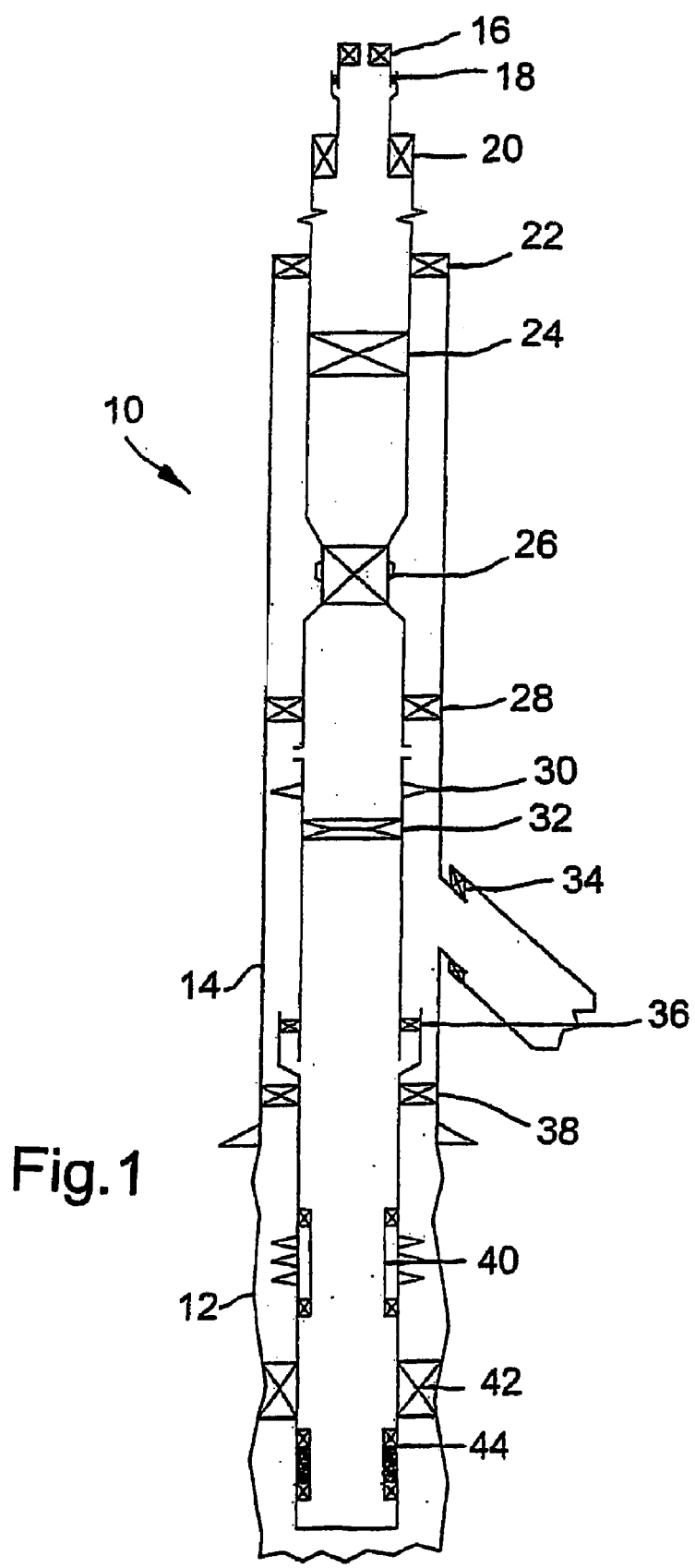
FIG. 1 is a schematic illustration of a number of interrelated well tools, each incorporating a deformable member in accordance with the present invention.

Referring firstly to FIG. 1, there is shown a schematic illustration of a number of interrelated well tools, each incorporating a deformable member (not shown in FIG. 1) in accordance with the present invention.

In FIG. 1, a well assembly indicated generally by reference numeral 10 is shown, located in a borehole 12 of an oil well. An upper portion of the borehole 12 is lined with steel casing 14 in a fashion known in the art. The well assembly 10 extends into the borehole 12 from surface, and includes a number of well tools, provided for carrying out a variety of well operations. Each of these well tools are in themselves well known in the art. However, each of the tools includes a deformable member in accordance with the present invention, which provides a sealing and/or anchoring function for each tool. Embodiments of such deformable members are shown in FIGS. 2A to 36B, and will be described in more detail below. However, generally speaking, each of the deformable members provides sealing and/or anchoring engagement with a tube in which the deformable member is located, and/or a tube located within the deformable member, to allow the well function to be carried out.

Typical tools shown in FIG. 1 and including a deformable member are a wireline stuffing box/coiled tubing injector head 16; a lubricator quick connect 18; a drilling Blow Out Preventer (BOP) 20; a wellhead, tree or tubing hanger 22; a bridge plug 24 (embodiments of which will be described in detail below with reference to FIGS. 26A to 39E); a retrofit plug 26 for engaging nipples; a packer 28; variable annular external and internal venturis 30, 32; a lateral borehole window 34; a Polished Bore Receptacle (PBR) 36; a liner hanger 38; a straddle 40, such as a high expansion straddle; an External Casing Packer (ECP) 42; and a gravel pack packer 44. Further uses are as part of high pressure/high temperature packers; high pressure/high temperature bridge plugs; liner hangers/liner laps; stackable straddles; selective monobore lock mandrels; high pressure/high temperature tool body seals (to British Standard 200 series O-ring size); tubing expansion joints; PBR stabs; horizontal tree plugs; sliding sleeves; true metal to metal (MTM) barrier valves (large bore); wireline stuffing boxes; and lubricator connectors. In particular, the deformable member has uses where MTM sealing/anchoring is required.

These and other uses of the deformable member will be discussed with reference to particular embodiments of the invention shown in FIGS. 2A to 25C and discussed below.

FIGS. 2A to 29C; 33A to 34C; and 51A to 54B show various longitudinal sectional, enlarged sectional, perspective and longitudinally sectioned perspective views of deformable members in accordance with various embodiments of the present invention, as described above, in undeformed and deformed positions.

Figure 2A:
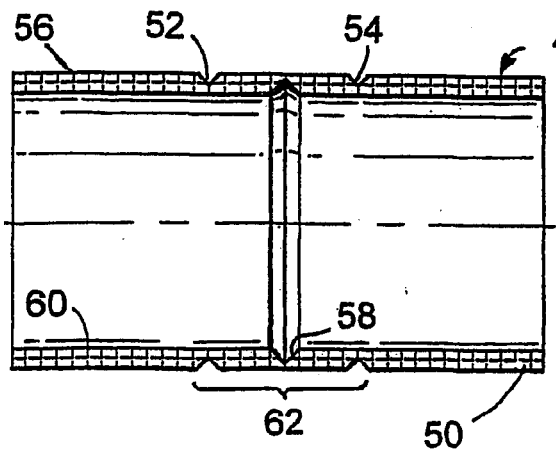
FIGS. 2A and 2C are longitudinal sectional and perspective views, respectively, of a deformable member in accordance with a first embodiment of the present invention, shown in an undeformed position.

Turning initially to FIGS. 2A to 3C, there is shown a deformable member indicated generally by reference numeral 46, in accordance with a first embodiment of the present invention. The deformable member 46 is shown in FIGS. 2A to 2C in an undeformed position, and comprises a generally hollow cylindrical body 48 defining a wall 50 of the member 46. The wall 50 includes three circumferential lines of weakness in the form of grooves, spaced equidistantly along the wall 50, with two grooves 52 and 54 provided in an outer surface 56 of the member wall 50, and the other groove 58 provided in an inner surface 60 of the member wall 50. Each of the grooves 52, 54 and 58 are substantially V-shaped in cross-section and are formed in the deformable member by a finishing process such as a milling or turning operation.

The deformable member 46 is hollow to allow the member to be located on a supporting member such as an inner mandrel or sleeve (not shown), to form part of a well tool or the like for running the deformable member into the borehole 12 of FIG. 1.

Figure 2B:
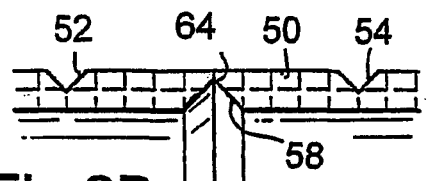
FIG. 2B is an enlarged view of part of the deformable member shown in FIG. 2A.

FIG. 2B is an enlarged view of part of the member wall 50 of the deformable member 46 shown in FIG. 2A, and shows the grooves 52, 54 and 58 in more detail. The axially outermost grooves 52 and 54 define a zone of deformation 62 of the deformable member 46, shown in FIG. 2A and, as will be described with reference to FIGS. 3A to 3C, deformation of the deformable member 46 is restricted to the deformation zone 62.

The two grooves 52 and 54 in the outer surface 56 of the member wall 50 extend into the wall 50 to a depth approximately equal to half the wall thickness. The other groove 58 in the inner surface 60, however, extends to a greater depth within the member wall 50 and, as shown in FIG. 2B, ideally extends to a depth greater than half the wall thickness of the member wall 50.

Figure 3A:
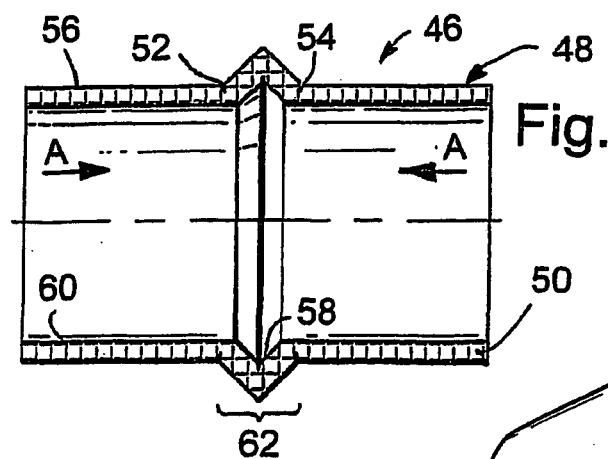
FIGS. 3A and 3C are longitudinal sectional and perspective views, respectively, of the deformable member of FIGS. 2A to 2C, shown in a deformed position.
Figure 3B:
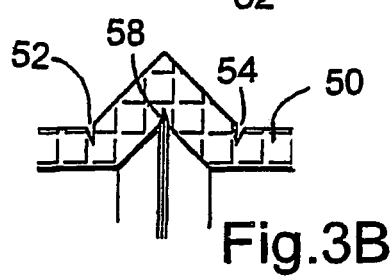
FIG. 3B is an enlarged view of part of the deformable member shown in FIG. 2A.
Figure 3C:
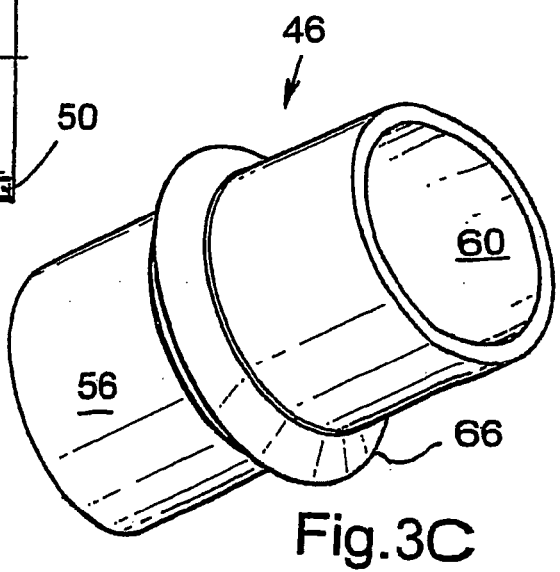
Figure 6A:
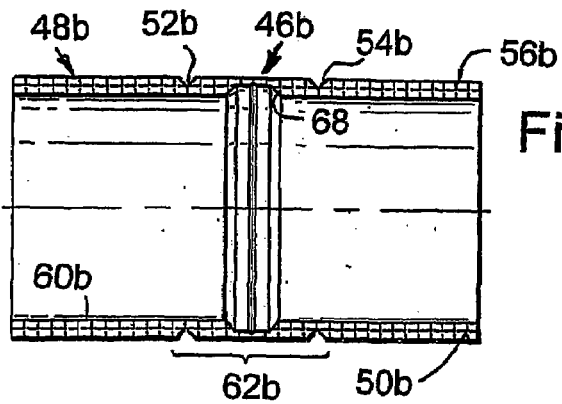
FIGS. 6A and 6C are longitudinal sectional and perspective views, respectively, of a deformable member in accordance with a third embodiment of the present invention, shown in an undeformed position.
Figure 6B:
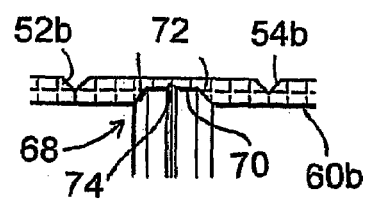
FIG. 6B is an enlarged view of part of the deformable member shown in FIG. 6A.
Figure 6C:
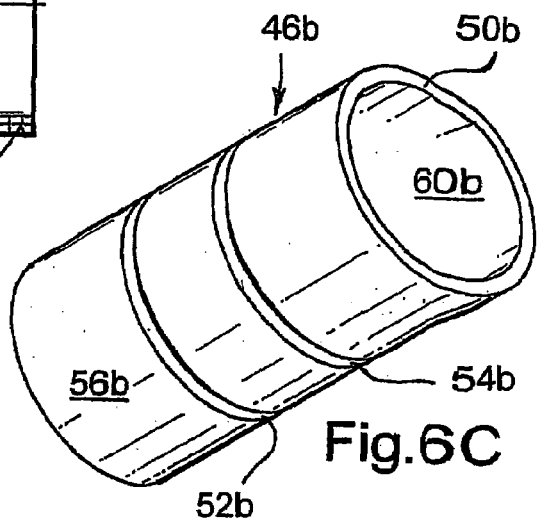

Turning now to FIGS. 3A to 3C, the deformable member 46 is shown in the deformed position. The member 46 is deformed in one of a number of fashions. Generally speaking, there are four generic energizing principles for deforming the member 46. These are the application of an axial force; the application of an axial force with spring assist; differential piston area; and relative degrees of freedom. Of course, a combination of such principles may be employed for deforming the member 46, and such principles apply for each of the deformable members discussed herein.

Considering axial loading, in this case, the member 46 is deformed by application of an axial force in the direction of the arrows A shown in FIG. 3A. To allow the deformable member 46 to deform, the member is constructed from a tough, malleable material which allows the member 46 to deform in the deformation zone 62. Typical suitable materials may be carbon steel, stainless steel or other malleable non-ferrous alloys. However, it will be understood that any other material having suitable material properties, such as a plastics material, may be selected.

The axial force is exerted upon the member 46 by a setting tool (not shown), and application of the axial force in the direction of the arrows A causes the member 46 to fold by deforming in the deformation zone 62, such that the member wall 50 deforms outwardly.

This deformation is achieved by causing the grooves 52, 54 and 58 to close on application of the axial force, as shown particularly in FIG. 3B, which is an enlarged view of the member wall 50 in the deformed position. When deformed, the member 46 "bulges" outwardly to engage a tube (not shown) in which the deformable member is located. Thus the compressive axial loading on the member 46 forces the expanding portion in the deformation zone 62 into contact with a mating part of the tube. This load must be sustained or otherwise retained to ensure continuous energizing of the member 46 in the deformed position. The expanded portion thus forms a contact with the mating part of the tube to provide a seal. A conventional type seal such as an O-ring or T-seal (not shown) is used to seal the non-expanding portion of the member 46 outside the deformation zone 62 to the mandrel, as will be described below.

The outer diameter of the member 46 in the region of the deformation zone 62 is determined by the axial distance between the groove 58 in the inner member wall surface 60 and the adjacent grooves 52 and 54 in the outer member wall surface 56. The member 46 is arranged to deform in an outward direction as shown in FIG. 3A by the location and depth of the groove 58, which extends into the member wall 50 to a greater depth than either of the grooves 52 or 54. It will be understood that this creates a high stress concentration at a tip 64 of the groove 58 when the axial force is applied, causing the member 46 to fold and deform outwardly. This forms a circumferential edge 66 shown in FIG. 3C, which provides a sharp, circumferential point load with a tube (not shown) such as a borehole casing in which the member 46 is located, to provide a high load radial force and create a good seal between the member 46 and the tube.

When it is desired to return the member 46 to the undeformed position of FIG. 2A, it is necessary only to apply an axial force to the member 46 in the opposite direction to the arrows A of FIG. 3A. This extends the member 46 and causes the member wall 50 in the region of the deformation zone 62 to return to the undeformed position of FIG. 2A. It will be appreciated by persons skilled in the art that, depending upon the selection of the material for the deformable member 46, the member may be either plastically or elastically deformable. Where the member 46 is plastically deformable, the member will remain in a deformed or undeformed position until a force is applied to the member to move it to the other position.

Where the member 46 is elastically deformable, the member will be resilient and will tend to return to either a deformed or undeformed position in the absence of an activating force retaining the member in the desired position.

The spring assisted energizing principle functions in conjunction with the application of an axial load as discussed above. A spring (not shown) is provided, typically a compression type spring, located in line with the direction of the applied axial load, in the direction of the arrows A of FIG. 3A. This is beneficial both in preventing de-energizing through a backlash and in preventing de-energizing due to creep. In the case of preventing de-energizing through backlash, the inclusion of such a spring allows the axial loading on the member 46 to remain relatively constant in the event that any mechanical backlash is present in a load-locking system, such as a ratchet provided on a bridge plug, as will be described in more detail below. In the case of preventing de-energizing due to creep, it is considered possible that the member 46 will be subject to additional deformation under the influence of the failure mechanism known as "creep". In the event of this occurring, any loss of energizing load experienced due to, for example, shortening of the member 46, will be compensated for by the spring.

The differential piston area and degree of freedom energizing principles will be discussed in more detail with reference to FIGS. 30 to 32 below.

The deformable member 46 shown in FIGS. 2A to 3C has particular applications in downhole well assemblies as a static seal; to provide flow control for a borehole or tubing; and in non-flow type applications.

As a static seal, the deformable member 46 may be provided as part of a bridge plug, such as the bridge plug 24 of FIG. 1 (as will be described in more detail with reference to FIGS. 37A to 50E below), a packer such as the packer 28, an ECP such as the ECP 42, as well as in tool body connections and pipeline/flow line connections.

To provide flow control, the deformable member 46 may be provided as part of a variable annular venturi, such as the venturis 30 and 32 (FIG. 1), which provide flow control in an annular flow area defined between a tube in which the member 46 is located and the tool and string to which the member 46 is connected. When the member 46 is in the undeformed position, fluid flow occurs through a full annular flow area; partial deformation to a position between the undeformed position of FIG. 2A and the deformed position of FIG. 3A causes a partial restriction of the flow area, whereas full deformation of the member 46 to the position shown in FIG. 3A causes full closure of the annular flow area. Further flow control applications are as an alternate sliding side door, which operates in a similar fashion to the venturi 30, 32, with the member 46 provided within a self-contained ported annular housing (not shown). The member 46 is deformed between the undeformed and deformed positions to provide on/off control of flow from tubing coupled to the member 46 to an external annulus, and vice-versa.

Non-flow applications of the deformable member 46 include as a wireline sidewall cutter incorporating the deformable member 46. In this case, the member 46 is provided as part of a tool located in a casing, together with a wireline located externally of the member 46, in an annulus defined between the casing wall and the member 46. Deformation of the member 46 to the deformed position of FIG. 3A causes the wireline to be crimped or cut against the wall of the tube. Equally, the member 46 can be provided within a casing to act as a tubing cutter or crimper. The high circumferential point load obtained through contact between the circumferential edge 66 of the member 46 and a tube acts to crimp or cut the tube when the point load exceeds the yield point of the tube material.

In a similar fashion, the member 46 can be provided as part of a tool for obtaining electrical connection through, for example, a plastics membrane lined tube, wherein, upon deformation of the member 46 to the deformed position, the plastics membrane is perforated, to obtain metal to metal electrical connection through the membrane, between the member 46 and the tube.

Finally, the member 46 can be used as part of a casing scraper tool, deformed into light contact with, for example, a casing wall. The member 46 is then reciprocated within the casing to remove debris from the casing wall. In a similar fashion, the member 46 can be provided as part of a debris barrier/junk catcher tool, where the member 46 is deformed into light contact with the casing wall. This provides a barrier against the passage of debris into the casing below the member.

As discussed above, FIGS. 4A to 25C; 33A to 34C and 51A to 54B disclose deformable members in accordance with alternative embodiments of the present invention, similar to the deformable member 46 of FIGS. 2A to 3C. For clarity, only the differences between the deformable members of FIGS. 4A to 25C and 33A to 34C relative to the deformable member 46 of FIGS. 2A to 3C will be discussed herein. Like components of the deformable members of FIGS. 4A to 25C with the deformable member 46 and subsequent embodiments share the same reference numerals, with the addition of the letters "a", "b", "c" etc, for each new embodiment.

FIGS. 4A to 5C show a deformable member indicated generally by reference numeral 46a, in accordance with a second embodiment of the present invention. The grooves 52a and 54a are provided in an inner surface 60a of a wall 50a of the member 46a, and the groove 58a is provided in an outer surface 56a of the member wall 50a. The grooves 52a and 54a define the zone of deformation 62a of the member 46a. The groove 58a in the member wall outer surface 56a extends to a depth greater than half the wall 50a thickness, in a similar fashion to the groove 58 in member 46.

In this fashion, when an axial force is applied in the direction of the arrows A shown in FIG. 5A, the member 46a is deformed inwardly, to engage a tube (not shown) located within the deformable member 46a. This deformation occurs in the same fashion as for the deformable member 46 of FIGS. 2A to 3C, forming a circumferential edge 66a, shown in FIG. 5C, for engaging the tube.

The deformable member 46a has numerous applications in downhole well assemblies, including as a drilling BOP such as the BOP 20, a wireline stuffing box such as the stuffing box/coiled tubing injector head 16, a variable venturi such as the internal venturi 32, and as a pipe clamp. Other applications of the member 46a exist as will readily be understood by persons skilled in the art. However, generally speaking, it will be understood that the deformable member 46a provides anchoring/sealing engagement with a tube located within the hollow member 46a when it is moved to the deformed position of FIGS. 5A to 5C.

FIGS. 6A to 7C show a deformable member indicated generally by reference numeral 46b, in accordance with a third embodiment of the present invention. The deformable member 46b includes two grooves 52b and 54b provided in an outer surface 56b of a wall 50b of the member 46b, similar to the grooves 52 and 54 in the member 46. The other line of weakness defines a channel 68, shown more clearly in the enlarged view of FIG. 6B. The channel 68 has a substantially flat base 70 with inclined side walls, and is provided in an inner surface 60b of the member wall 50b. A further circumferential groove 74, substantially V-shaped in cross section, similar to the grooves 52, 54 and 58 of member 46, is provided in the flat base 70 of the channel 68.

Figure 7A:
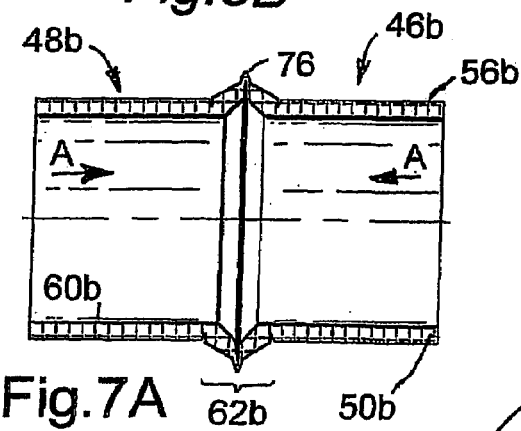
FIGS. 7A and 7C are longitudinal sectional and perspective views, respectively, of the deformable member of FIGS. 6A to 6C, shown in a deformed position.
Figure 7D:
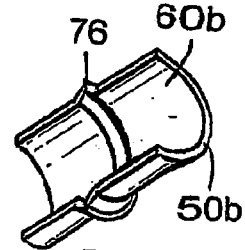
FIG. 7D is a longitudinally sectioned perspective view of the deformable member shown in FIG. 7C.
Figure 7B:
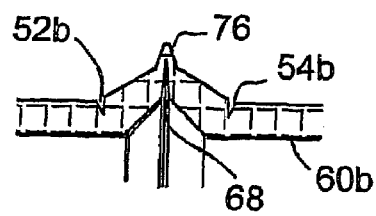
FIG. 7B is an enlarged view of part of the deformable member shown in FIG. 7A.
Figure 7C:
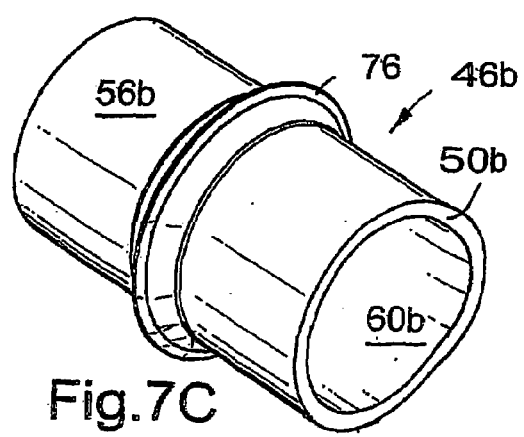

When the member 46b is deformed on application of an axial force A, shown in FIG. 7A, the profile of the channel 68 causes a lip 77, best shown in FIGS. 7B to 7D, to be formed at a radially outer extreme of the member 46b, in the region of the deformation zone 62b. The lip 76 is of an outer diameter greater than the major expansion of the deformable member 46b. The lip 76 is relatively soft and deformable, and has particular advantages in allowing the member 46b to be located in an ovalised or damaged tube or other bore, as well as providing a seal activated by a low actuating energy, for use in low pressure environments, and/or to provide a gas-tight seal with a tube or bore. This is achieved due to deformation of the lip 76 of the member 46b on contact with the tube or bore in which the member is located, when moved to the deformed position of FIGS. 7A to 7D.

The deformable member 46b has particular applications in downhole well assemblies as an ECP such as the ECP 42, a bridge plug, such as the bridge plug 24 shown in FIG. 1 (as will be described in more detail with reference to FIGS. 37A to 50E below), as well as a packer such as the packer 28.

FIGS. 8A to 9C show a deformable member indicated generally by reference numeral 46c, in accordance with a fourth embodiment of the present invention. The member 46c is similar to the member 46b of FIGS. 6A to 7D, and includes two grooves 52c and 54c provided in an outer surface 56c of a wall 50c of the member 46c. Also, a channel 68c is defined in an inner surface 60c of the member wall 50c, similar to the channel 68 of FIG. 6A.

Figure 8A:
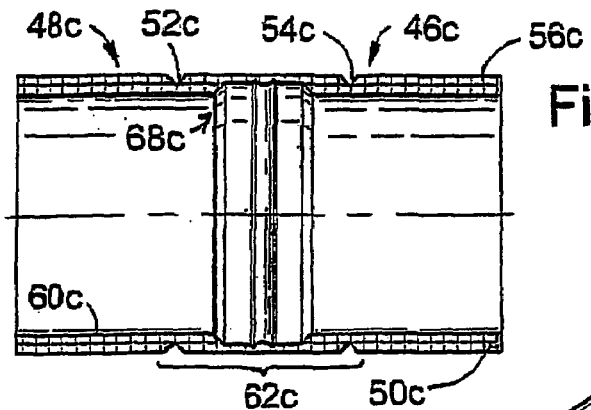
FIGS. 8A and 8C are longitudinal sectional and perspective views, respectively, of a deformable member in accordance with a fourth embodiment of the present invention, shown in an undeformed position.
Figure 8C:
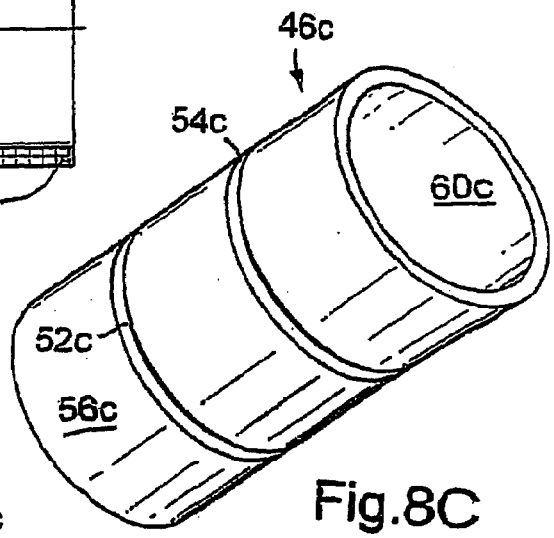
Figure 8B:
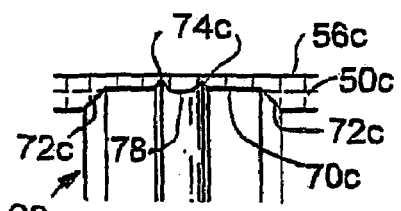
FIG. 8B is an enlarged view of part of the deformable member shown in FIG. 8A.

The channel 68c, as shown in FIG. 8B, includes a substantially flat base 70c with inclined side walls 72c. Two circumferentially extending grooves 74c are provided in the flat base 70c of the channel 68c, and the grooves 74c are connected by a curved portion 78 of the inner wall surface 60c.

Figure 9A:
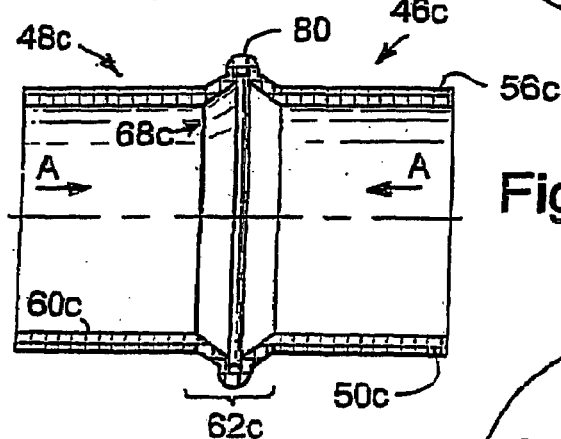
FIGS. 9A and 9C are longitudinal sectional and perspective views, respectively, of the deformable member of FIGS. 8A to 8C, shown in a deformed position.
Figure 9C:
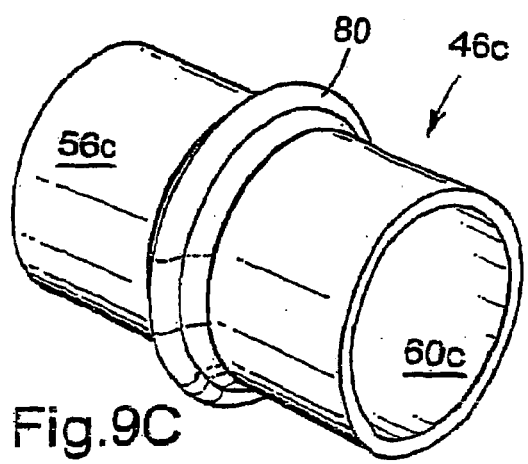
Figure 9B:
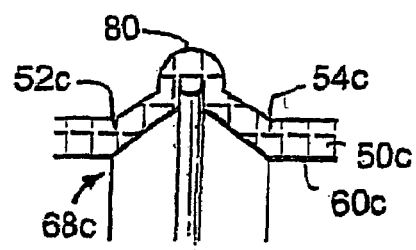
FIG. 9B is an enlarged view of part of the deformable member shown in FIG. 9A.
Figure 10A:
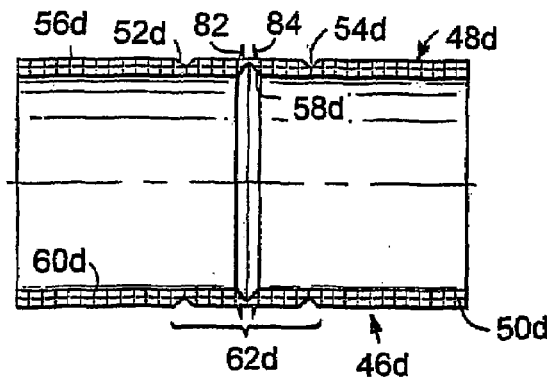
FIGS. 10A and 10C are longitudinal sectional and perspective views, respectively, of a deformable member in accordance with a fifth embodiment of the present invention, shown in an undeformed position.
Figure 10B:
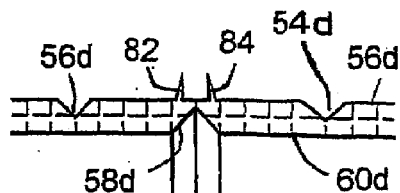
FIG. 10B is an enlarged view of part of the deformable member shown in FIG. 10A.
Figure 10C:
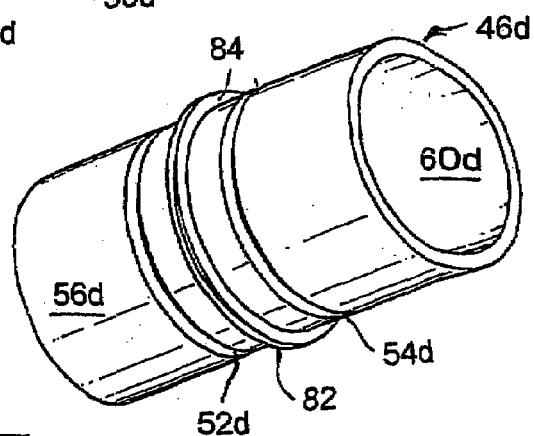
Figure 11A:
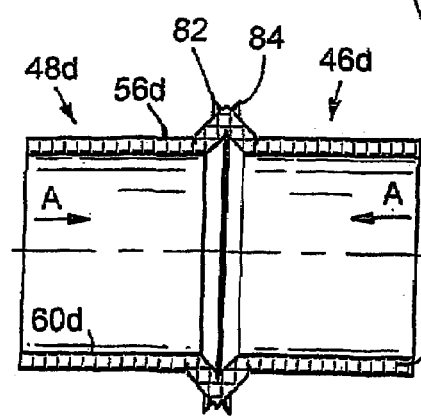
FIGS. 11A and 11C are longitudinal sectional and perspective views, respectively, of the deformable member of FIGS. 10A to 10C, shown in a deformed position.
Figure 11C:
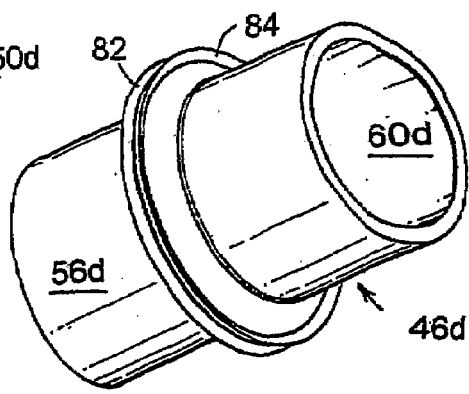
Figure 11B:
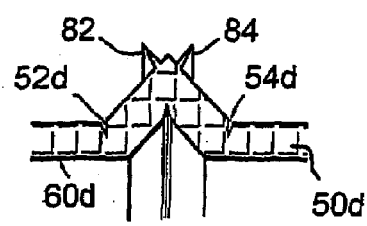
FIG. 11B is an enlarged view of part of the deformable member shown in FIG. 11A.
Figure 14A:
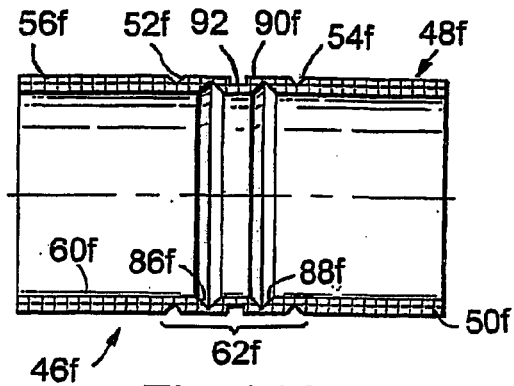
FIGS. 14A and 14C are longitudinal sectional and perspective views, respectively, of a deformable member in accordance with a seventh embodiment of the present invention, shown in an undeformed position.
Figure 14B:
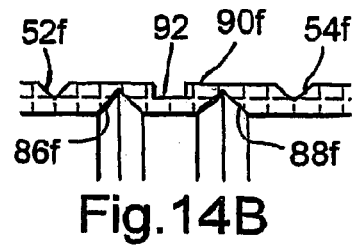
FIG. 14B is an enlarged view of part of the deformable member shown in FIG. 14A.
Figure 14C:
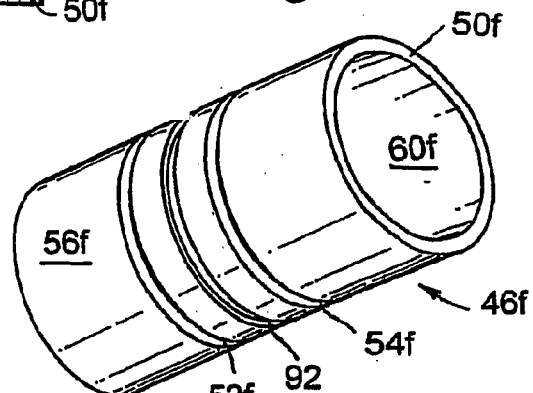
Figure 15A:
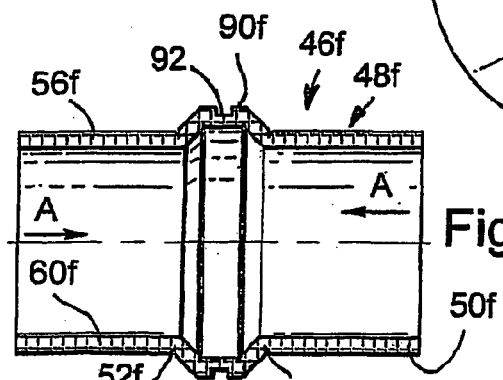
FIGS. 15A and 15C are longitudinal sectional and perspective views, respectively, of the deformable member shown in FIGS. 14A to 14C, shown in a deformed position.
Figure 15B:
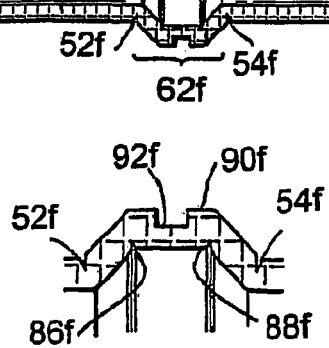
FIG. 15B is an enlarged view of part of the deformable member shown in FIG. 15A.
Figure 15C:
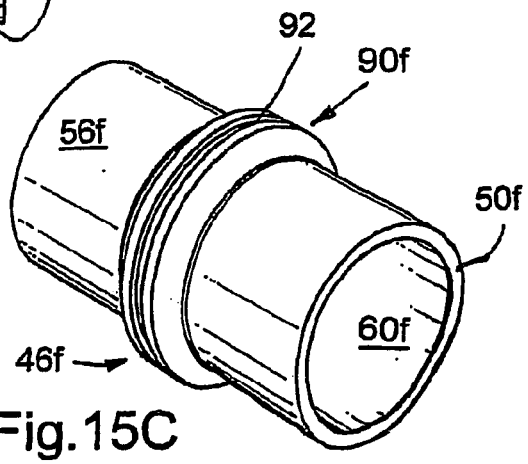
Figures 18A, 18B, 18C:
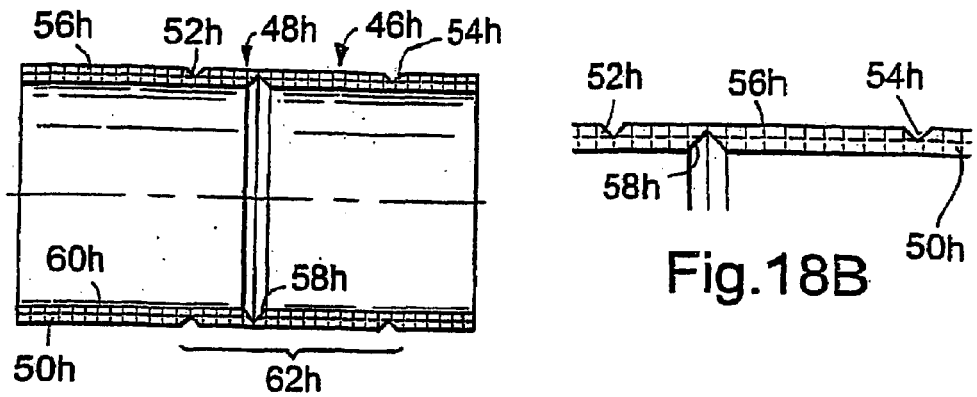
FIGS. 18A and 18C are longitudinal sectional and perspective views, respectively, of a deformable member in accordance with a ninth embodiment of the present invention, shown in an undeformed position.
FIG. 18B is an enlarged view of part of the deformable member shown in FIG. 18A.

When the member 46c is moved to the deformed position, shown in FIGS. 9A to 9C, by application of an axial force in the direction A (FIG. 9A), the member 46c is deformed in the deformation zone 62c, and the curved wall portion 78 is deformed outwardly to define a rounded lip 80, best shown in the enlarged view of FIG. 9B and the perspective view of FIG. 9C.

The deformable member 46c has particular applications similar to those of the member 46b of FIGS. 6A to 7C. However, in addition, the member 46c may be suitable for dynamic applications, such as to provide flow control for a borehole or tubing, similar to the deformable member 46 of FIGS. 2A to 3C.

FIGS. 10A to 11C show a deformable member indicated generally by reference numeral 46d, in accordance with a fifth embodiment of the present invention. The member 46d is substantially identical to the member 46 of FIGS. 2A to 3C. However, the member 46d includes two upstanding ribs 82 and 84 on an outer surface 56d of the member 46d. The ribs 82 and 84 are provided in the region of the deformation zone 62d, and are axially spaced either side of a groove 58d in an inner surface 60d of the member wall 50d, and are inclined towards one another. Each rib 82 and 84 is substantially V-shaped in cross-section, such that, when the member 46d is moved to the deformed position of 56e of the member wall 50e, and grooves 86 and 88 in an inner surface 60e of the member wall 50e.

The grooves 86 and 88 are similar to the groove 58 in the member 46 of FIGS. 2A to 3C and extend into the member wall 50c to a depth greater than half the wall thickness, as shown in particular in the enlarged view of FIG. 12B. An outer portion 90 of the wall 50e is defined between the grooves 86 and 88 in the inner wall surface 60e. The grooves 86 and 88 and the wall portion 90 are such that, when the member 46e is moved to the deformed position shown in FIGS. 13A to 13C, on application of an axial force in the direction A (FIG. 13A), the member 46e is deformed in the deformation zones 62e, and bulges outwardly, such that the wall portion 90 engages a tube in which the member 46e is located. This spreads the force exerted on the tube over a greater surface area, reducing the likelihood of damage to the tube.

Furthermore, the wall portion 90 can be laminated with a sealing material (not shown) such as Nitrile, Viton, or Teflon (trade marks), to provide a gas-tight seal with the tube, whereby sealing is achieved with a relatively low energizing force. This provides a high-pressure and high-temperature sealing capability of the member 46e. In an alternative embodiment the member 46e is laminated with a relatively soft metal material (not shown), to provide a metal to metal seal at a relatively low energizing force.

The deformable member 46e has particular applications as a bridge plug, such as the bridge plug 24 (as will be described below with reference to FIGS. 37A to 50E), as a packer such as the packer 28, a liner hanger such as the hanger 38, or as an anchor system. Also, the deformable member 46e may have dynamic applications such as for providing flow control through borehole or tubing, in a similar fashion to the member 46 of FIGS. 2A to 3C.

FIGS. 14A to 15C show a deformable member indicated generally by reference numeral 46f, in accordance with a seventh embodiment of the present invention. The member 46f is similar to the member 46e of FIGS. 12A to 13C. A wall portion 90f of the member 46f, shown in particular in the enlarged view of FIG. 14B, includes a circumferential groove 92 which carries a seal, such as a plastics or elastomeric seal, to improve sealing with a tube in which the member 46f is located, when moved to the deformed position of FIGS. 15A to 15C.

FIGS. 16A to 17C shows a deformable member indicated generally by reference numeral 46g, in accordance with an eighth embodiment of the present invention. The member 46g is similar to the member 46e of FIGS. 12A to 13C, and a portion 90g of member wall 50g carries a plurality of ridges 94, shown in particular in the enlarged view of FIG. 16B. The ridges 94 extend around the circumference of the portion 90g as shown in FIG. 16C, and are either a simple screw thread, or individual circumferentially extending ridges.

The deformable member 46g has general applications as an anchor and/or a seal with multiple point contact with a tube in which the member 46g is located. The ridges 94 penetrate the tube to fix the member 46g in position. The member 46g has particular applications as a bridge plug, such as the bridge plug 24 (as will be described with reference to FIGS. 37A to 50E below), a packer such as the packer 28, a liner hanger such as the liner hanger 38, or as an anchor system.

FIGS. 18A to 19C show a deformable member indicated generally by reference numeral 46h, in accordance with a ninth embodiment of the present invention. The member 46h is similar to the member 46 of FIGS. 2A to 3C in that it includes two grooves 52h and 54h in an outer surface 56h of a member wall 50h, and a groove 58h in an inner surface 60h of the member wall 50h. However, the groove 58h is axially closer to the groove 52h than the groove 54h. This is shown in particular in the enlarged view of FIG. 18B.

Figures 19A, 19B, 19C:
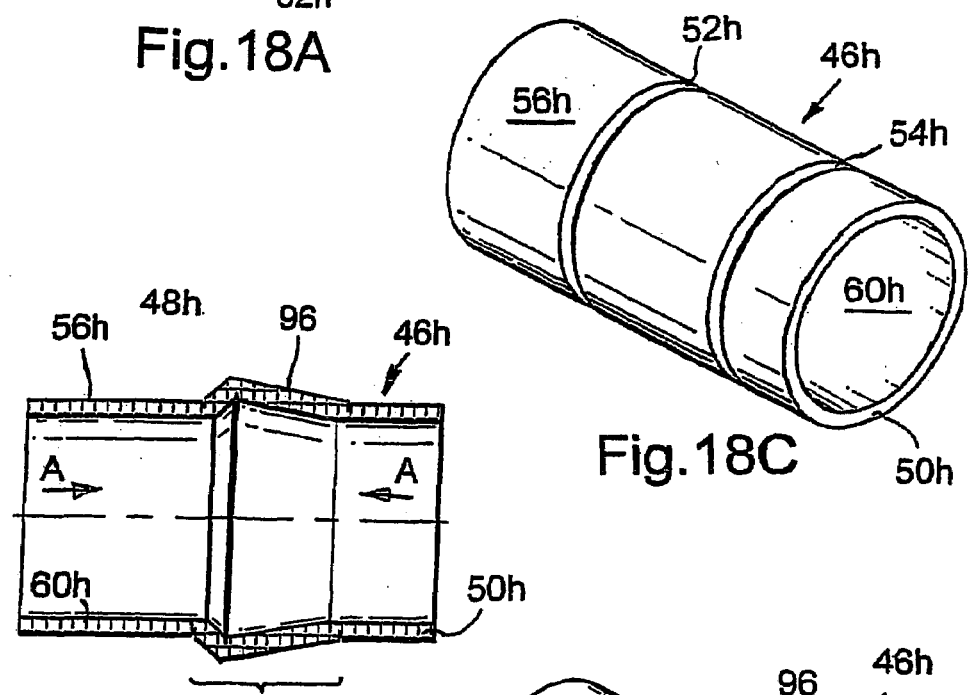
FIGS. 19A and 19C are longitudinal sectional and perspective views, respectively, of the deformable member shown in FIGS. 18A to 18C, shown in a deformed position.
FIG. 19B is an enlarged view of part of the deformable member shown in FIG. 19A.
Figure 22A:
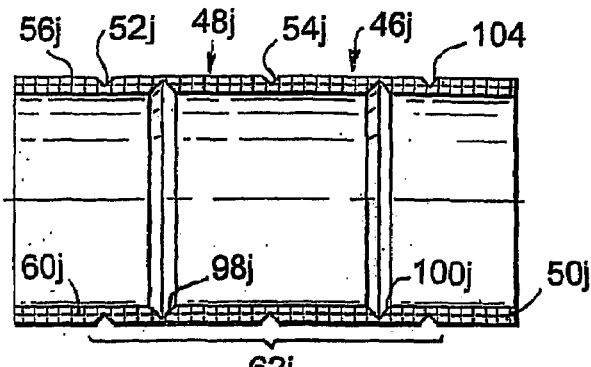
FIGS. 22A and 22B are longitudinal sectional and perspective views, respectively, of a deformable member in accordance with an eleventh embodiment of the present invention, shown in an undeformed position.
Figure 22C:
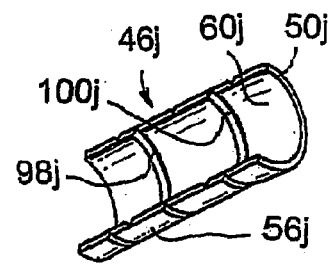
FIG. 22C is a longitudinally sectioned perspective view of the deformable member shown in FIG. 22B.
Figure 23A:
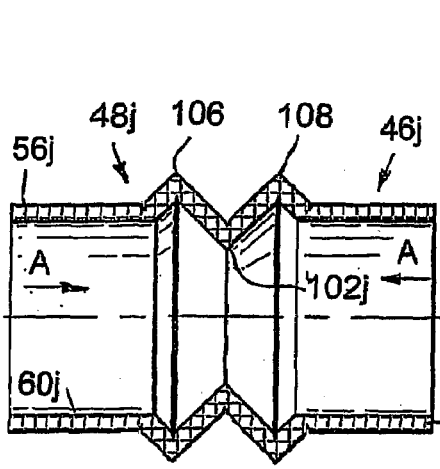
FIGS. 23A and 23C are longitudinal sectional and perspective views, respectively, of the deformable member shown in FIGS. 22A to 22C, shown in a deformed position.
Figure 22B:
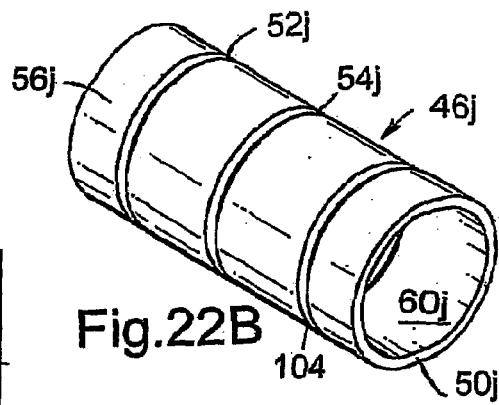
Figure 23B:
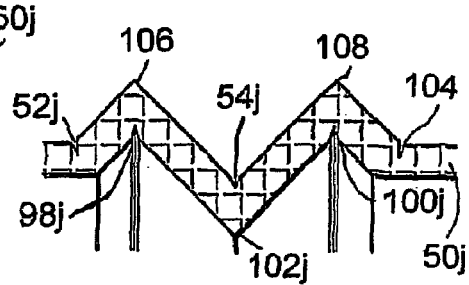
FIG. 23B is an enlarged view of part of the deformable member shown in FIG. 23A.
Figure 23C:
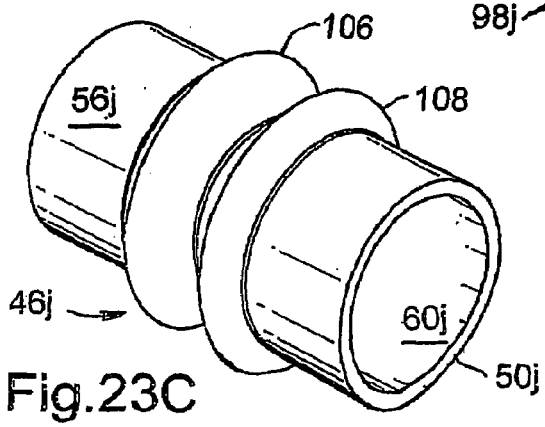
Figure 23D:
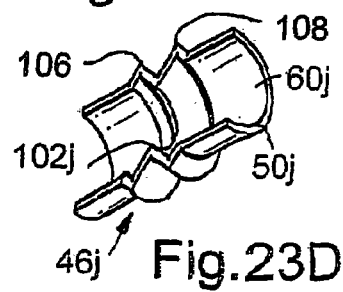
FIG. 23D is a longitudinally sectioned perspective view of the deformable member shown in FIG. 23C.

When moved to the deformed position of FIGS. 19A to 19C, this causes the member 46h to deform in the deformation zone 62h in the fashion shown in FIG. 19B, non-symmetrically about groove 58h. This provides an energizing load bias under pressure, as will be described in more detail below with reference to FIGS. 31 and 32, with greater deformation taking place in a longer portion 96 of the member 46h.

The deformable member 46h has particular applications in the same area as the deformable member 46 of FIGS. 2A to 3C.

FIGS. 20A to 21D show a deformable member indicated generally by reference numeral 46i, in accordance with a tenth embodiment of the present invention. The member 46i includes two grooves 52i and 54i provided in an outer surface 56i of the member wall 50i, and two grooves 98 and 100 formed in an inner surface 60i of the member 50i. The grooves 52i, 98, 54i and 100 are provided alternately in the outer and inner wall surfaces 56i and 60i respectively, along the length of the member 46i. The grooves 98 and 100 are similar to the groove 58 of the member 46 shown in FIGS. 2A to 3C, and extend into the wall 50i to a depth greater than half the wall thickness. When the member 46i is moved to the deformed position of FIGS. 21A to 21D, on application of an axial force in the direction of the arrows A (FIG. 21A), the member deforms in the deformation zone 62i both inwardly and outwardly, as best shown in the enlarged view of FIG. 21B.

This forms an outer circumferential edge 66i for engaging a tube in which the member 46i is located, and an inner circumferential edge 102, for engaging a tube located within the hollow member 46i.

The member 46i has particular applications similar to those of the member 46 of FIGS. 2A to 3C and the member 46a of FIGS. 4A to 5C, in combination.

FIGS. 22A to 23E show a deformable member indicated generally by reference numeral 46j, in accordance with an eleventh embodiment of the present invention. The member 46j is similar to the member 46i of FIGS. 20A to 21D, except that it includes five lines of weakness, with an additional groove 104 provided in an outer surface 56j of member wall 50j. This provides two circumferential edges 106 and 108 in the outer wall surface 56j when the member 46j is moved to the deformed position of FIGS. 23A to 23D. This affords improved contact with a tube in which the member 46j is located, together with engagement with a tube located in the member 46j, through contact with an edge 102j in the inner wall surface 60j. The deformable member 46j has applications similar to the member 46i of FIGS. 20A to 21D, including the above-noted advantages.

FIGS. 24A to 25C show a deformable member indicated generally by reference numeral 46k, in accordance with a twelfth embodiment of the present invention. The deformable member 46k operates to move between deformed and undeformed positions in a similar fashion to the deformable members of FIGS. 2A to 23D, but is of a different structure, as will be described herein.

The deformable member 46k comprises a body having a first generally hollow cylindrical portion 110 and a second hollow bulbous portion 112. The hollow cylindrical portion 110 has a member wall 114 of a first general wall thickness, and the bulbous portion 112 has a wall 116 which varies in thickness to a minimum wall thickness at the area 113 where the outside diameter of the bulbous portion 112 is greatest.

The difference in the wall thickness between the hollow cylindrical portion 110 and the bulbous portion 112 is shown in particular in the enlarged view of FIG. 24B.

FIGS. 25A to 25C show the deformable member 46k when it has been moved to the deformed position, on application of an axial force in the direction of the arrows A, shown in FIG. 25A, in similar fashion to the deformable members of FIGS. 2A to 23D. Application of the axial force compresses the bulbous portion 112, which deforms and "bulges" outwardly, in a similar fashion to the portion of the deformable member 46, in the deformation zone 62. This brings an outer surface 118 of the bulbous portion 112 into contact with a tube in which the member 46k is located for anchoring and/or sealing engagement therewith.

The rounded nature of the bulbous portion 112 ensures that a soft, rounded contact is obtained between the outer surface 118 and the tube, and provides a progressive, distributed load, ensuring that high stress-concentration nodes do not form in the member 46k on deformation. The member 46k is generally suited to cyclical expansion applications, and has particular applications in downhole well assemblies as a dynamic metal to metal seal, such as used in reciprocating pistons or tubing expansion joints; as an interference fit seal using smooth leading edges of the bulbous portion 112 to provide a press-fit into a tube or seal bore; as tool body connections, PBR seals such as the PBR 36, or as lubricator quick connect seals; and as a non-penetrating, non-damaging seal for, in particular, plastic coated tubes or materials suspectable to corrosion cell formation through a damaged passive layer.

FIGS. 26A to 27B show a deformable member indicated generally by reference numeral 46l in accordance with a thirteenth embodiment of the present invention. The deformable member 46l is the most structurally simple form of deformable member according to the present invention. The member 46l comprises a hollow cylindrical body 48l, which is shown in FIGS. 26A and 26B in an undeformed position.

FIGS. 27A to 27C show the deformable member 46l in a deformed position, following application of an axial force in the direction of the arrows A of FIG. 27A. This causes the wall 50l of the body 48l to deform to form a ring 282 of material, shown in particular in FIG. 27C, upstanding from the outer surface 56l of the member 46l. In a similar fashion to the above described embodiments, this provides sealing with a tube or the like in which the member 46l is located.

FIGS. 28A to 29C show a deformable member indicated generally by reference numeral 46m, in accordance with a fourteenth embodiment of the present invention. The deformable member 46m operates to move between deformed and undeformed positions in a similar fashion to the deformable members of FIGS. 2A to 23D, but is of a structure similar to that of the member 46k shown in FIGS. 24A to 25C.

The deformable member 46m comprises a body having a first generally hollow cylindrical portion 110m and a second hollow portion 112m. The hollow cylindrical portion 110m has a member wall 114m of a first general wall thickness, with two circumferentially extending lines of weakness in the form of generally rectangular section grooves 284 and 286, provided in an outer surface 288 of the portion 114m. The hollow portion 112m has a wall 116m which is of a wall thickness less than that of the wall 114m, and thus a portion of the member wall is defined between the grooves 284 and 286.

The member wall 114m defines shoulders 290, 292 which both support the hollow portion 112m, to constrain deformation of the wall 116m, and allow for transferral of the axial force to the portion 112m. Also, the member 46m includes internal seal carrying channels 294 for carrying seals such as an elastomeric O-ring seal, for sealing to a mandrel or the like carrying the member. As will be discussed in more detail with reference to FIGS. 30 to 32, a chamber 296 is defined between the portions 110m and 112m of the member 46m and the carrying mandrel. This chamber 296 selectively assists in deforming the member 46m to the deformed position of FIGS. 29A to 29C.

The member 46m is shown in FIGS. 29A to 29C in a deformed position, on application of an axial force in the direction of the arrows A of FIG. 29A, in a similar fashion to the above described embodiments of the invention. It will be noted that the wall 116m, on application of the axial force, deforms and bulges outwardly, to bring an outer surface 118m of the wall 116m into contact with a tube or the like in which the member 46m is located. To allow for this deformation, the grooves 284 and 286 become closed, as shown in particular in FIG. 29B.

Figure 30:
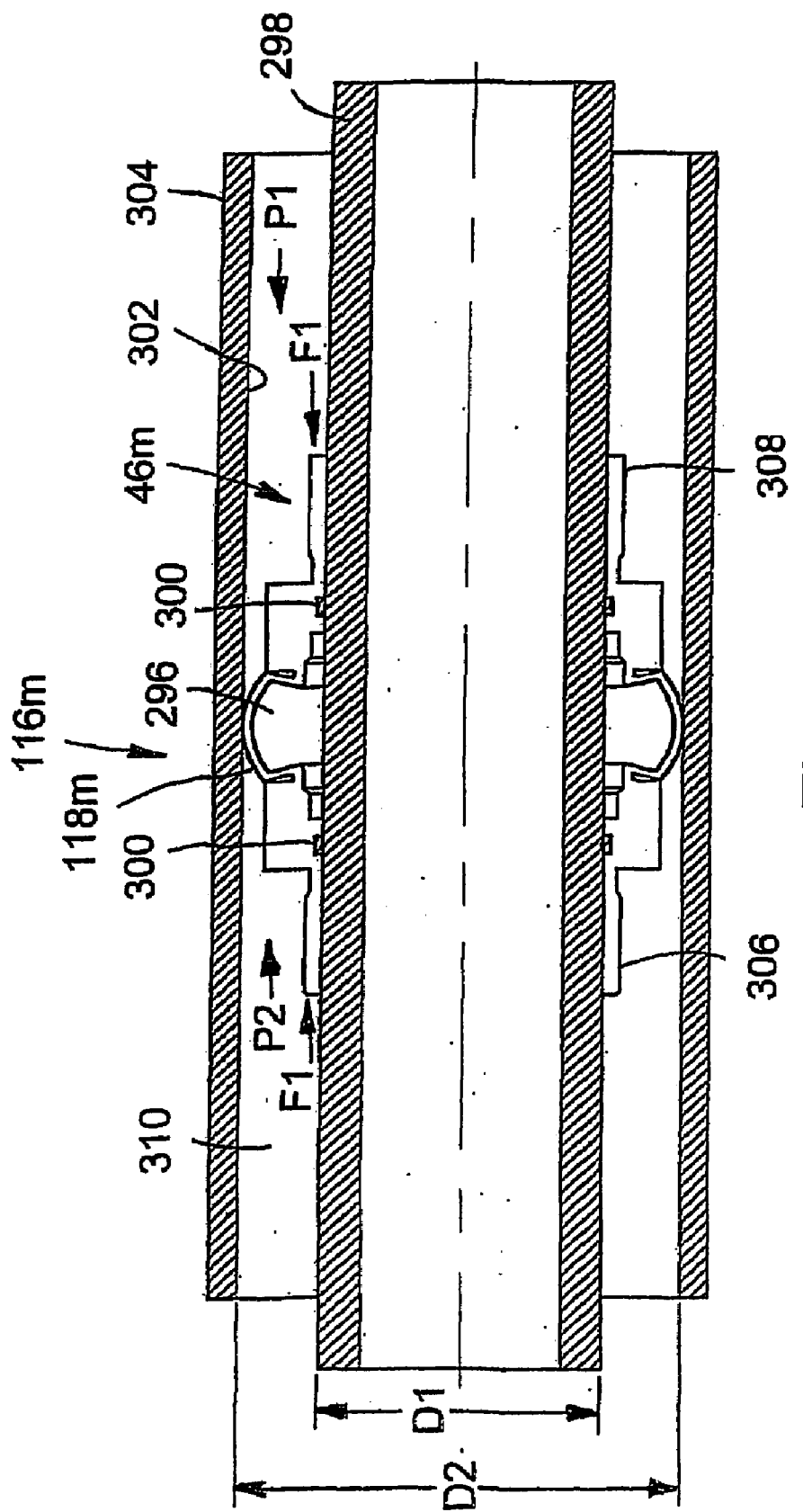
FIG. 30 is a view of the member of FIG. 28A, shown mounted on a mandrel and in the deformed position of FIG. 29A, where it has been deformed into contact with a tube in which the member is located.

Referring now to FIG. 30, which is a view of the member 46m in use, shown in the deformed position of FIG. 29A, the member 46m is shown located on a mandrel 298 and is sealed to the mandrel 298 by O-ring rubber seals 300, located in the seal carrying channels 294. In this position, the surface 118m of the portion 116m has been brought into contact with an inner surface 302 of a tube such as a casing 304 in which the member 46m is located. As noted above, the member 46m can be moved to the deformed position shown on application of an axial force. As shown in FIG. 30, a force F1 can be exerted on sleeve end portions 306 and 308 of the member 46m to move it to the deformed position.

However, the member 46m may also be moved to the deformed position by fluid pressure, due to the differential piston area of the member 46m in use, as shown and described briefly above. Differential pressure forces are exerted upon the member 46m due to the pressures P1 and P2 of fluid in the annulus 310 above and below the member 46m.

The differential piston area is the cross-sectional area of the annulus 310, and is determined according to the following calculation:

$$\pi/4(D2^2-D1^2)$$

where D1 and D2 are, as shown, the outer and inner diameters of the mandrel 298 and the casing 304, respectively. From this, we obtain the pressure force f due to the pressure P1, which is equal to pressure times area, as:

$$f=P1\times\pi/4(D2^2-D1^2)$$

It will be understood that the force due to the pressure P2 is calculated in a similar fashion. The differential piston area may therefore allow a fluid pressure force to be exerted on the member 46m, to move it to the deformed position. However, the differential piston force may also be utilized in conjunction with application of an axial force F1 to maintain the member 46m in the deformed position.

Figure 31:
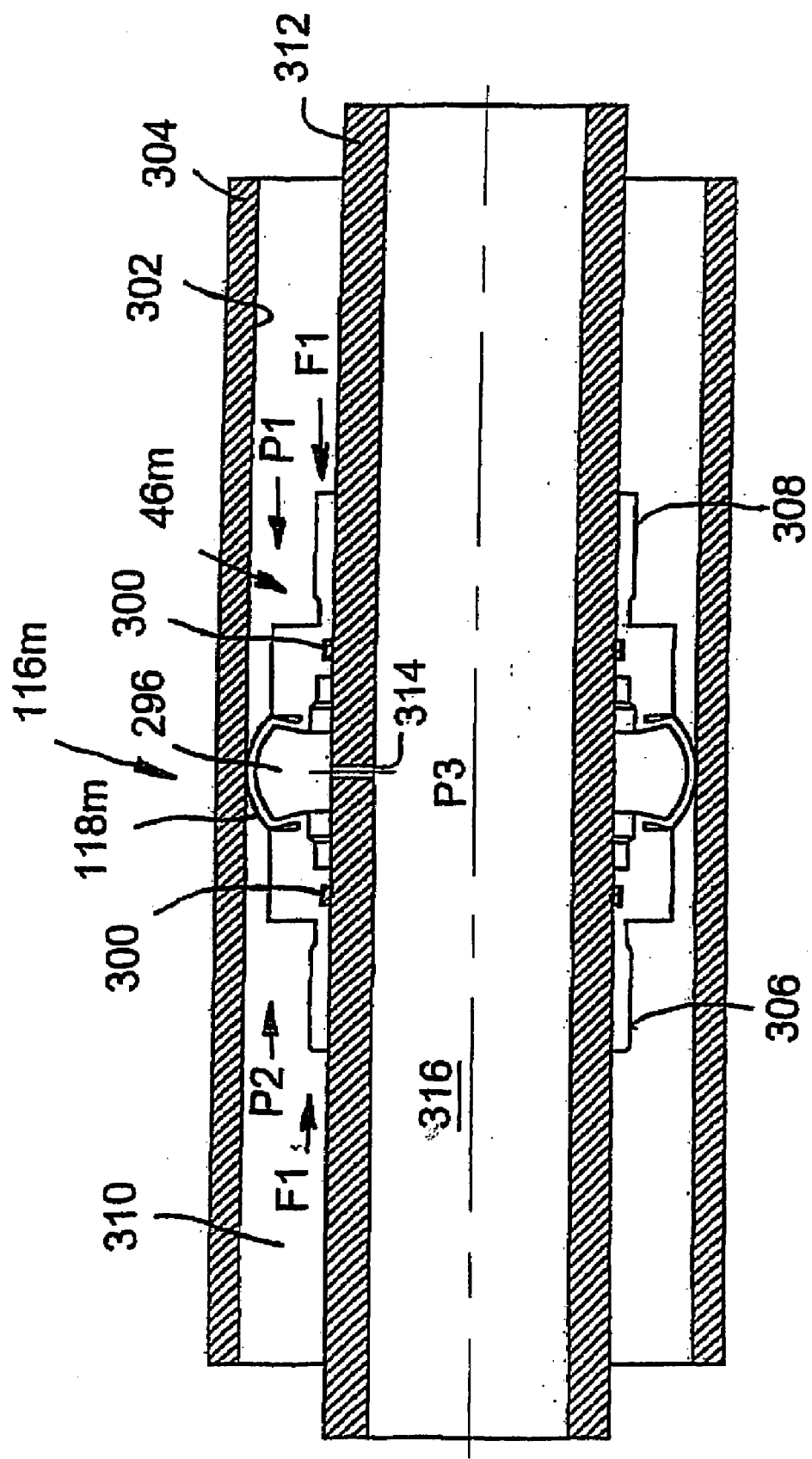
FIG. 31 is a view similar to that of FIG. 30, with the mandrel shown including a pressure vent port.

Referring now to FIG. 31, the member 46m is shown in the deformed position of FIG. 29A and mounted on a mandrel 312 similar to the mandrel 298 of FIG. 30, except including a pressure vent port 314. The pressure vent port 314 provides fluid communication between the chamber 296 and an inner annulus 316 of the mandrel 312. This allows the member 46m to be deformed by differential pressure across the member 46m, between the chamber 296 and the annulus 310. Thus fluid pressure P3 in the annulus 316, acting through the port 314, without the need for axial loading F1 (or fluid pressure loading P1 or P2) acts to deform the member 46m, where P3 is greater than the annulus pressure.

However, in the event that an axial load F1 is used to move the member 46m to the deformed position, pressure P3 may be used as a back-up energizing method, to maintain deformation of the member 46m.

Figure 32:
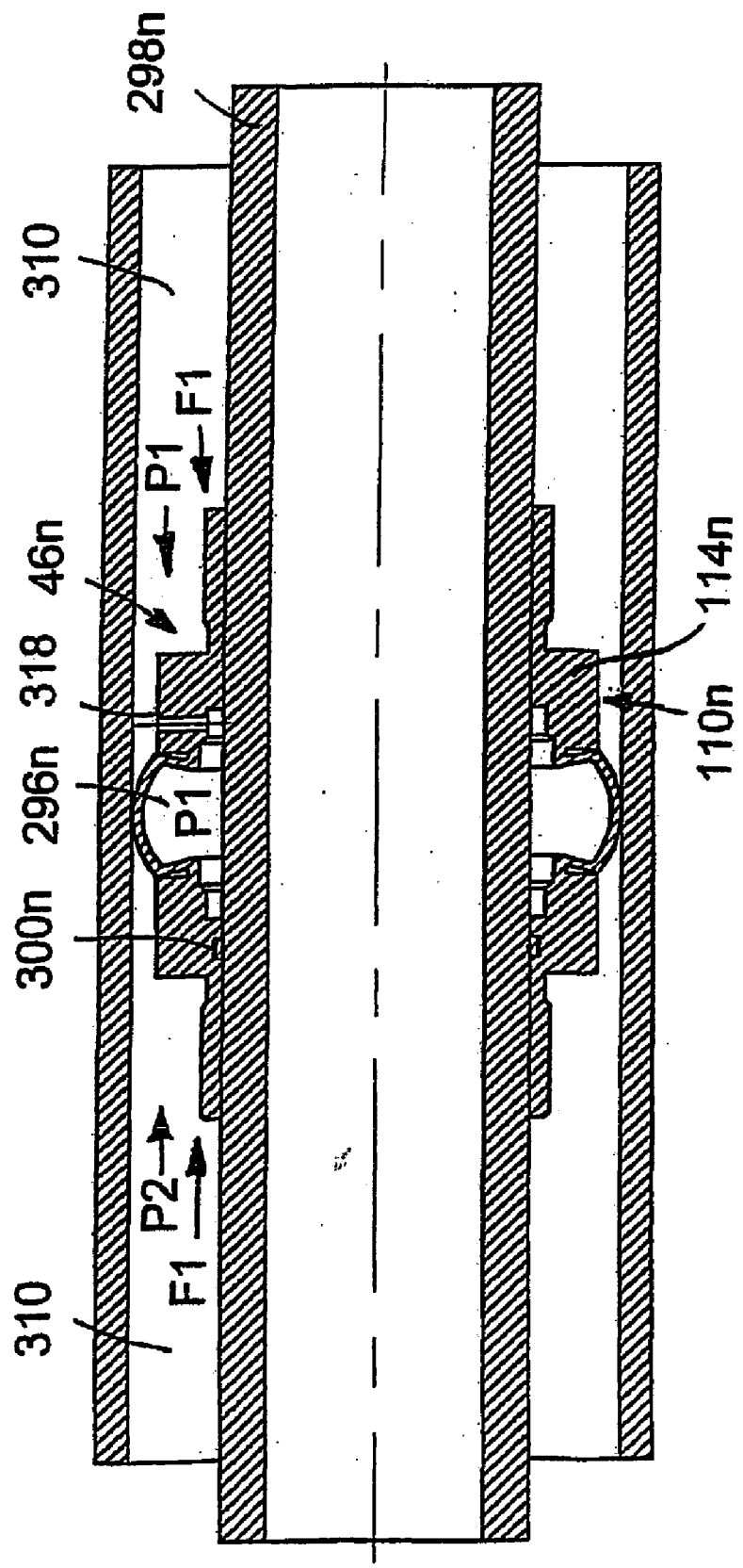
FIG. 32 is a view similar to that of FIG. 30, showing a deformable member similar to that of FIG. 28A, except including a pressure vent port and being sealed to the mandrel by a single seal.

Referring now to FIG. 32, there is shown a deformable member similar to the member 46m, indicated generally by reference numeral 46n. The structure of the member 46n is identical to that of the member 46m except that only a single seal 300n is provided, and that a pressure vent port 318 is provided in the wall 114n of the portion 110n of member 46n. This provides fluid communication between the annulus 310 and the chamber 296n of the member 46n and allows the member 46n to be deformed by fluid pressure through the annulus 310, and vent 318 to the chamber 296n. Of course, it will be understood that in a similar fashion to the embodiment of FIGS. 30 and 31, the member 46n may be deformed by application of axial force F1, or by a combination of axial force F1 and pressure P1.

FIGS. 33A to 34C show a deformable member indicated generally by reference numeral 46p, in accordance with a fifteenth embodiment of the present invention. The deformable member 46p is similar to the member 46l of FIGS. 26A to 27B, in that it includes a generally hollow cylindrical body. However, the member 46p differs in that end portions 320 and 322 of the member 46p have a wall thickness which is greater than a wall thickness of the body 48p in a deformation zone 62p of the member. Also, the wall 50p in the region of the deformation zone 62p is preformed into a shape which encourages the member 46p to deform outwardly, in the fashion shown in FIGS. 34A to 34C.

Also, a deformation aid in the form of a plastics or rubber O-ring is provided within the body 48p at a midpoint 326 of the deformation zone 62p. As shown in particular in FIG. 34C, when the member 46p is deformed, for example, on application of an axial force A, shown in FIG. 34A, the wall 50p of the body 48p in the region of the deformation zone 62p deforms around and compresses the O-ring 324. This forms a ring 282p of material for engaging the wall of a tube or the like in which the member 46p is located. It will therefore be understood that the inclusion of the O-ring 324 assists in obtaining the desired deformation of a plain body such as that of the member 46p.

Figure 35A:
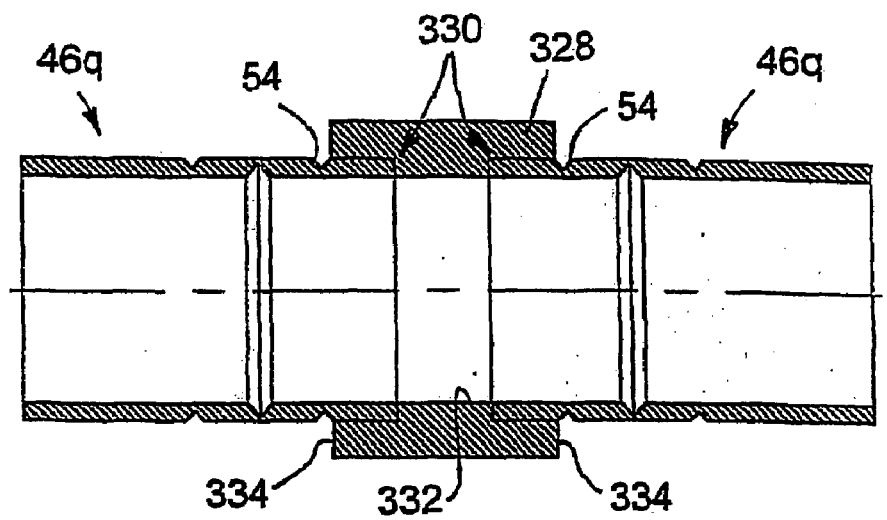
FIGS. 35A and 35B are views of deformable members acting as anti-extrusion seals for preventing extrusion of a conventional seal, FIG. 35A showing the members in an undeformed position, and FIG. 35B showing the members in a deformed position in location in a tube, respectively.
Figure 35B:
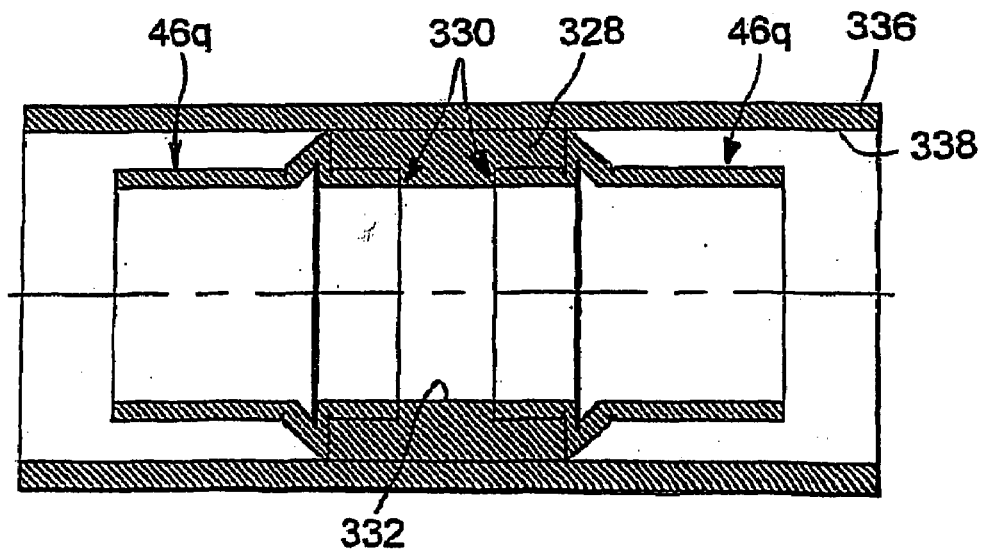

Referring now to FIGS. 35A and 35B, there are shown deformable members indicated generally by reference numeral 46q, acting as anti-extrusion seals to prevent extrusion of a conventional seal 328 in use. The seal 328 receives ends 330 of the members 46q, which abut a radial shoulder 332 of the seal 328. The members 46q are disposed such that respective grooves 54 of each member 46q are located outside the seal 328 adjacent to faces 334 of the seal 328.

As will be understood by persons skilled in the art, the seal 328 is of the type conventionally used for obtaining sealing in a tube, such as the casing 336 shown in FIG. 35B, which is a view of the seal 328 and members 46q in use, with the members 46q moved to a deformed position. Conventionally, such seals 328 are mounted on mandrels carrying anti-extrusion rings (not shown). However, the seals 328 are of an expandable plastics or rubber material, which is deformed into engagement with an inner wall 338 of the casing 336 to provide sealing. As the anti-extrusion rings are not similarly expandable, an annular gap (not shown) exists between the rings and the casing wall 338. Differential pressure across the seal 328 through such an annular gap tends to cause extrusion of the seal 328 and ultimately results in seal failure.

To overcome this, provision of the members 46q, and deformation of the members to the position shown in FIG. 35B, in the fashion described above, brings the members into engagement with the casing wall 338, closing the annular gap and protecting the seal 328 from extrusion.

Figure 36A:
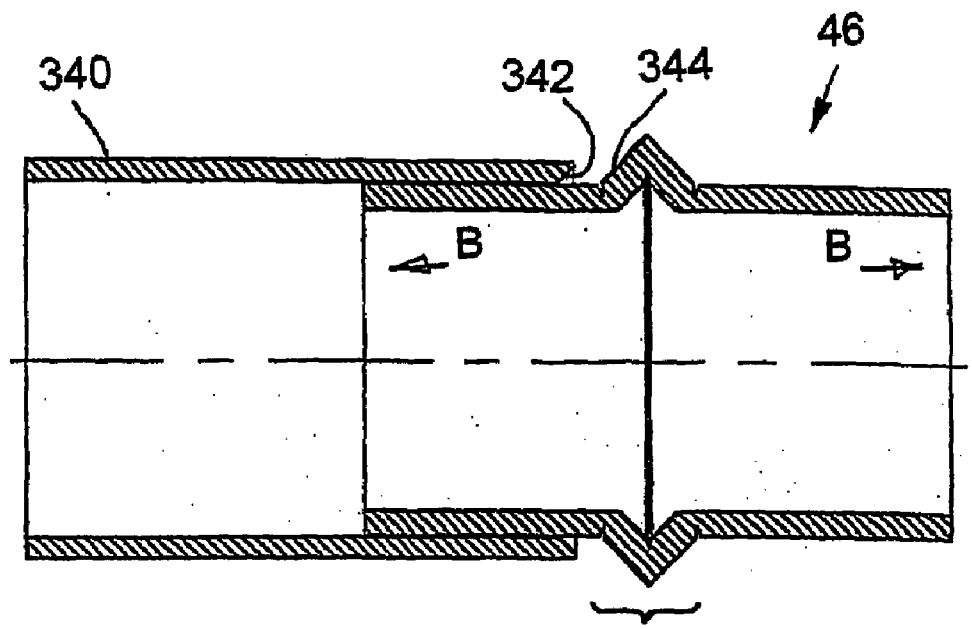
FIGS. 36A and 36B are schematic views of the member of FIG. 2A and a collapse aid for aiding movement of the member to an undeformed position, the member shown deformed in FIG. 36A and undeformed in FIG. 36B, respectively.
Figure 36B:
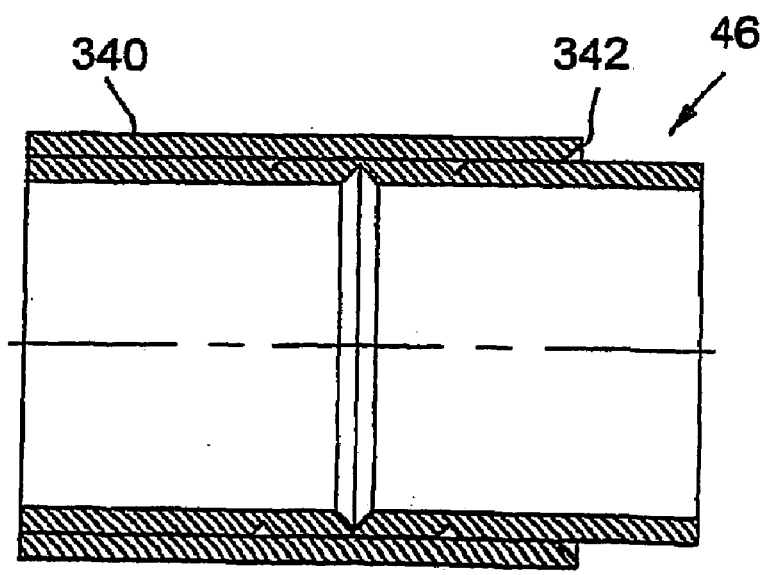

FIGS. 36A and 36B illustrate a collapse aid 340 for a deformable member, in this case, the member 46 of FIGS. 2A to 3C. The collapse aid 340 is provided to assist in returning the deformable member 46 from the deformed position shown in FIG. 36A, to the undeformed position of FIG. 36B. The collapse aid 340 is in the form of a sleeve, typically known as an extrusion cone, and has a beveled leading edge 342. The collapse aid 340 is run downhole to the location of the deformable member 46, and is run over the member 46 as shown in FIG. 36A. The beveled edge 342 is then brought into abutment with the member 46 in the deformation zone 62, contacting a face 344 of the member 46. This, together with application of a tensile load in the direction of the arrows B, assists in returning the member 46 to the undeformed position.

The provision of the collapse aid 340 is particularly advantageous in that it avoids the requirement for very high tensile loading to be applied through the deformation zone 62 of the member 46 to recover the member to the undeformed position. This is particularly useful as in certain situations, the high stress applied to the member 46 during movement to the deformed position of FIG. 36A can cause permanent damage, preventing full retraction to the undeformed position.

As noted above, for each of the deformable members 46 to 46q described above, an alternative fashion of moving the members between deformed and undeformed positions is to provide relative degrees of freedom. For example, either end of one of the members may be fixed relative to, for example, a carrying mandrel, in particular to limit the effect of differential pressure forces due to the differential piston area encountered, as described above with reference to FIGS. 30 to 32 in particular. In such situations, where relatively high pressures are encountered, it may not be desirable to load the members to the full extent of the potential differential piston loading, as this may exceed the design capabilities of the material of the members, and cause failure.

Restraining one end of the members from movement towards the opposite end ensures that differential piston loading applied from the constrained end does not further energize the seal, preventing further deformation and seal failure under extreme pressure.

Referring now to FIGS. 37A to 47B, there are shown various views of a bridge plug indicated generally by reference numeral 120, in accordance with a first embodiment of the present invention, and including the deformable member 46 of FIGS. 2A-3C. However, it will be appreciated by persons skilled in the art that the bridge plug 120 may equally include a deformable member in accordance with any of the second to twelfth and further embodiments of the present invention described above with reference to FIGS. 4A-25C; 33A-34B; and 51A-54B below.

Figure 2C:
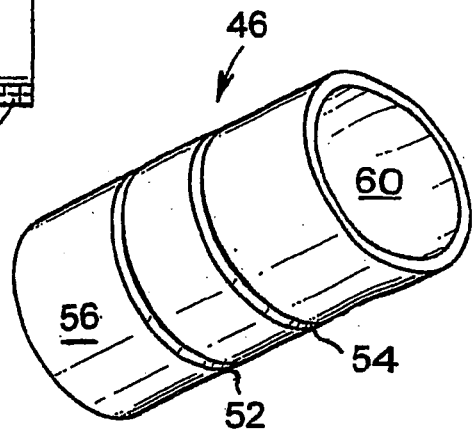
Figure 37A:
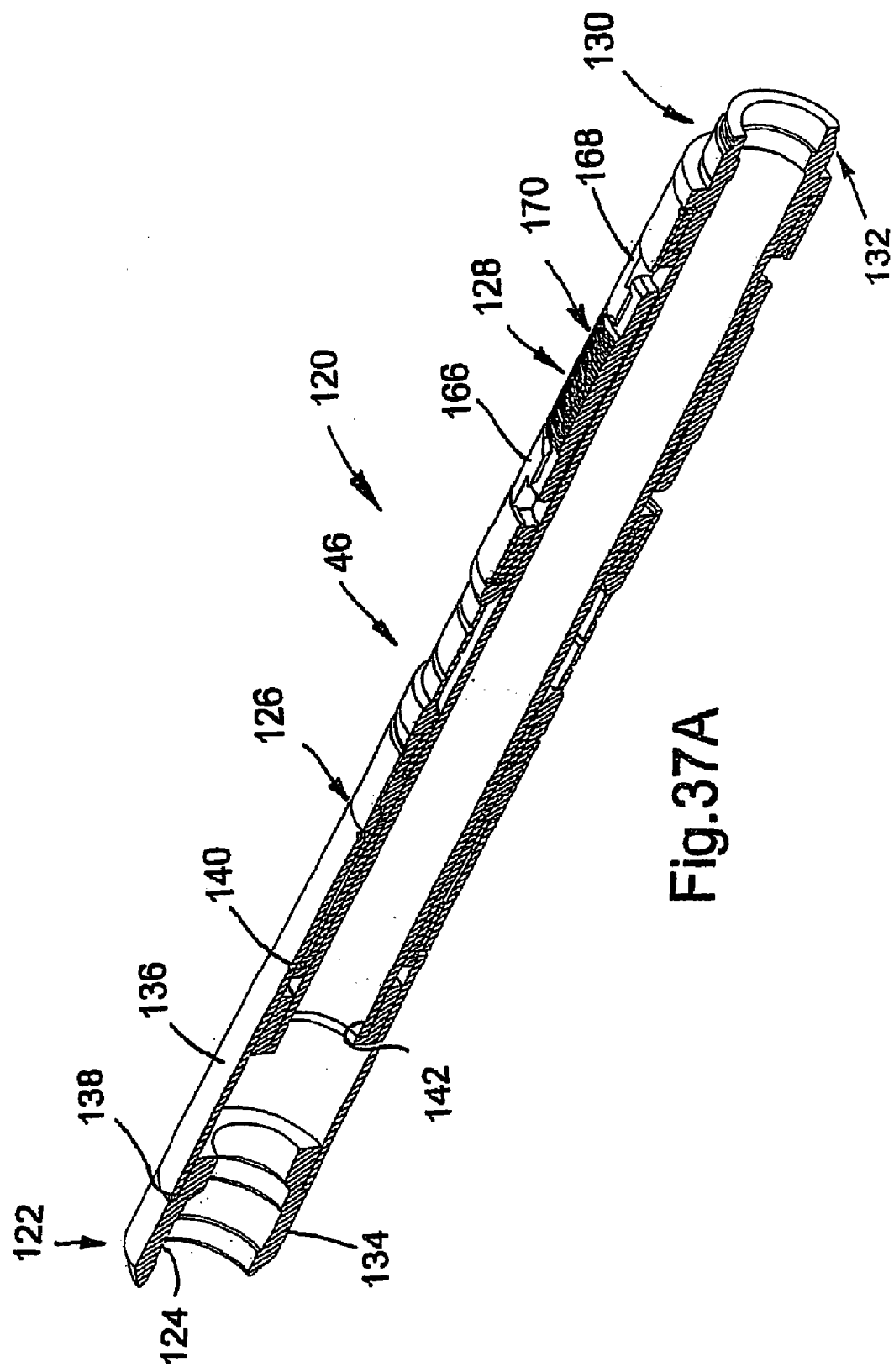
FIGS. 37A and 37B are longitudinally sectioned perspective and longitudinal sectional views, respectively, of a first embodiment of a bridge plug incorporating a deformable seal, in accordance with the present invention, the bridge plug shown in a running position where the deformable member is in an undeformed position.
Figure 37B:
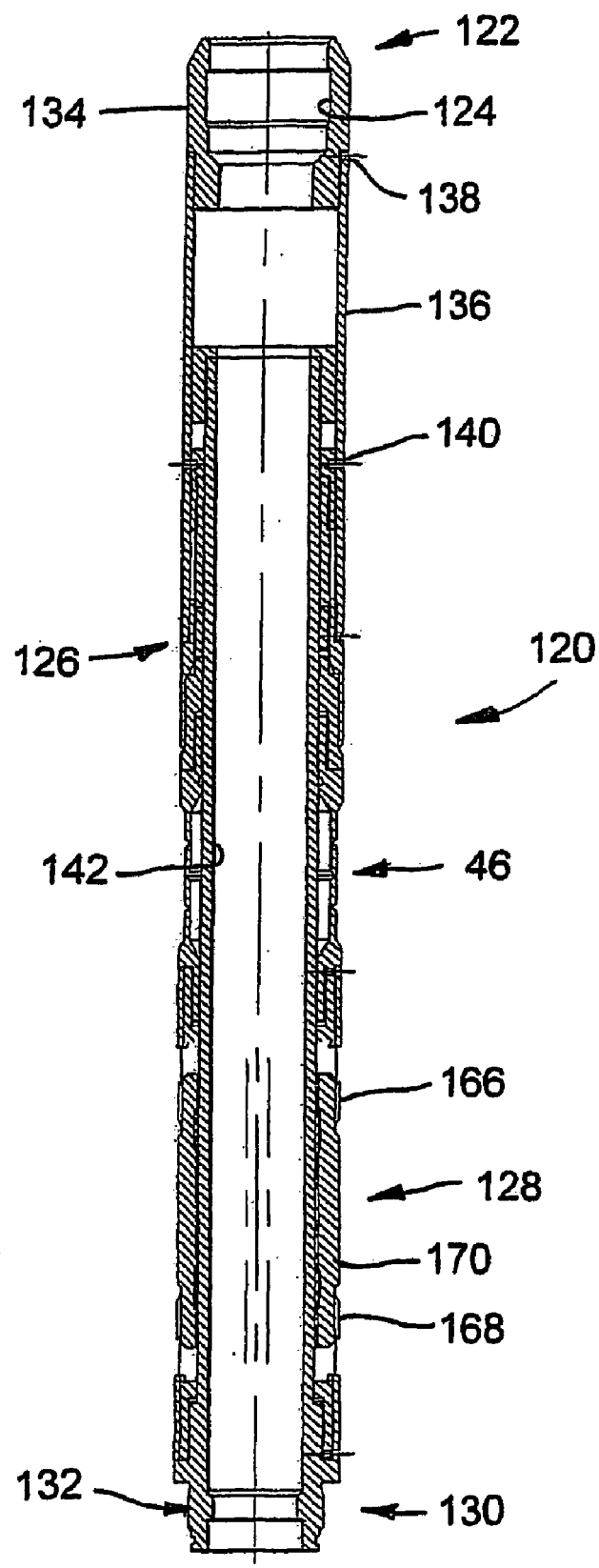

Turning initially to FIGS. 37A and 37B, there are shown longitudinally sectioned perspective and longitudinal sectional views, respectively, of the bridge plug 120, shown in a running position where the deformable member 46 is in the undeformed position of FIGS. 2A to 2C.

A bridge plug is generally used in downhole situations where, for example, pressure isolation and testing is required or a casing or lining installed in a borehole has become corroded, perforated or otherwise damaged, allowing ingress of non-well fluids, sand and other materials detrimental to the retrieval of well fluids through the borehole. The bridge plug isolates the damaged portion of the casing, and allows fluid communication from a location below the bridge plug to above the bridge plug, allowing well production to continue and permitting the access of well tools into the borehole, whilst isolating the non-well fluids, sand and the like from the remainder of the casing. Bridge plugs are typically run into a borehole as part of a tool string, to a depth where the bridge plug is required to be located or "set" in the casing.

The bridge plug 120 of FIGS. 37A and 37B is run-into a borehole as part of such a tool string, and includes a setting tool (not shown), coupled to the bridge plug 120 at an end 122, which is the upper end of the bridge plug in use, when run into the borehole. The bridge plug 120 generally comprises the upper end 122, which includes a "fish neck" profile 124, to allow retrieval of the tool, a ratchet mechanism 126, a seal 46 in the form of the deformable member, a slip mechanism 128 and an end 130 which forms the lower end of the bridge plug 120 when it is run into the borehole, and which includes a set/unset profile 132. The bridge plug 120 is shown in FIG. 37B in the upright position in which it is run into the borehole. Each of the separate components of the bridge plug 120 will be described in more detail with reference to FIGS. 38A to 47B below.

Figure 38A:
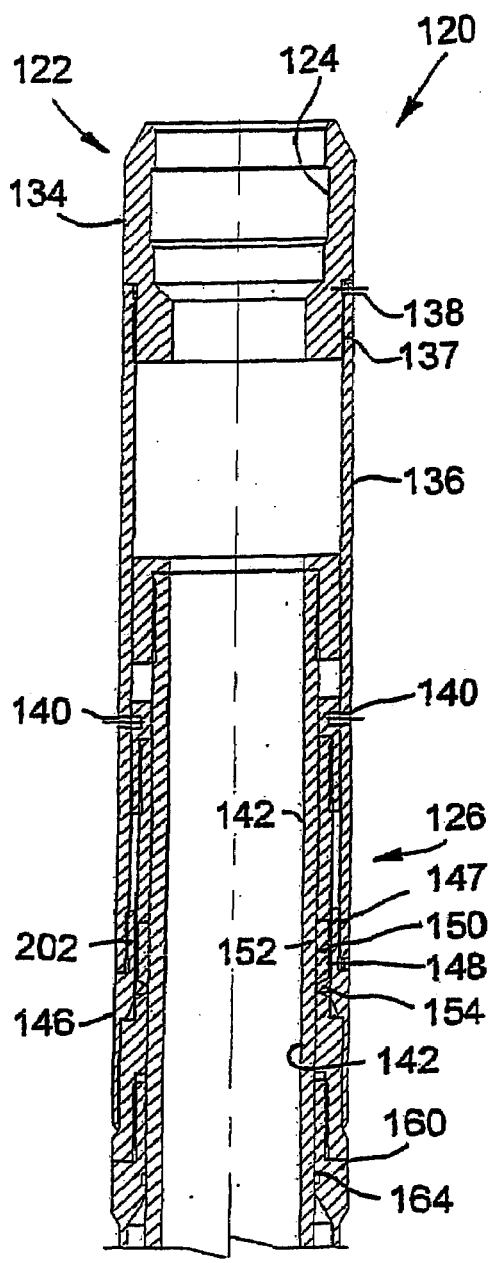
FIGS. 38A and 38B are enlarged views of the bridge plug shown in FIG. 37B, showing upper and lower ends respectively of the bridge plug.
Figure 38B:
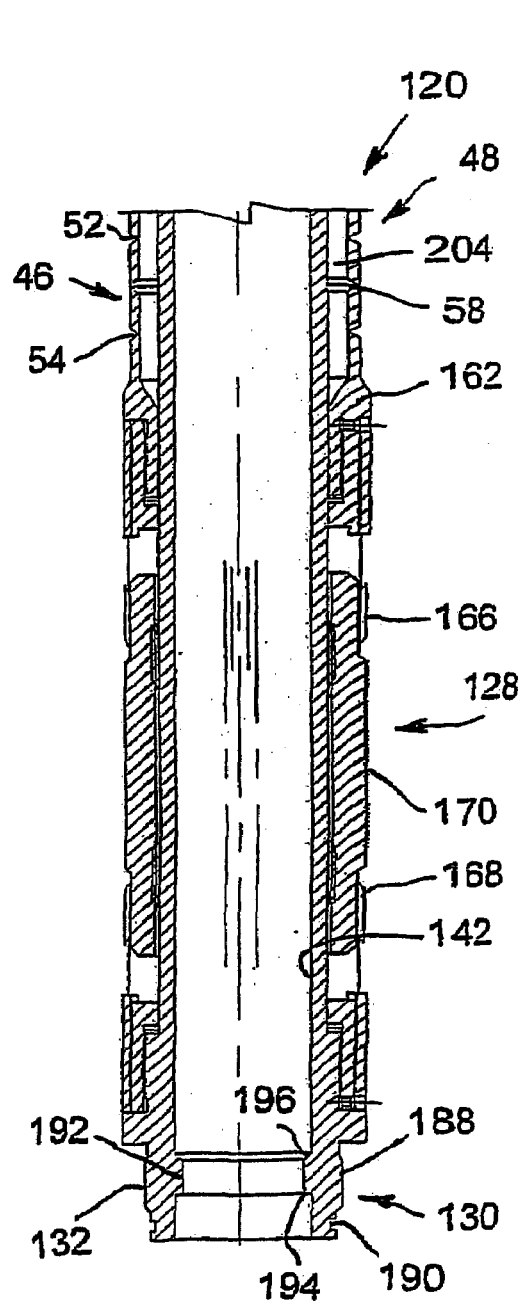

FIGS. 38A and 38B are enlarged views of the bridge plug 120 showing the upper and lower parts of the plug, respectively.

The upper end 122 of the bridge plug 120 comprises a tubular fish-neck sleeve 134, coupled to the ratchet mechanism 126 by a transfer sleeve 136, which is secured to the fish-neck sleeve 134 by a threaded connection 137, secured using locking screws 138. The transfer sleeve 136 is coupled to the ratchet mechanism 126 via shear screws, two of which are shown and given the reference numeral 140. The ratchet mechanism 126 will be described in more detail with reference to FIGS. 39A and 39B below. However, the ratchet mechanism 126 is connected to the seal 46, and both the ratchet mechanism 126 and the seal 46 are mounted on an inner sleeve 142 of the bridge plug 120, which extends to the end 130 and carries the set/unset profile 132. The slip mechanism 128 is mounted on the inner sleeve 142 below the seal 46, and the seal 46 is coupled to part of the slip mechanism 128. The slip mechanism 128 will be described in more detail with reference to FIGS. 41A and 41B below.

Turning now to FIGS. 39A and 39B, there are shown enlarged views of the ratchet mechanism 126, and perspective views of segments of the ratchet mechanism, respectively. The ratchet mechanism 126 includes an upper sleeve 144, coupled to the transfer sleeve 136 by the shear screws 140; a release sleeve 146, coupled also to the transfer sleeve 136 by a threaded connection 147, secured using locking screws 148 (one shown); a ratchet segment 150 carrying ratchet teeth 152 for engaging corresponding teeth on the inner sleeve 142; and a shaped ratchet reverse segment 154. A number of ratchet segments 150 and ratchet reverse segments 154 are provided spaced around the bridge plug 120, although only two are shown in the drawings. FIG. 39B shows a ratchet segment 150 and a ratchet reverse segment 154 in more detail. It will be seen that the ratchet segment 150 is generally arcuate, and has a curved face 156 for co-operating with a corresponding curved face 158 of the ratchet reverse segment 154. As will be described in more detail below, co-operation between the ratchet teeth 152 on the ratchet segment 150 and the corresponding teeth on the inner sleeve 142 acts to restrain movement of the bridge plug when it is moved to a set position and the seal 46 is deformed. The ratchet segments 150 are normally retained in engagement with the inner sleeve ratchet teeth by a shoulder 202 of release sleeve 146.

FIG. 40 is an enlarged view of the seal 46, and it will be noted that the seal 46 similar to the deformable member shown in FIG. 2A and described above. However, the seal body 48 includes shoulders 160 and 162 at either end of the body, the end 160 carrying an elastomeric O-ring seal 164 for sealing an upper end of the seal 46 to the inner sleeve 142. A lower end of the seal 46 remains unsealed with the inner sleeve 142, to allow pressure equalization between an annular cavity 204 and the remainder of the plug 120.

Referring now to FIGS. 41A and 41B, there are shown exploded perspective and perspective views, respectively, of the slip mechanism 128. The slip mechanism 128 includes a dynamic slip mandrel 166, a static slip mandrel 168, and a number of slips 170, only one of which is shown in FIG. 41A. The slip mechanism is of a type known in the art, each of the dynamic and static slip mandrels 166 and 168 including a plurality of segments 172 disposed around the mandrels. Adjacent pairs of segments 172 together define uplift ramps 174 and collapse ramps 176. Each slip 170 includes an arcuate body portion 178 carrying slip teeth 180, with generally T-shaped segments 182 formed at either end of the body portion 178. The body portion 170 defines uplift ramps 184 and the T-shaped segments define collapse ramps 186. When the slip mechanism 128 is assembled, as shown in FIG. 41B, uplift ramps 174 abut the corresponding uplift ramps 184 of the slips 170, and the collapse ramps 176 of the mandrels 166 and 168 abut the corresponding collapse ramps 186 of the slips 170. This allows the slips to be moved radially outwardly to engage a casing wall in which the bridge plug 120 is located, as will be described in more detail below.

Referring now to FIG. 42, there is shown an enlarged view of the end 130 of the bridge plug 120. The set/unset profile 132 includes a connection thread 188 which serves for connecting the bridge plug 120 to part of the setting tool, and an elastomeric O-ring seal (not shown) located in a groove 190. In addition, the end 130 carries an internal radially bridge plug 120 to be compressed to set the plug; and a no-go shoulder 196 to allow the bridge plug 120 to be axially extended for un-setting the plug.

There follows a description of the method of setting and un-setting the bridge plug 120. The plug 120 is held in the extended, unset position of FIGS. 37A and 37B by restraining the plug 120 between the fish-neck 124 and the set/unset profile 132. Co-operation between the collapse ramps 176 of the mandrel segments 172 and the collapse ramps 186 of the slips 170 ensures that the slips 170 are fully retracted. This allows the bridge plug 120 to be run into the borehole casing in the running position of FIGS. 37A and 37B.

When the bridge plug 120 has been located at a desired depth in the borehole casing, the setting tool (not shown) is initiated. The setting tool axially compresses the bridge plug 120 between fish-neck 124 and set/unset profile 132, moving the fish-neck sleeve 134 downwards. This downward movement is transferred to the dynamic slip mandrel 166 of the slip mechanism 128 through the transfer sleeve 136, ratchet mechanism 126 and the seal 46, which initially remains in the undeformed position of FIGS. 37A and 37B. Downward movement of the dynamic slip mandrel 166 towards the static slip mandrel 168 forces the slips 170 up the uplift ramps 174 of the mandrels. This moves the slips 170 radially outwardly, by co-operation with the slip uplift ramps 184, until they are fully engaged in the casing wall and cannot expand further.

Figure 44:
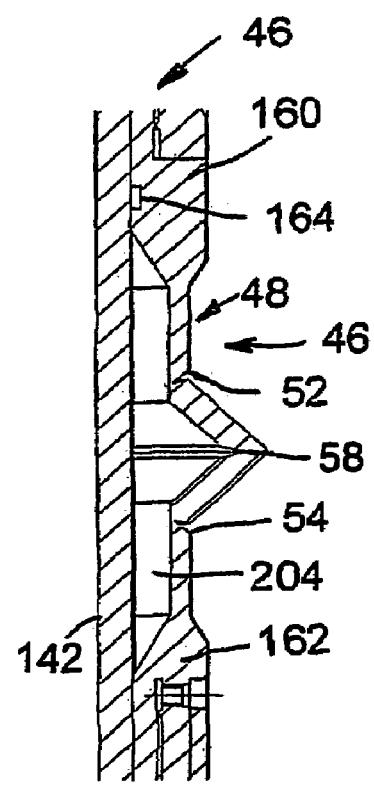
FIG. 44 is an enlarged view of the deformable member of the bridge plug in the deformed position shown in FIG. 43B.
Figure 45A:
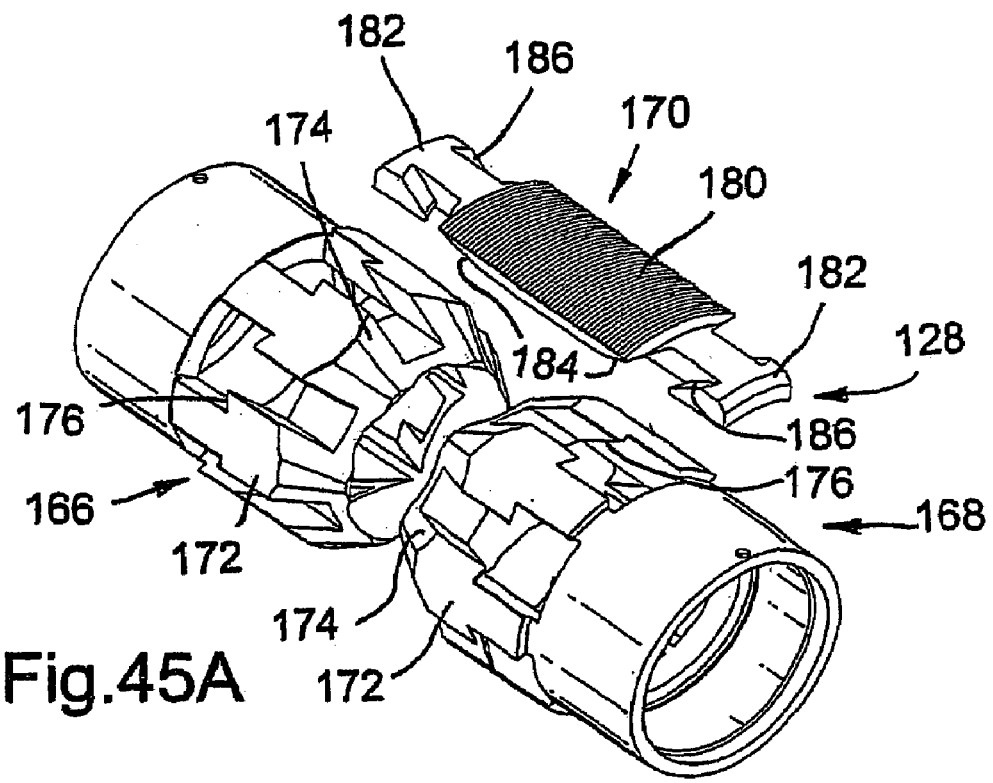
FIGS. 45A and 45B are exploded perspective and perspective views respectively of the slip mechanism of the bridge plug shown in a set position, when the bridge plug is in the set position shown in FIG. 43A.
Figure 45B:
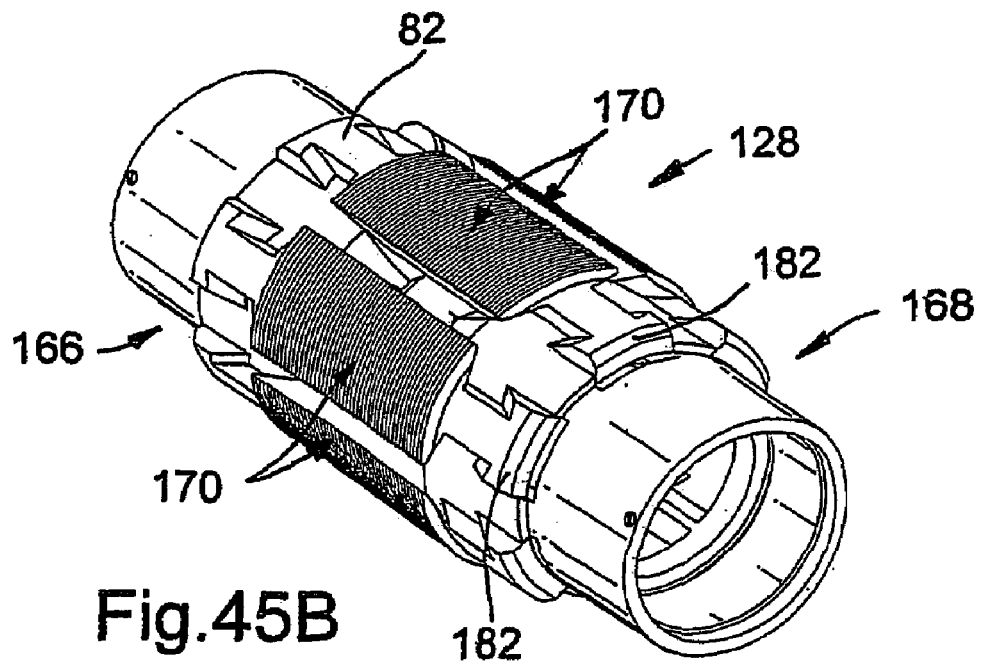

Once the dynamic slip mandrel 166 has ceased to move axially, compressive axial loading on the bridge plug 120 is transferred to the seal 46. A predetermined load is applied which fully energizes the seal 46 to move it to the deformed position, where it expands into contact with the casing wall, as described above. The bridge plug is therefore now in the position shown in FIGS. 43A and 43B, with the seal 46 and slips 170 fully expanded, as shown in FIGS. 44 and FIGS. 45A and 45B, respectively.

As the seal 46 is axially compressed, its axial travel is secured and locked by the ratchet mechanism 126, by cooperation between the ratchet teeth 152 of the ratchet segment 150 and the corresponding teeth on the inner sleeve 142. This ensures that the load applied to both the seal 46 and the slips 170 is retained, and securely holds the bridge plug 120 in the casing in the set position shown in FIGS. 43A and 43B.

Having knowledge of the compressive load required to move the bridge plug 120 to the set position allows a predetermined shear-rated ring or release mechanism (not shown) on the setting tool to disengage from the shoulder 192 of the set/unset profile 132. This ensures that the setting tool automatically releases from the bridge plug 120 when sufficient force has been applied to set the plug, and ensures that the setting tool cannot apply a load too great for the plug 120, which would otherwise cause damage. When the shear-ring has released the setting tool from the bridge plug 120, the setting tool is withdrawn and retrieved to surface. Pressure loading on the bridge plug 120 from above or below acts to further compress and engage both the slip mechanism 128 and the seal 46 with the casing wall, to further enhance pressure retaining performance of the bridge plug 120.

Figure 43A:
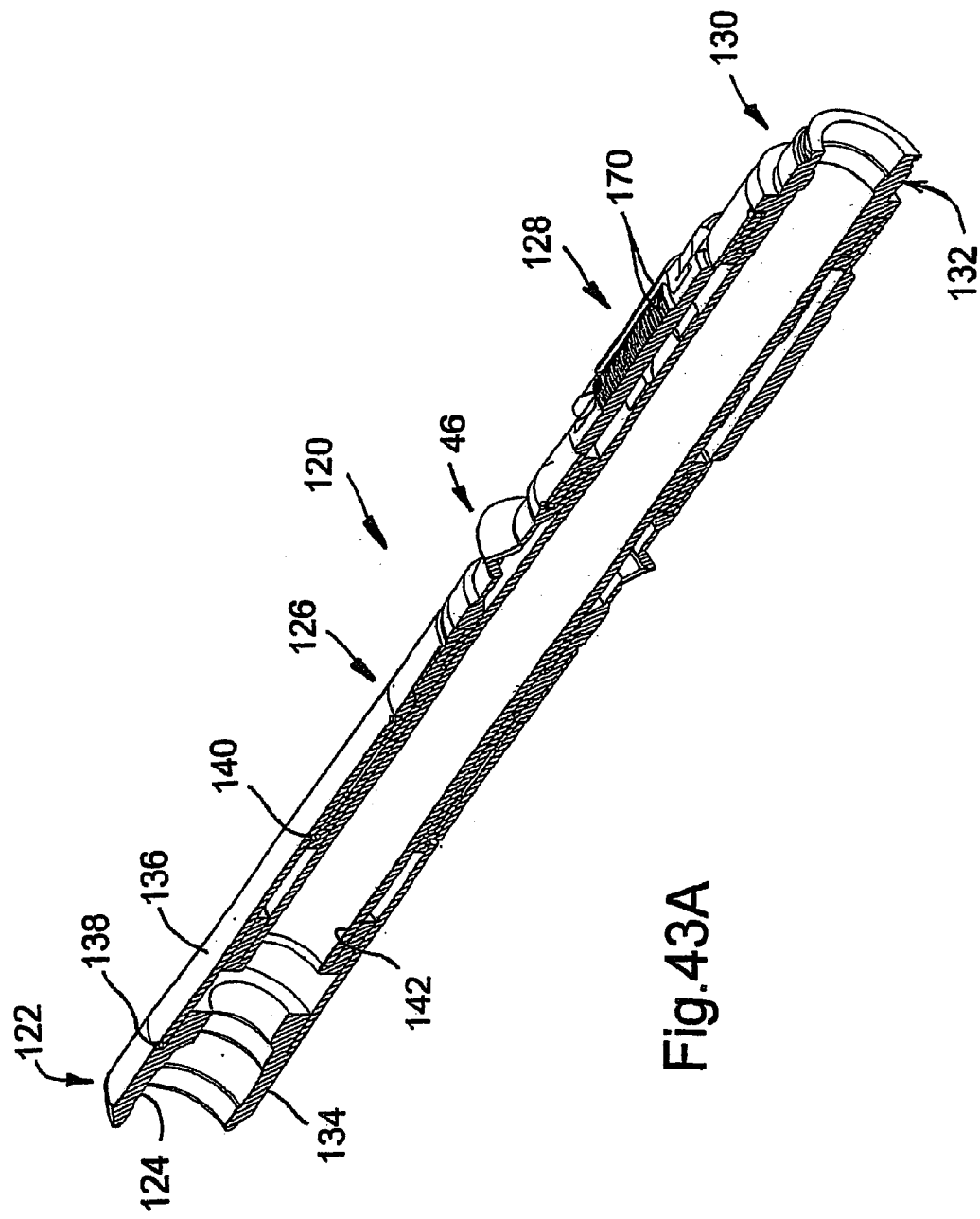
FIGS. 43A and 43B are views, similar to the views of FIGS. 37A and 37B, of the bridge plug in a set position, where the deformable member is in a deformed position.
Figure 43B:
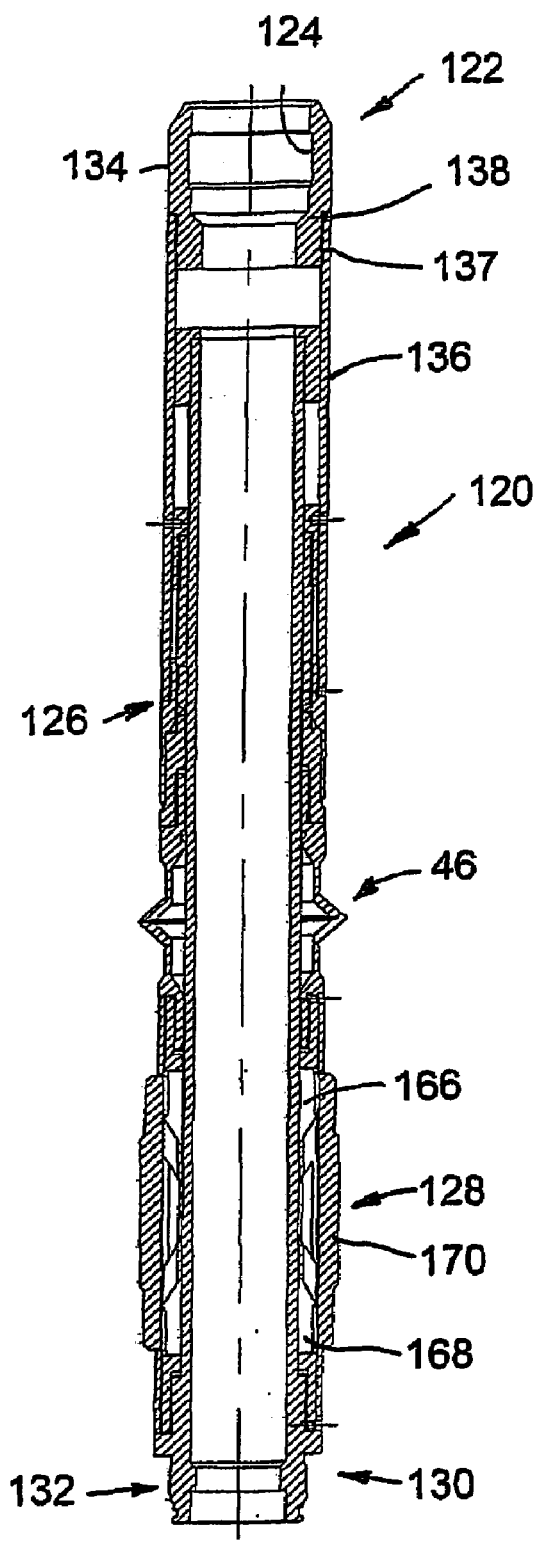
Figures 47A, 47B:
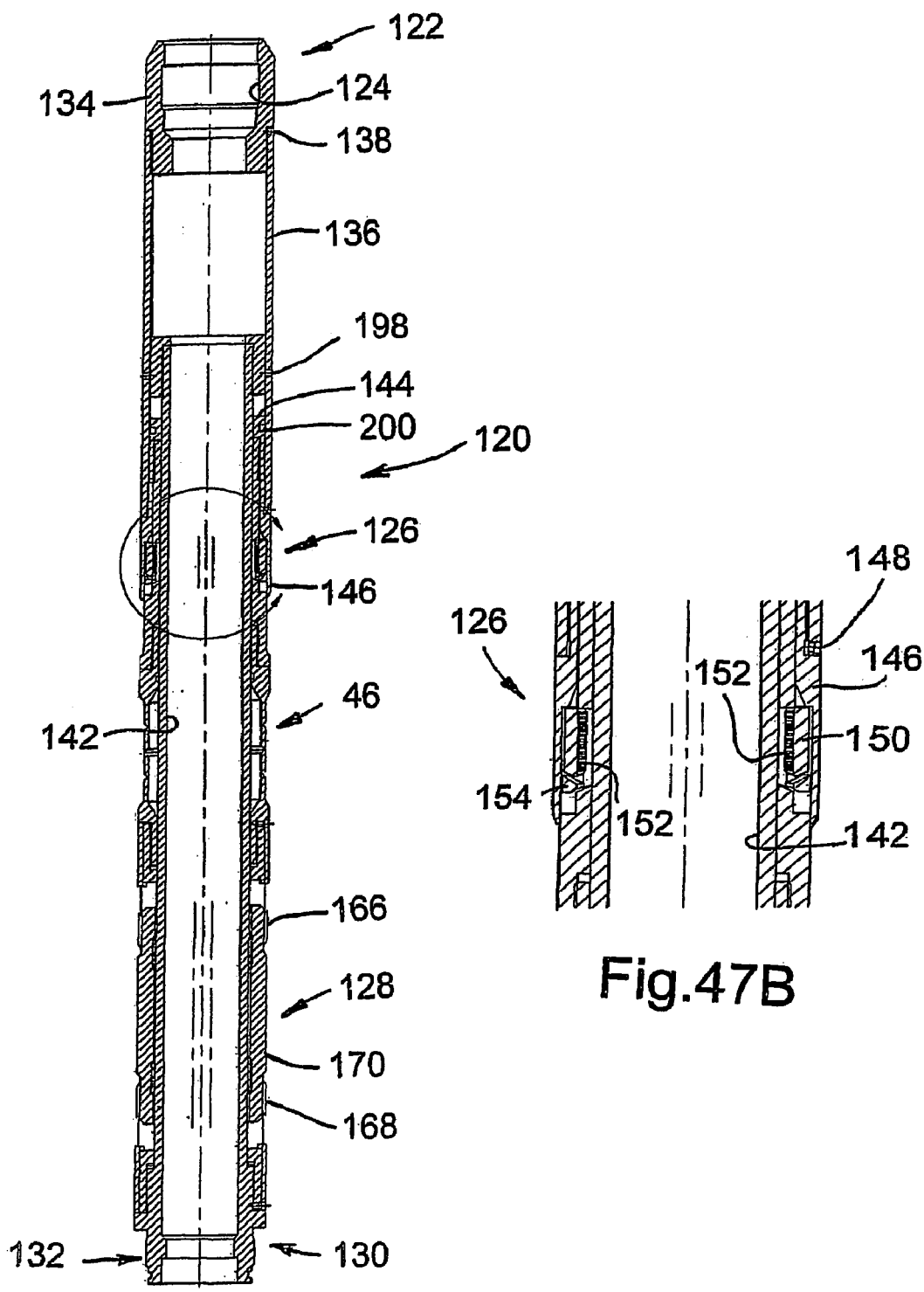

Referring now to FIGS. 46A and 47A, the bridge plug 120 is shown after having been returned from the set position of FIGS. 43A and 43B, to allow retrieval of the bridge plug 120 after it has carried out the required well operation.

The bridge plug 120 is retrieved from the set position of FIGS. 43A and 43B by coupling a retrieval tool (not shown) to the bridge plug 120 and latching it to the fishneck profile 124. The retrieval tool generates a force which extends the bridge plug 120 between the fish-neck profile 124 and the set/unset profile 132. It is important to note that the bridge plug 120 is extended from the set position independently of the slips 170. The bridge plug 120 is therefore not dependent upon engagement of the slips 170 with the casing wall to allow retrieval.

Extending the plug 120 shears the shear screws 140 into parts 198 and 200, allowing axial movement of the transfer sleeve 136 relative to the upper sleeve 144 of the ratchet mechanism 126, carrying the ratchet release sleeve 146 therewith.

Axial movement of the release sleeve 146 de-supports the ratchet segments 150, which are normally restrained from radial movement by the shoulder 202 of the release sleeve 146 and the shaped ratchet reverse segments 154. When the ratchet segments 150 are de-supported, as shown in the enlarged view of FIG. 46B, the ratchet segments 150 and the ratchet reverse segments 154 move radially outwardly, such that the ratchet teeth 152 disengage from the corresponding teeth on the inner sleeve 142. This allows the shoulder 160 of the seal 46 to move axially towards the fish-neck sleeve 134, to move the seal 46 to the undeformed position.

Further axial extension of the bridge plug 120 releases the slips 170 from the casing wall, by an interaction between the collapse ramps 176 of the mandrels 166, 168, and the collapse ramps 186 of the slips 170. Full extension of the bridge plug 120 to the position shown in FIG. 46A causes full retraction of the seal 46 and slips 170. The bridge plug 120 may then be retrieved to surface.

Figure 48A:
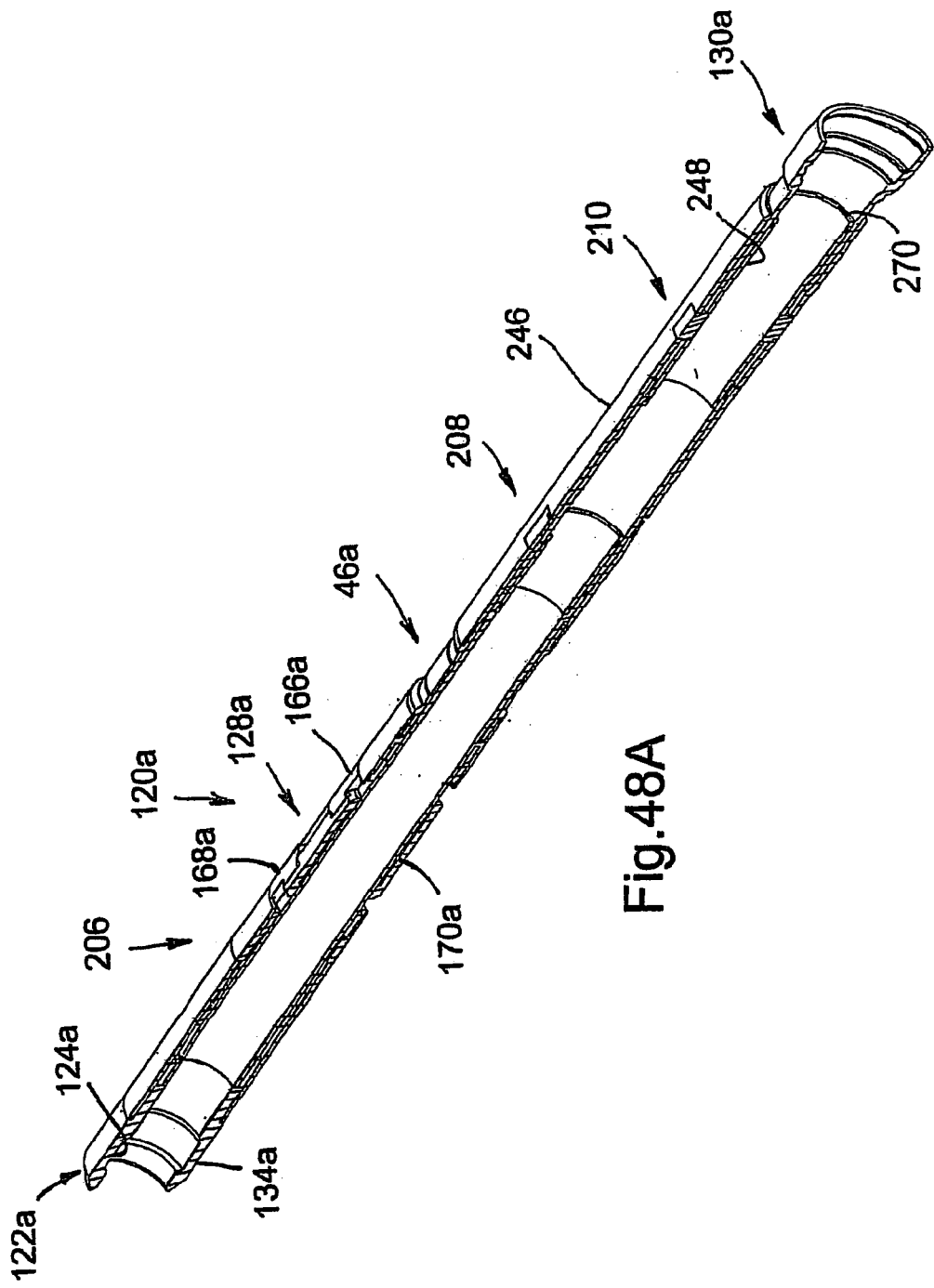
FIGS. 48A and 48B are longitudinally sectioned perspective and longitudinal sectional views, respectively, of a second embodiment of a bridge plug incorporating a deformable seal, in accordance with the present invention, the bridge plug shown in a running position, similar to that of the bridge plug shown in FIGS. 37A and 37B, where the deformable member is in an undeformed position.
Figure 48B:
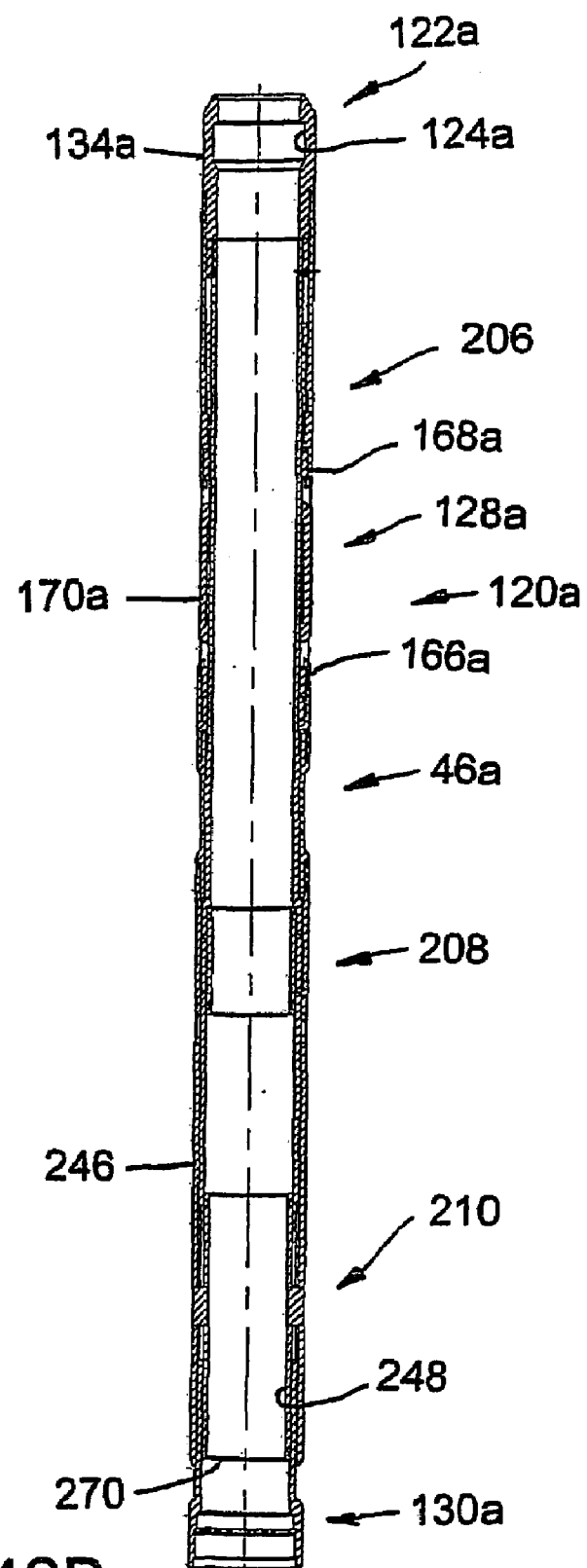

Referring now to FIGS. 48A and 48B, there are shown longitudinally sectioned perspective and longitudinal sectional views, respectively, of a bridge plug indicated generally by reference numeral 120a, in accordance with a second embodiment of the present invention. Like components of the bridge plug 120a with the bridge plug 120 of FIG. 37A share the same reference numerals, with the addition of the letter "a". The bridge plug 120a includes a seal 46a, similar to the deformable member 46 of FIGS. 2A to 3C and the bridge plug 120a is shown in FIG. 48A and 48B in a running position, similar to that of the bridge plug 120 shown in FIGS. 37A and 37B.

Figure 48C:
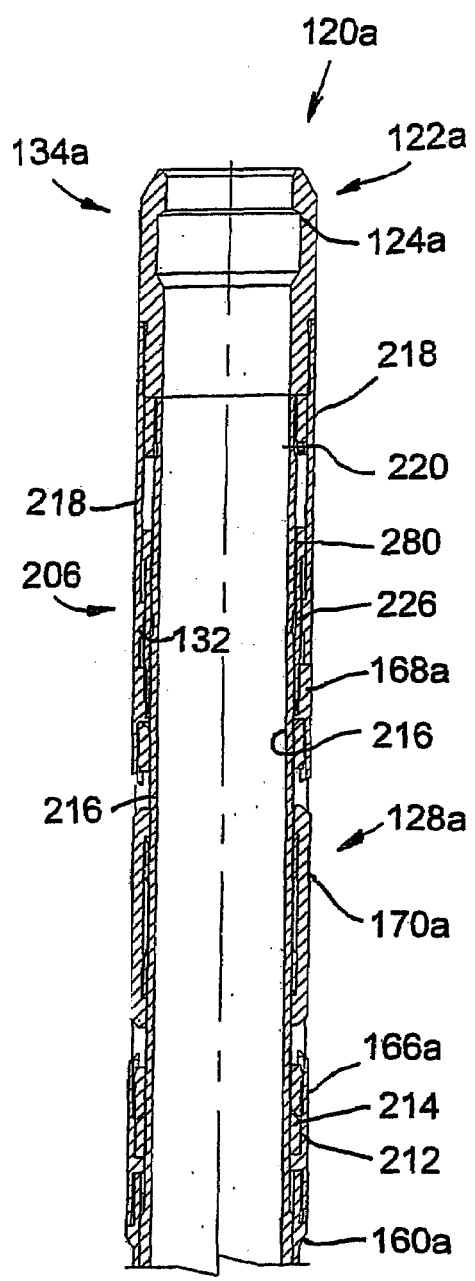
FIGS. 48C and 48D are enlarged views of the bridge plug shown in FIG. 48B, showing upper and lower ends respectively of the bridge plug.
Figure 48D:
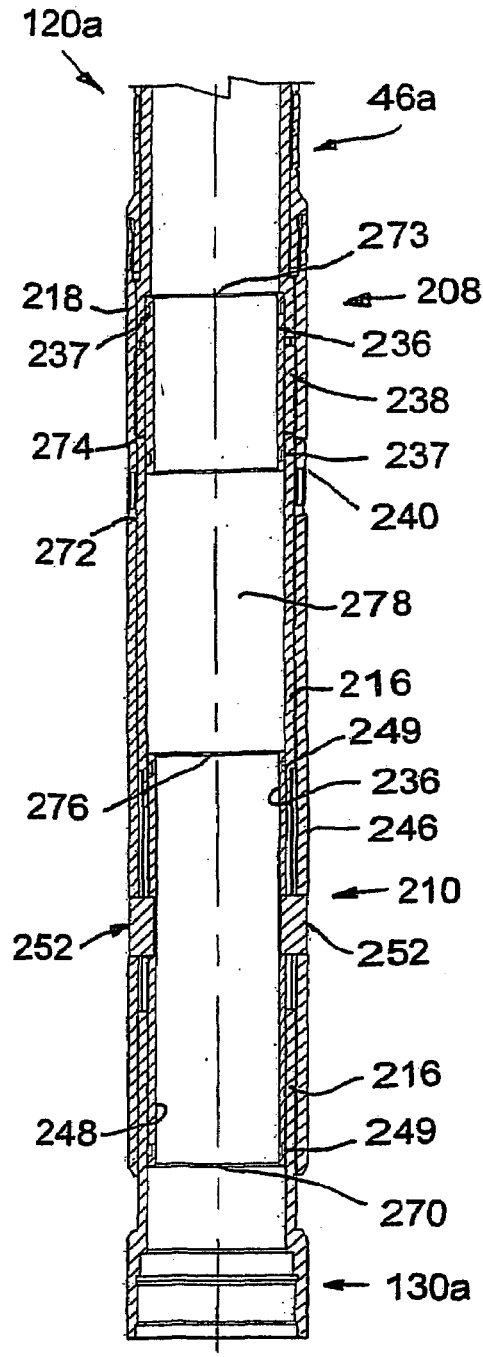

The bridge plug 120a is shown in more detail in the enlarged views of the upper and lower portions of the bridge plug shown in FIGS. 48C and 48D. The plug generally comprises an upper end 122 a with fish-neck profile 124a, a locking key mechanism 206 (shown in FIGS. 49A and 49B and described below), a slip mechanism 128a (shown in FIG. 49C), the seal 46a, a retractable ratchet mechanism 208 (shown in more detail in FIGS. 49D, 50B and 50C and described below), a transfer key mechanism 210 (shown in FIGS. 49E, 50D and 50E and described below), and a lower end 130a, for coupling to a shear-ring mechanism of a setting tool. The bridge plug 120a is run into the casing of the borehole on a setting tool, in a similar fashion to the bridge plug 120 of FIG. 37A.

Referring now to FIGS. 49A to 50E, there are shown enlarged and perspective views of the locking key mechanism 206; and perspective views of the slip mechanism 128a, retractable ratchet mechanism 208 and transfer key mechanism 210, respectively.

Figure 49A:
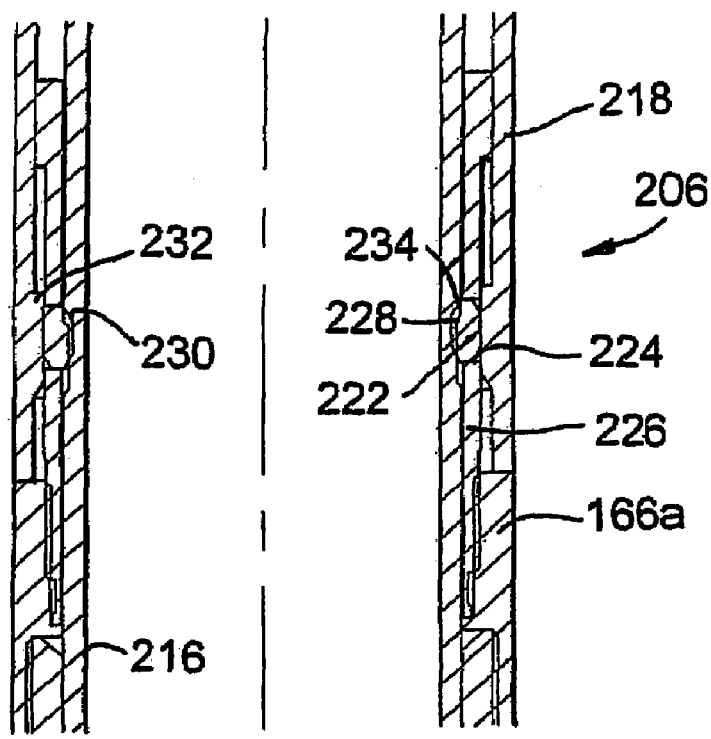
FIGS. 49A and 49B are enlarged views of a locking key mechanism forming part of the bridge plug shown in FIGS. 48A and 48B, respectively.
Figure 49B:
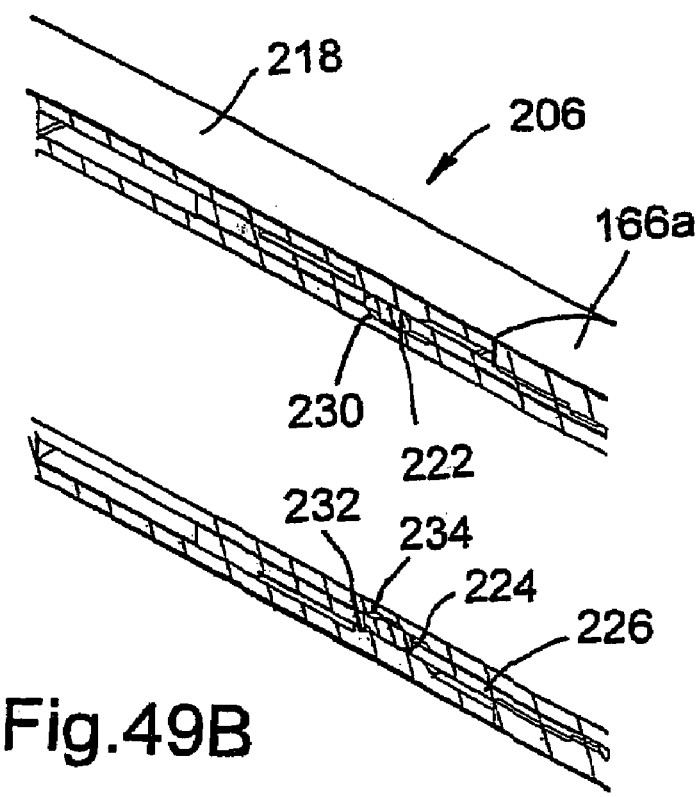

Turning initially to FIGS. 49A and 49B, the locking key mechanism 206 allows the bridge plug 120a to be returned to an unset position after having been set, as will be described below. The key mechanism 206 includes a release sleeve formed by the outer sleeve 218, and release keys 222 (two shown) located in apertures 224 of an inner sleeve 226 of the key mechanism 206. Each release key 222 defines an internal shoulder 228 which engages in a recess 230 of inner plug sleeve 216, to restrain the plug 120a in a set position, as will be described below. A radially inner shoulder 232 of the outer sleeve 218 normally retains the release keys 222 in the apertures 234, such that the key shoulder 228 abuts a face 234 of the recess 230, to restrain the inner sleeve 226 relative to the inner plug sleeve 216.

Figure 49C:
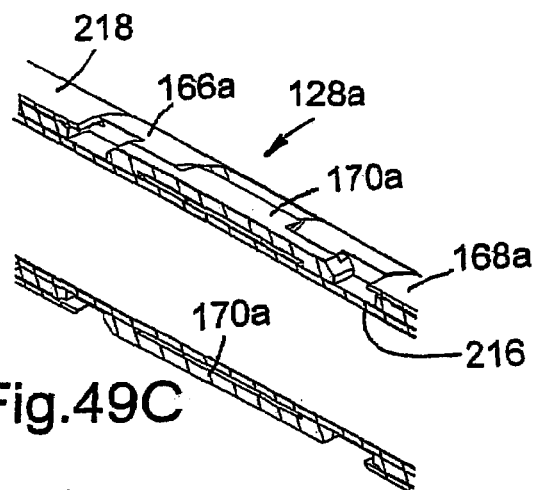
FIGS. 49C, 49D and 49E are enlarged views of a slip mechanism, a retractable ratchet mechanism, and a transfer key mechanism, respectively, all forming part of the bridge plug shown in FIG. 48A.

The slip mechanism 128a shown in FIGS. 48C and 49C differs from the mechanism 128 of bridge plug 120 in that it includes a slip locking ratchet 212 having a ratchet segment 214, which carries internal ratchet teeth, for engaging corresponding teeth on the inner sleeve 216 of the bridge plug 120a. The ratchet segment 214 is carried by the dynamic slip mandrel 168a and retains the slips 170a when the bridge plug 120a is moved to the set position, as will be described below. The mandrel 166a is initially static, and is coupled to the locking key mechanism 206 as described above. Both the inner and outer sleeves 126, 128 are coupled to the fish-neck sleeve by screws 220 (one shown).

Figure 49D:
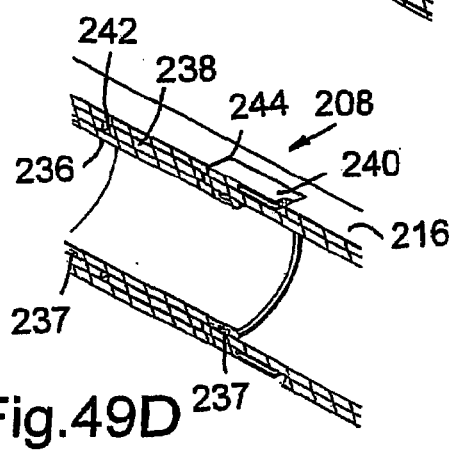

The slip mechanism 128a and the seal 46a are carried on the inner sleeve 216 of the bridge plug 120a, and the inner sleeve 216 is coupled to the retractable ratchet mechanism 208 as shown in FIG. 49D.

The ratchet mechanism 208 includes a ratchet release sleeve 236, coupled to the inner sleeve 216 of the plug by offset shear screws (not shown). The release sleeve 236 carries elastomeric O-ring seals 237 for sealing the release sleeve 236 to the inner sleeve 216. Inner retractable ratchet segments 238 (two shown) of the ratchet mechanism 208 carry ratchet teeth on their outer surfaces, and outer ratchet segments 240 carry inner ratchet teeth for engaging the corresponding teeth on the ratchet segments 238.

The inner ratchet segments 238 are disposed in ratchet housing apertures 242 in the inner sleeve 216, and are supported by the release sleeve 236, to retain the segments 238 in the position shown in FIG. 49D when the bridge plug 120a is being run and set. The outer ratchet segments 240 are disposed in ratchet housing apertures 244 in an outer sleeve 246 of the bridge plug 120a. The inner and outer ratchet segments 238 and 240 are shown in more detail in FIGS. 50B and 50C and described below.

Figure 49E:
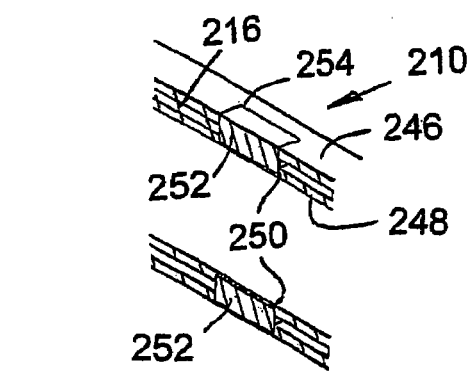

The transfer key mechanism 210 shown in FIG. 49E allows movement of the inner plug sleeve 216 relative to the outer sleeve 246, for moving the bridge plug 120a, between set and unset position. The transfer key mechanism 210 is shown in more detail in FIGS. 50D and 50E. However, the transfer key mechanism 210 generally comprises a transfer sleeve 248 which includes a number of recesses 250 (two shown) for retaining a number of shaped transfer keys 252.

As shown, outer portions of the transfer keys 252 engage in recesses 254 formed in the outer sleeve 246 of the plug 120a. This restrains the transfer sleeve 248 relative to the outer sleeve 246, for movement therewith.

Figure 50A:
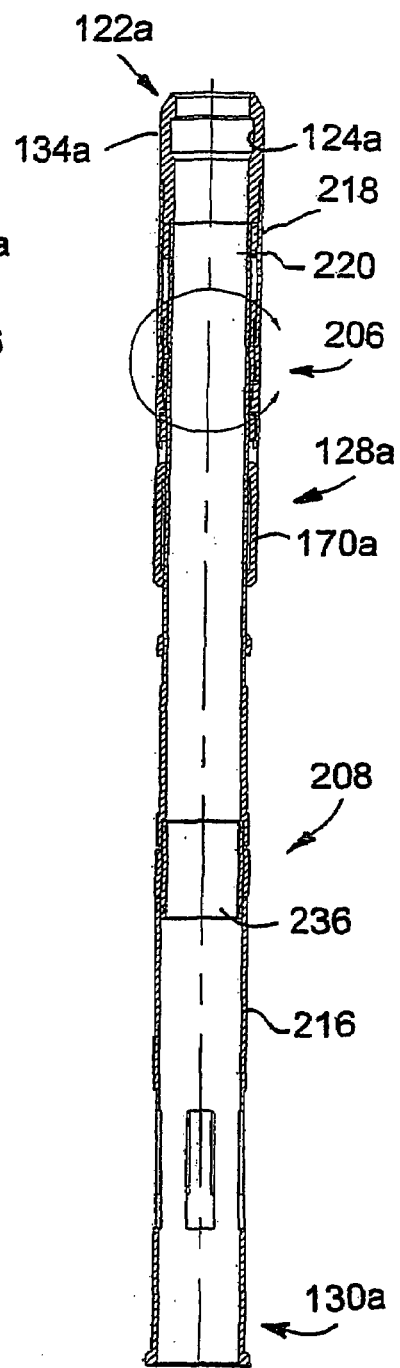
FIG. 50A is a view of the bridge plug shown in FIG. 48B, with part of the bridge plug removed, for clarity.

Turning now to FIG. 50A, there is shown part of the bridge plug 120a of FIG. 48B, with the seal 46a, outer sleeve 246, and part of the transfer key mechanism 210 removed for clarity.

Figure 50B:
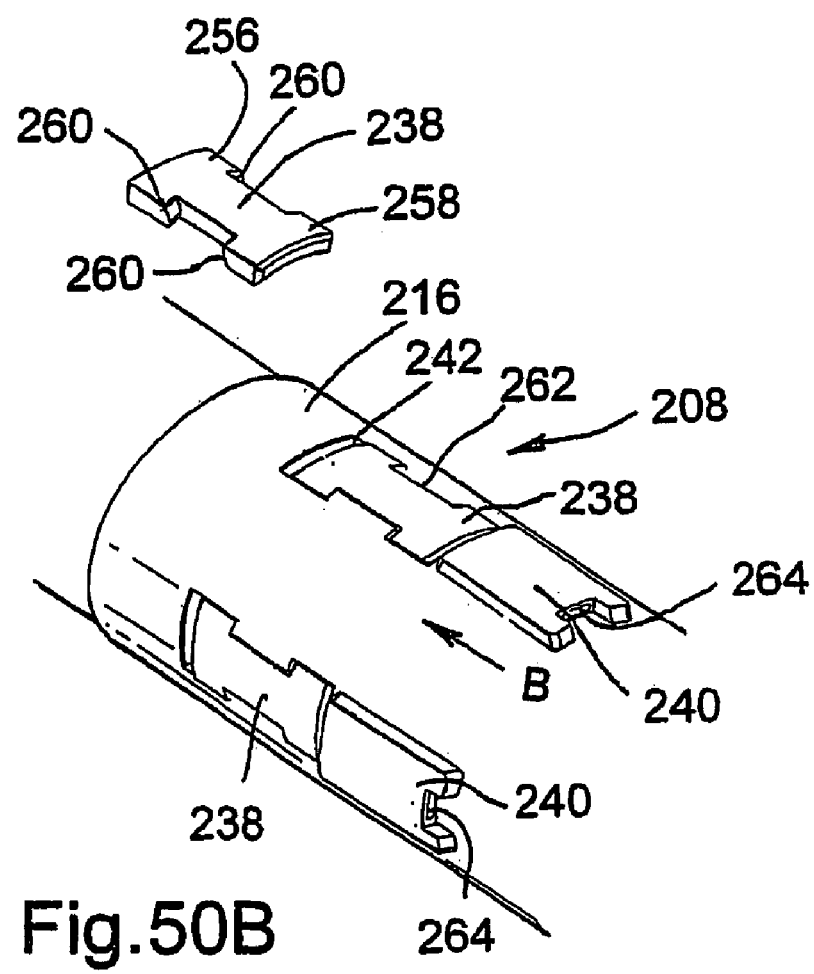
FIGS. 50B and 50C are exploded perspective and an enlarged view, respectively, of the retractable ratchet mechanism shown in FIG. 48A, with part of the bridge plug removed for clarity.
Figure 50C:
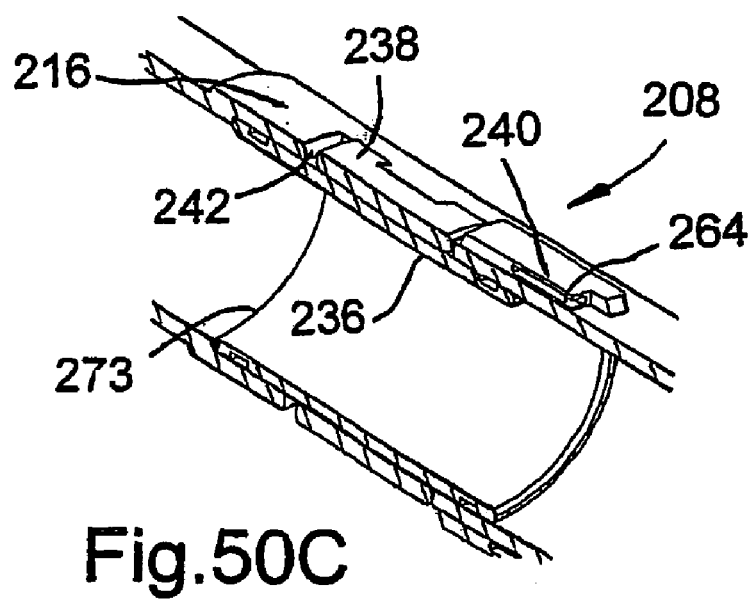

FIGS. 50B and 50C illustrate the retractable ratchet mechanism 208 in more detail, with the outer sleeve 246 removed as shown in FIG. 50A. Each inner retractable ratchet segment 238 is generally I-shaped and is curved, end portions 256 and 258 of each segment 238 carrying angled collapse ramps 260. These collapse ramps 260 engage with corresponding collapse ramps (not shown) carried on shoulders 262 in the inner sleeve 216, which extend into the ratchet housing apertures 242. This causes each retractable ratchet segment 238 to be urged radially inwardly by the inner sleeve 216, when the bridge plug is compressed.

However, as shown in FIG. 50C, each retractable ratchet segment 238 is supported by the release sleeve 236 when the bridge plug 120a is run into the borehole casing. This prevents the movement of the segments 238 radially inwardly.

The outer ratchet segments 240 include pocket springs (not shown), located in chambers 264 in each of the segments 240, which urge the segments 240 in the direction of the arrow B (FIG. 50B), by acting against a wall of the outer sleeve 246 defining the ratchet housing apertures 244. As will be described below, when the inner sleeve 216 is moved downwards, this urges the ratchet segments 238 and 240 into engagement.

Figure 50D:
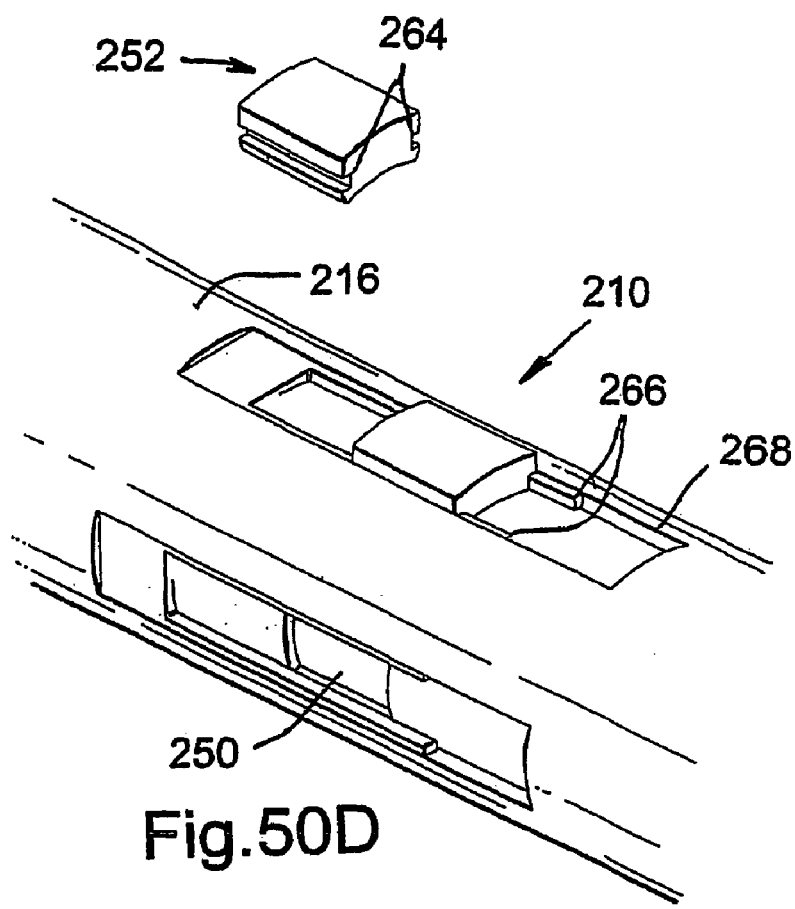
FIGS. 50D and 50E are exploded perspective and an enlarged view, respectively, of the transfer key mechanism shown in FIG. 48A, with part of the bridge plug removed for clarity.
Figure 50E:
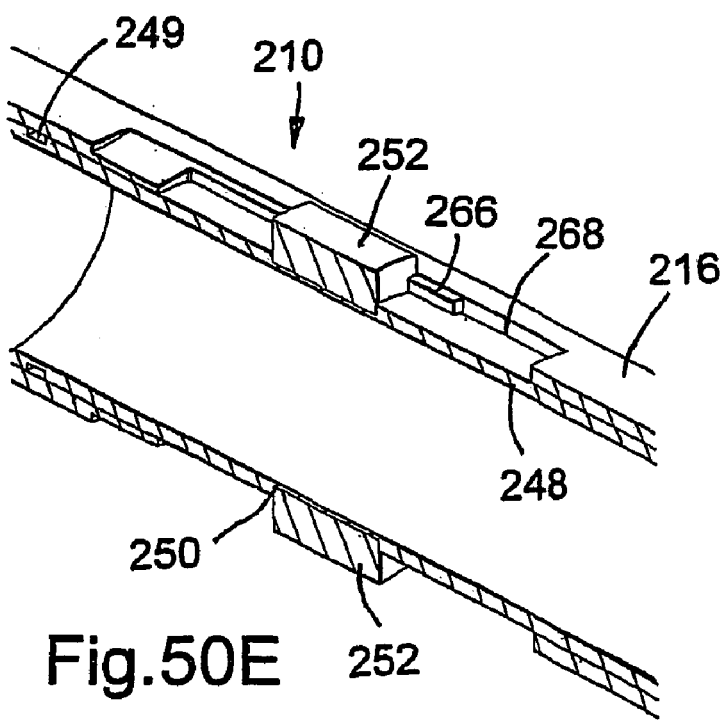

FIGS. 50D and 50E show the transfer key mechanism 210 with the outer sleeve 246 removed, for clarity. The transfer sleeve 248 carries elastomeric O-ring seals 249, for sealing transfer sleeve 248 to the inner sleeve 216.

Each transfer key 252 includes keyways 264 for slidably engaging retaining tracks 266 extending into apertures 268 in the inner sleeve 216, through which the transfer keys 252 extend. This allows the inner sleeve 216 to move axially with respect to the transfer sleeve 248 and the outer sleeve 246, which are coupled by the transfer keys 252, as noted above.

There follows a description of the method of setting the bridge plug 120a of FIGS. 48A to 50E. The bridge plug 120a is run into a borehole casing in the unset position of FIG. 48A. When the bridge plug 120a has been located at the desired depth, the setting tool is initiated, which secures the fish-neck sleeve 134a relative to either the casing wall, or to an end 270 of the transfer sleeve 248.

An axial compressive force is then applied to the bridge plug 120a by the setting tool to compress the plug between the fish-neck sleeve 134 and the end 270 of the transfer sleeve 248. This causes relative upward movement of the transfer sleeve 248 towards the fish-neck sleeve 234. To apply the compressive load upon the bridge plug 120a, the setting tool either anchors the fish-neck sleeve 134a to the casing wall (as noted above), to allow upward jarring action to apply a load on the end 270 of the transfer sleeve 248; or anchors the fish-neck sleeve 134a relative to the end 270 of the transfer sleeve 248 (as noted above), and the compressive load is then generated within the setting tool to compress the bridge plug between the end 270 and the fish-neck sleeve 134a.

Upward movement of the transfer sleeve 248 is transferred to the outer sleeve 246 by the transfer keys 252, and the transfer sleeve 248 and the outer sleeve 246 move upwardly relative to the inner sleeve 216, towards the fish-neck sleeve 134a.

Movement of the outer sleeve 246 in this way moves the outer ratchet segments 240 of ratchet mechanism 208 also axially upwardly over the inner retractable ratchet segments 238. Cam faces 272 and 274 (FIG. 48D) between the outer sleeve 246 and the outer ratchet segments 240, and the outer sleeve 218 and the outer ratchet segments 240, respectively, force the segments 240 radially inwardly such that ratchet teeth of the segments 238 and 240 engage. This locks and retains axial movement of the transfer sleeve 248 and outer sleeve 246.

The axial upward movement is transferred through the seal 46a, which initially remains in the undeformed position, to the dynamic slip mandrel 166a, through the shoulder 160 of the seal 46a. This causes the dynamic slip mandrel 166a to move axially upwardly towards the fish-neck sleeve 134a, axial travel of the mandrel 166a being retained by the ratchet segments 214 of the slip locking ratchet 212. This forces the slips 170a out into engagement with the casing wall, in a similar fashion to the slips 170 of bridge plug 120. The slips 170a are locked by the ratchet 212 securing the dynamic slip mandrel 166a once it has ceased to move axially, and retaining the slips 170a in engagement with the casing wall. Further applied axial loading on the bridge plug 120a is then transferred to the seal 46a, and a predetermined loading moves the seal to the deformed position and into contact with the casing wall. The seal 46a is retained in the deformed position by the retractable ratchet mechanism 208.

In a similar fashion to the bridge plug 120, knowledge of the compressive load required to activate the bridge plug 120a allows a predetermined shear-rated ring (not shown) on the setting tool or release mechanism to disengage from the bridge plug. Once the shear ring has completed its function, the setting tool is withdrawn and retrieved to surface. The bridge plug 120a is now set in the casing and pressure from above or below further compresses the bridge plug to further energize both the slip mechanism 120a and the seal 46a, enhancing pressure retaining performance.

Un-setting of the bridge plug 120a for retrieval is achieved in the following fashion. A retrieval tool (not shown) is run into the borehole and into the bridge plug 122a, to exert a downward loading on an upper end 273 of the ratchet release sleeve 236. This shears the shear screws coupling the release sleeve 236 to the inner sleeve 216 and moves the ratchet release sleeve 236 downwardly. When the sleeve 236 has been moved downwardly a sufficient distance, the retractable ratchet segments 238 are no longer supported. Interaction between the collapse ramps 260 of the segments 238 and the corresponding collapse ramps in the sleeve 216 forces the segments 238 radially inwardly towards a bore 278 of the plug. The segments 238 are therefore moved out of engagement with the outer ratchet segments 240. Radial profiling of the retractable ratchet segments 238 prevents then from falling into the bore 278, and as shown in FIG. 50B, the outer ratchet segments 240 are shaped to be prevented from falling through the ratchet housing apertures 242 for the segments 238, by the shoulders 262. The ratchet mechanism 208 has therefore now been disengaged.

Further downward movement of the ratchet release sleeve 236 brings it into contact with the transfer sleeve 248, and continued downward movement acts to extend the seal 46a, by moving the transfer sleeve 248 downward. This is achieved by the interaction between the sleeves 248 and 246 through the transfer keys 252.

The slip mechanism 128a differs from the slip mechanism 128 of plug 120 in that it remains in full contact with the casing wall throughout the process up to extension of the seal 46a to the undeformed position. Indeed, this allows the downward load to be imparted upon the ratchet release sleeve 236 relative to the casing (downward jarring).

The retrieval tool is now latched into the fish-neck sleeve 134a, to allow the bridge plug 120a to be jarred upwardly. This shears shear screws 280 by which the outer sleeve 218 is coupled to the inner sleeve 226 of the locking key mechanism 206, allowing upward movement of the sleeve 218. This moves the inner shoulder 232 of the sleeve 218 axially upwardly, de-supporting the release keys 222. When the release keys 222 are de-supported, this allows movement of the previously static slip mandrel 168a, which in turn retracts the slips 170a from the casing wall.

The bridge plug 120a can then be fully extended with full retraction of both the seal 46a and the slip mechanism 128a, and the plug 120a can be retrieved to surface.

It will be appreciated that references herein to upward and downward movement are relative to the location of the bridge plugs 120 and 120a in a borehole casing, and, by way of example, the bridge plugs have been described as if located in a substantially vertical portion of a borehole.

Figure 51A:
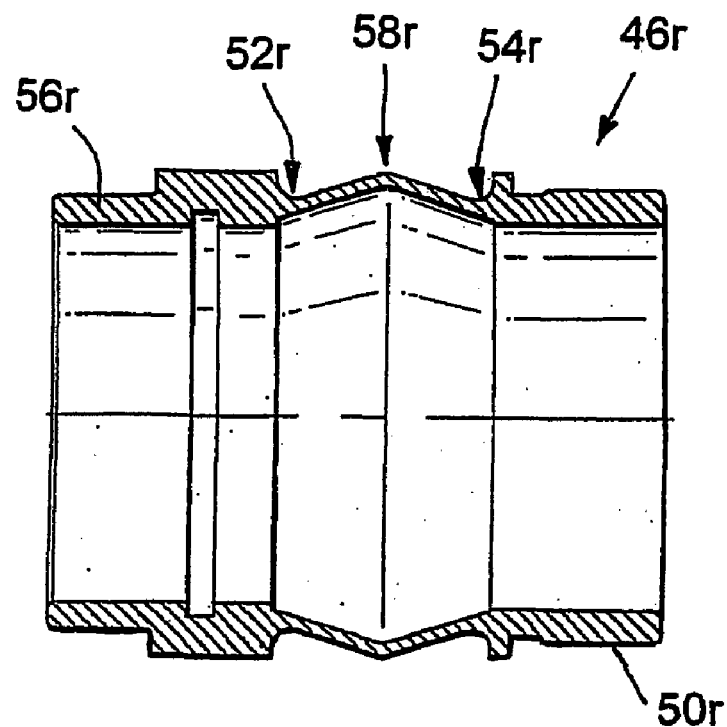
FIGS. 51A and 51B are longitudinal sectional and perspective views, respectively, of a deformable member in accordance with a further embodiment of the present invention, shown in an undeformed position.
Figure 51B:
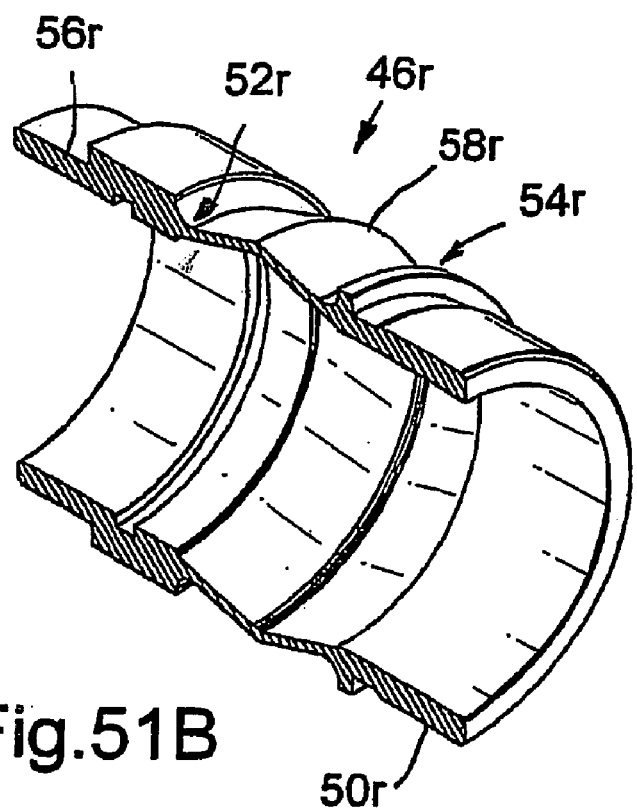
Figure 52A:
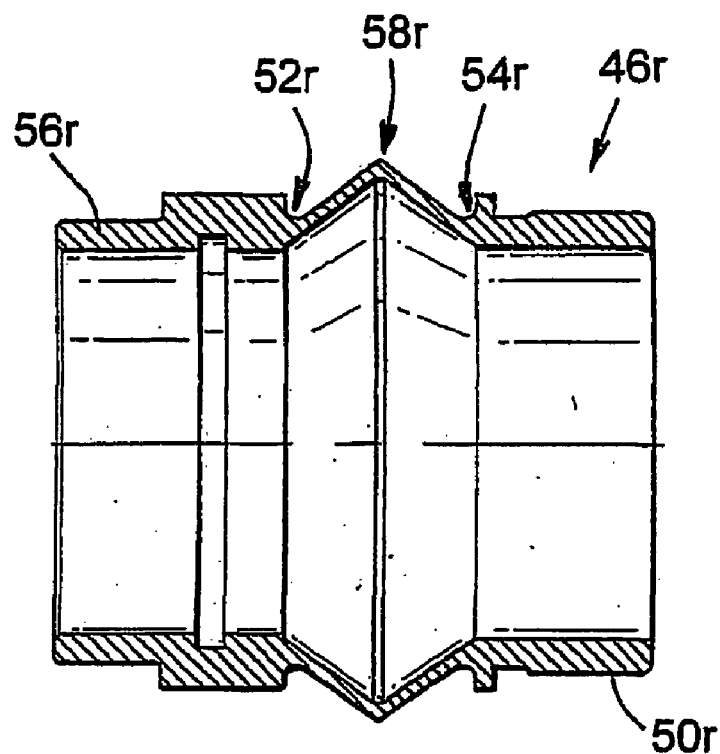
FIGS. 52A and 52B are longitudinal sectional and perspective views, respectively, of the deformable member of FIGS. 51A and 51B, shown in a deformed position.
Figure 52B:
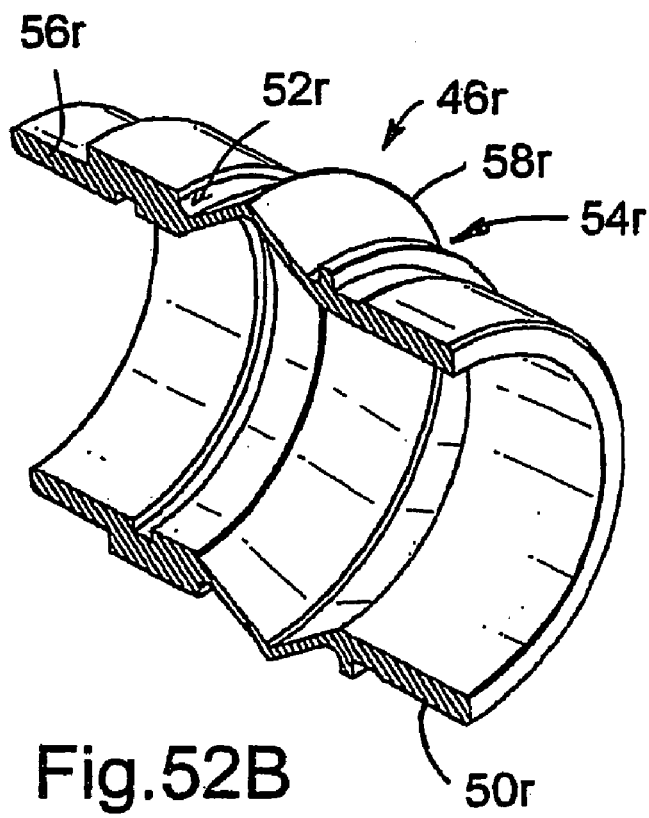
Figure 53A:
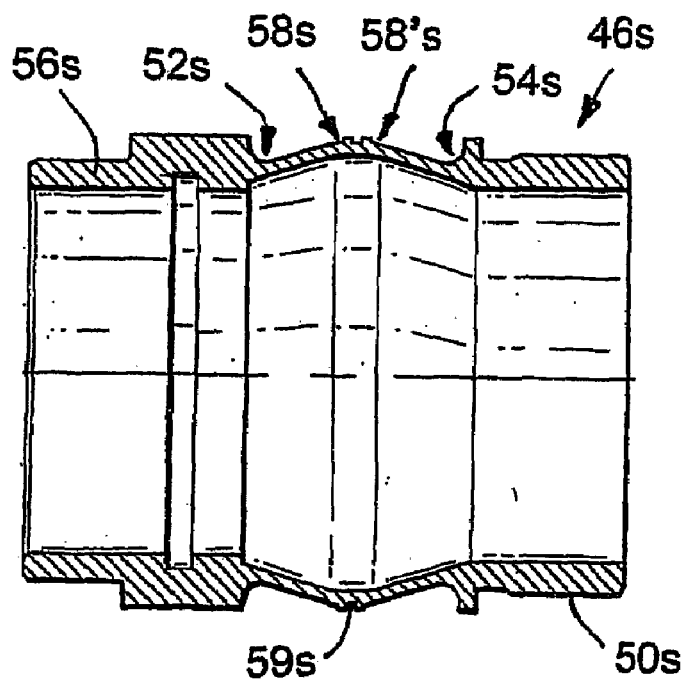
FIGS. 53A and 53B are longitudinal sectional and perspective views, respectively, of a deformable member in accordance with a still further embodiment of the present invention, shown in an undeformed position.
Figure 53B:
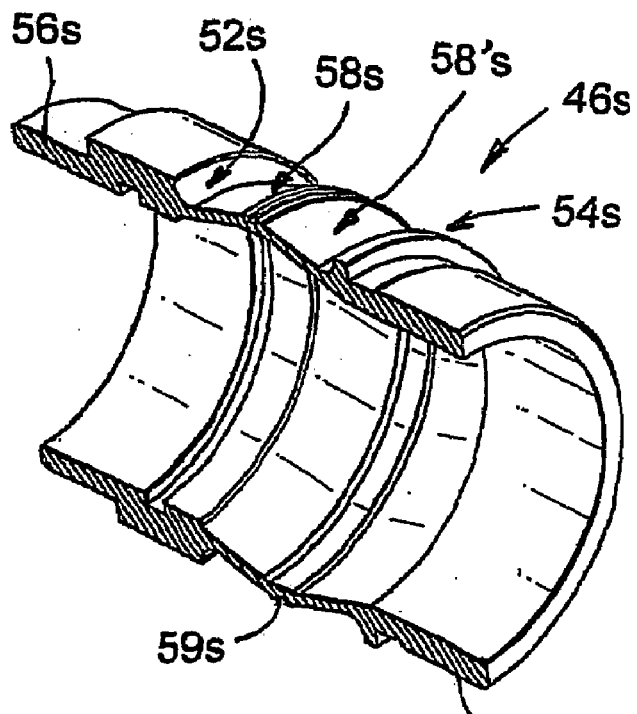
Figure 54A:
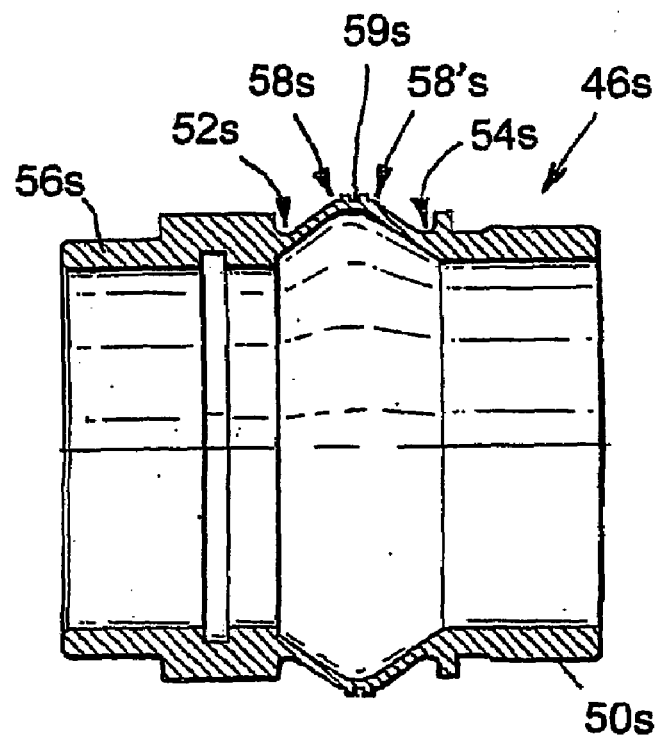
FIGS. 54A and 54B are longitudinal sectional and perspective views, respectively, of the deformable member of FIGS. 53A and 53B, shown in a deformed position.
Figure 54B:
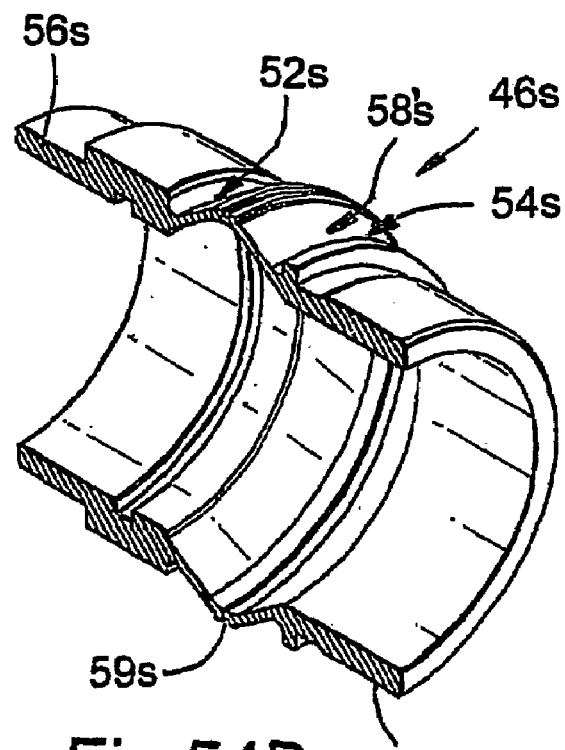

Turning now to FIGS. 51A to 52B, there is shown a deformable member indicated generally by reference numeral 46r, in accordance with a further embodiment of the present invention. The member 46r is essentially similar to the members 46 to 46q described above. FIGS. 51A and 51B show the member 46r in an undeformed position, whilst FIGS. 52A and 52B show the member in a deformed position. The member 46r includes three lines of weakness 52r, 54r and 58r defined by rings of material of the member body 50r. These lines of weakness are formed by changes in the geometry of the body 50r, and define three circumferential nodes, which form weak points in the body 50r under load. The body 50r is shaped such that the line 50r is over-center with respect to the remainder of the body 50r, and this ensures that when a load is applied to the member 46r, the member deforms outwardly into the position shown in FIGS. 52A and 52B, to sealingly engage a tube in which the member 46r is located.

FIGS. 53A to 54B are views of a deformable member indicated generally by reference numeral 46s, in accordance with a still further alternative embodiment of the present invention. The member 46s is essentially similar to the member 46r of FIGS. 51A to 52B, but includes four lines of weakness 52s, 54s, 58s and 58's. The body 50s of the member 46s is shaped such that a circumferential seal carrying channel 59s is formed in the outer surface 56s of the body 50s, between the lines of weakness 58s and 58's. This allows an elastomeric or similar seal to be carried in the channel 59s.

Figure 55:
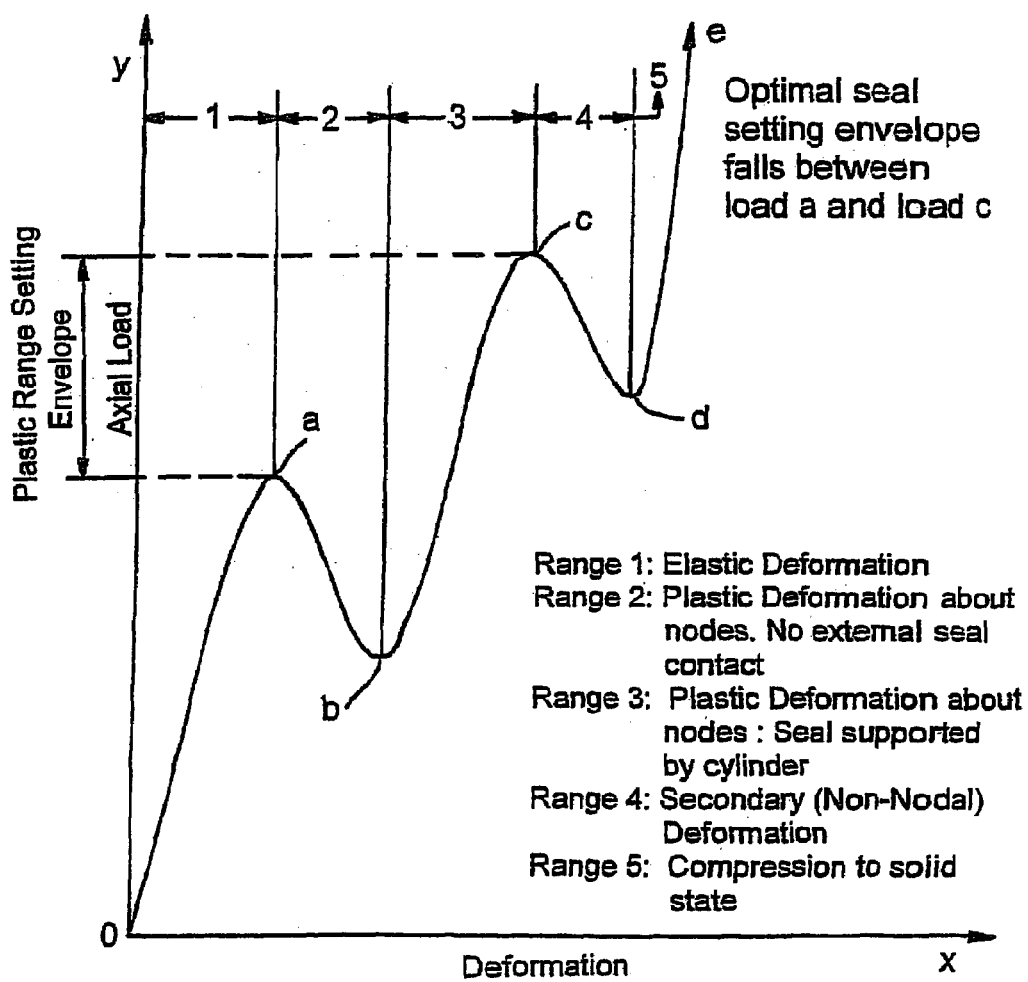
FIG. 55 is a graphical representation of test results for a load vs. deformation test on a typical deformable member of the present invention.

Referring now to FIG. 55, there is shown a graph of the axial load applied to a test deformable member (y axis), against the resultant deformation of the member (x axis). The member 46s (shown in FIGS. 53A to 54B) in particular was tested. Point "a" is the load point at which plastic deformation of the member (to the deformed position) begins to occur. Load point "b" is the point at which the member is fully deformed into contact with a tube or cylinder. Loading the member beyond load point b causes no further plastic deformation until load point "c" is reached, when secondary plastic deformation is initiated. Between load point c and load point "d", the member deformation zone is compressed, and when load point d is reached, the member is permanently plastically deformed, and relatively no further deformation occurs beyond point d (indicated by "e"). The ideal operating range of the member is from zero load up to load point b; however, the member can provide recoverable deformation up to load point c. It will be understood that all of the above described members 46 to 46r of the present invention, when loaded in a similar fashion to the member 46s, behave in this fashion. Accordingly, the graph of FIG. 55 generally applies to all embodiments.

It will further be understood that such secondary deformation is generally undesired. There are three main ways in which secondary deformation can be avoided:

Firstly, by limiting the load. This can be achieved by utilizing a shear/release mechanism with a predetermined load rating which, during compression of the member, prevents inadvertent overloading of the member. This requires prior knowledge of the load at which secondary deformation will initiate.

Secondly, by limiting travel. Limiting the travel allowed during the compression sequence will prevent secondary deformation. This requires prior knowledge of the expected reduction in length of the member within the primary deformation range, that is, the point at which secondary deformation will occur must be known.

Thirdly, by providing a deformation aid. Introduction of a support material (either internally or externally) will reduce the tendency for the member to deform and will increase the load at which secondary deformation will occur, thus increasing the operation envelope of the member. A deformation aid is described above (FIGS. 33A to 34B), but a shaped metal insert could equally be used.

Reference herein to the deformable members being initially rigid are to the members being sufficiently rigid such that the members remain in the undeformed position until a determined axial force is applied to the member, to deform the member about the lines of weakness, as described above.

Various modifications may be made to the foregoing within the scope of the present invention.

The deformable members described above may equally be used in any tube or bore other than a borehole of a well of well tubing, such as, for example, surface gas, oil or other fluid pipelines. The deformable members described above are generally moved between deformed and undeformed positions. However, the deformable members may be initially partially deformed or preformed, such as the deformable member of FIGS. 24A to 25C, and may be moveable between the partially deformed or preformed position and a further deformed position. The deformable members may be of any suitable material which allows deformation to take place as described above. The deformable members may be deformed by an axial pressure force, generated, for example, by fluid pressure in a tube or bore in which the deformable is located.

The deformable members may be multiply reusable, or may be only once deformable, for example, for use in a "one-shot" operation. The collapse aid 340 may be provided as part of a tool carrying the deformable member. It will be understood that it is the location of the lines of weakness in the deformable member which is of primary importance, but that the depth of the, for example, grooves, is also significant in determining the direction of deformation.

What is claimed is:

1. An initially rigid deformable member comprising: a generally hollow cylindrical body defining a member wall, the wall having a number of areas spaced about the body and along the body to collectively predispose the body to deform, upon application of force, in predictable directions in at least three locations, two of the locations deforming in one of a radially inward or a radially outward direction and the other of the at least three locations deforming in the other of the radially inward or radially outward direction.

2. A deformable member as claimed in claim 1, wherein at least one of the areas extends into the member wall to a depth greater than the depth of one or more of the remaining line areas, to determine the direction of deformation of the member.

3. A deformable member as claimed in claim 1, wherein at least one of the areas extends into the member wall to a depth of at least half the wall thickness.

4. A deformable member as claimed in claim 1, wherein the deformable member is deformable between a substantially undeformed position and a deformed position.

5. A deformable member as claimed in claim 1, wherein the deformable member is initially partially deformed and is moveable between the partially deformed and a further deformed position.

6. A deformable member as claimed in claim 1, wherein the deformable member is locatable in a tube and wherein the areas are arranged such that the member is deformable outwardly to provide sealing contact with an inner surface of the tube.

7. A deformable member as claimed in claim 1, wherein the deformable member is adapted to receive a tube therein, and wherein the areas are arranged such that the member is deformable inwardly to provide sealing contact with an outer surface of the tube.

8. A deformable member as claimed in claim 1, wherein at least one end of the deformable member is coupled to a secondary tool, the secondary tool serving for deforming the member by compression.

9. A deformable member as claimed in claim 1, wherein the member is deformable by application of an axial pressure force generated by fluid pressure.

10. A deformable member as claimed in claim 1, wherein the deformable member is plastically deformable.

11. A deformable member as claimed in claim 1, wherein the deformable member is elastically deformable.

12. A deformable member as claimed in claim 11, wherein the elastically deformable member is of a pre-formed size which is larger than, and thus interferes with, a mating bore of a secondary body.

13. A deformable member as claimed in claim 1, wherein the areas comprise open grooves which are closable to allow the member to deform by folding about the areas.

14. A deformable member as claimed in claim 1, wherein the other one of said areas is disposed between the two axially outer areas.

15. A deformable member as claimed in claim 1, wherein the deformable member is movable between a deformed and undeformed position through a number of deformation cycles.

16. A deformable member as claimed in claim 1, wherein the deformable member is once deformable.

17. A deformable member as claimed in claim 1, wherein the two of said areas are provided in the outer surface of the wall to form outer areas and the other one of said areas is provided in the inner surface of the wall to form an inner area between the outer areas, such that the deformable member deforms in a direction substantially radially outwardly on application of the applied force.

18. A deformable member as claimed in claim 1, wherein the two of said areas are provided in the inner surface of the wall to form inner areas, whilst the other one of said areas is provided in the outer surface of the wall to form an outer area, such that the deformable member deforms in a direction substantially radially inwardly on application of the force.

19. A deformable member as claimed in claim 1, wherein the deformable member further comprises a circumferentially extending, substantially upstanding rib on a surface of the member wall, the rib adapted to engage a wall of a tube on deformation of the deformable member.

20. A deformable member as claimed in claim 19, wherein the member includes two ribs provided on the outer surface of the member wall, the ribs tapering outwardly from the surface and being adapted to engage a wall of a tube in which the deformable member is located.

21. A deformable member as claimed in claim 20, wherein each rib is substantially V-shaped in cross-section, and wherein the ribs are inclined toward one another.

22. A deformable member as claimed in claim 1, wherein the other one of said areas is located in the member wall axially closer to one of the two of said areas, such that the deformable member deforms non-symmetrically about the other one of said areas.

23. A deformable member as claimed in claim 1, wherein the member further comprises four areas, two of said areas being provided in one of the inner and outer surfaces of the wall and forming axially outer areas, and the other two of said areas being provided in the other one of the inner and outer surfaces of the wall and forming axially inner areas, to create a flat portion between the axially inner areas in one of the inner and outer wall surfaces when the member is deformed.

24. A deformable member as claimed in claim 23, wherein the axially inner areas are provided in the inner surface of the member wall and extend into the member wall to a depth greater than that of the remainder of the areas, to determine the direction of deformation of the deformable member.

25. A deformable member as claimed in claim 23, wherein the flat portion carries ridges for engaging a tube in which the deformable member is located, when the member is deformed.

26. A deformable member as claimed in claim 23, wherein an outer surface of the flat portion is laminated with a sealing material.

27. A deformable member as claimed in claim 23, wherein an outer surface of the flat portion includes a circumferential groove in which a seal is located.

28. A deformable member as claimed in claim 1, wherein the member includes four areas provided alternately along the body in the outer and inner surfaces of the wall.

29. A deformable member as claimed in claim 1, wherein the member includes at least five areas, three of said areas provided in one of the inner and outer surfaces of the wall, and the other two of said areas provided in the other one of the inner and outer surfaces of the wall.

30. A deformable member as claimed in claim 29, wherein the three ones of said areas are provided in the outer surface of the wall and form outer areas, whilst the other two ones of said areas are provided in the inner surface of the wall and form inner areas.

31. A deformable member as claimed in claim 1, wherein the member includes a plurality of areas.

32. A deformable member as claimed in claim 1, further comprising a deformation aid to aid deformation of the body in response to the applied force, the deformation aid comprising a ring located in the body of the member such that the body deforms around the ring, in use.

33. A deformable member as claimed in claim 1, wherein the member further comprises a collapse aid for assisting in moving the body from a deformed position to an undeformed position.

34. A deformable member as claimed in claim 33, wherein the collapse aid comprises a sleeve adapted to be located around the deformable member and to abut the deformable member in the deformation zone, when the member is in a deformed position, for exerting a collapse force on the body.

* * * * *